United States Patent
Benhar et al.

(10) Patent No.: US 12,509,512 B2
(45) Date of Patent: Dec. 30, 2025

(54) SEMAPHORIN 3A ANTIBODIES AND USES THEREOF

(71) Applicant: Ramot at Tel-Aviv University Ltd., Tel-Aviv (IL)

(72) Inventors: Itai Benhar, Tel-Aviv (IL); Arieh S. Solomon, Tel-Aviv (IL); Ari Barzilai, Tel-Aviv (IL); Limor Nahary, Tel-Aviv (IL); Anat Nitzan, Tel-Aviv (IL); Mary Safrin, Tel-Aviv (IL); Marina Bruzel, Tel-Aviv (IL); Ronit Galron, Tel-Aviv (IL)

(73) Assignee: Ramot at Tel-Aviv University Ltd., Tel-Aviv (IL)

( * ) Notice: Subject to any disclaimer, the term of this patent is extended or adjusted under 35 U.S.C. 154(b) by 1038 days.

(21) Appl. No.: 17/622,923

(22) PCT Filed: Jun. 25, 2020

(86) PCT No.: PCT/IL2020/050717
§ 371 (c)(1),
(2) Date: Dec. 27, 2021

(87) PCT Pub. No.: WO2020/261281
PCT Pub. Date: Dec. 30, 2020

(65) Prior Publication Data
US 2022/0251193 A1 Aug. 11, 2022

Related U.S. Application Data

(60) Provisional application No. 62/867,264, filed on Jun. 27, 2019.

(51) Int. Cl.
| C07K 16/28 | (2006.01) |
| A61K 39/395 | (2006.01) |
| A61P 25/28 | (2006.01) |
| A61P 27/02 | (2006.01) |
| A61P 27/06 | (2006.01) |
| A61K 39/00 | (2006.01) |

(52) U.S. Cl.
CPC .......... *C07K 16/2803* (2013.01); *A61P 25/28* (2018.01); *A61P 27/02* (2018.01); *A61P 27/06* (2018.01); *A61K 2039/505* (2013.01); *C07K 2317/21* (2013.01); *C07K 2317/55* (2013.01); *C07K 2317/565* (2013.01); *C07K 2317/76* (2013.01); *C07K 2317/92* (2013.01)

(58) Field of Classification Search
None
See application file for complete search history.

(56) References Cited

U.S. PATENT DOCUMENTS

2015/0147333 A1* 5/2015 Storm .................. A61P 1/04
435/254.2

FOREIGN PATENT DOCUMENTS

| EP | 2955195 | 12/2015 |
| WO | WO 00/30698 | 6/2000 |
| WO | WO 2014/127479 | 8/2014 |
| WO | WO 2020/261281 | 12/2020 |

OTHER PUBLICATIONS

Omoto et al. (2012) The Semaphorin 3A Inhibitor SM-345431 Accelerates Peripheral Nerve Regeneration and Sensitivity in a Murine Corneal Transplantation Model. PLoS One 7(11): e47716; p. 1-9.*
International Search Report and the Written Opinion Dated Sep. 9, 2020 From the International Searching Authority Re. Application No. PCT//IL2020/050717. (18 Pages).
Lee et al. "Anti-SEMA3A Antibody: A Novel Therapeutic Agent to Suppress Glioblastoma Tumor Growth", Cancer Research and Treatment, 50(3): 1009-1022, Jul. 2018.
Shirvan et al. "Anti-Semaphorin 3A Antibodies Rescue Retinal Ganglion Cells From Cell Death Following Optic Nerve Axotomy", The Journal of Biological Chemistry, 277(51): 49799-49807, Oct. 9, 2002.

* cited by examiner

*Primary Examiner* — Ilia I Ouspenski

(57) ABSTRACT

Antibodies comprising an antigen recognition region which binds a semaphorin 3A (Sema3A) are disclosed. Uses thereof are also disclosed.

2 Claims, 14 Drawing Sheets

Specification includes a Sequence Listing.

FIG. 6A 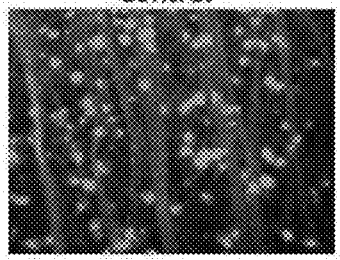 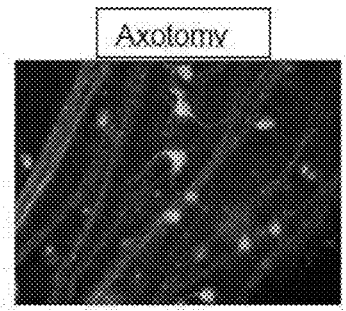 FIG. 6B
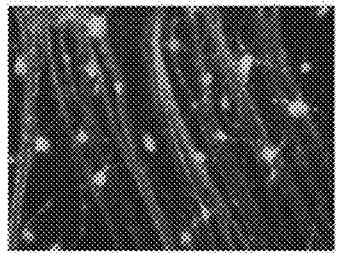 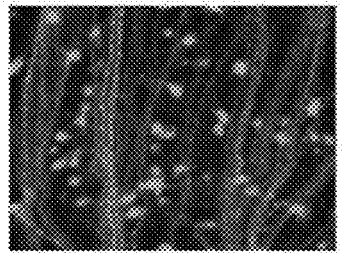 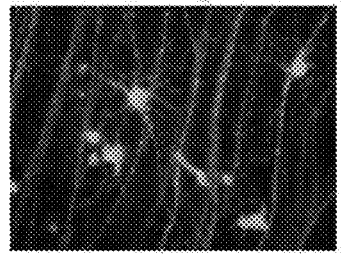
FIG. 6C  FIG. 6D  FIG. 6E

SEMAPHORIN 3A ANTIBODIES AND USES THEREOF

RELATED APPLICATIONS

This application is a National Phase of PCT Patent Application No. PCT/IL2020/050717 having International filing date of Jun. 25, 2020, which claims the benefit of priority under 35 USC § 119(e) of U.S. Provisional Patent Application No. 62/867,264 filed on Jun. 27, 2019. The contents of the above applications are all incorporated by reference as if fully set forth herein in their entirety.

SEQUENCE LISTING STATEMENT

The ASCII file, entitled 89653Sequence—Listing.txt, created on Dec. 27, 2021, comprising 74,307 bytes, submitted concurrently with the filing of this application is incorporated herein by reference. The sequence listing submitted herewith is identical to the sequence listing forming part of the international application.

FIELD AND BACKGROUND OF THE INVENTION

The present invention, in some embodiments thereof, relates to an antibody that binds to semaphorin 3A and uses thereof.

Neurodegeneration is a common cause of pathology in the nervous system especially in age. Typically, it is a process that initiates secondary to another physiological or environmental insult. The unusual aspect of neuro-versus other forms of tissue degeneration is that it often persists and extends even if the apparent cause of the insult is removed or reduced. This is, in part, because inflammatory processes are differently regulated in nervous tissues due to their immune privilege. An example is the bruising of the spinal cord in trauma leading to scarring that prevents nervous transmission. It would be expected that a similar injury to muscle, as opposed to nervous tissues, would have a different functional outcome.

Thus, the adult Central Nervous System (CNS) in higher vertebrates shows a limited capacity for anatomical and functional recovery after either acute or chronic neuropathies. Many studies suggest that the limited capacity for nerve regeneration is due to the presence of axonal growth inhibitory components in the CNS tissue. Several studies showed that CNS neurons possess growth potential supporting the hypothesis that inhibition of endogenous axonal growth inhibitors might allow regeneration of injured axons in adult CNS.

The central nervous system (CNS) encompasses a range of sensitive tissues including not only the brain but also the extensions to the major sensing organs including the eyes, ears, nose and spinal cord.

The chronic destructive stress responses of the CNS can be attributed to the fact that inflammation and edema in the form that is common in muscles and joints is extremely counterproductive in the CNS which is, amongst others, highly pressure sensitive. Thus, the CNS immune response is characterized by isolation of the effected tissue and elimination of injured cells. In long lived organisms like humans, this response has the cost of significant loss of function. Accordingly, new methods and compositions that are useful for modulating the processes of neurodegeneration are of particular interest.

Background art includes Shirvan et al., Journal of Biological Chemistry; Vol. 277, No. 51, Issue of December 20, pp. 49799-49807, 2002 and Azriel-Rosenfeld et al., 2004, Journal of Molecular Biology, 335, 177-92.

SUMMARY OF THE INVENTION

According to an aspect of the present invention there is provided an antibody comprising an antigen recognition region which binds a semaphorin 3A (Sema3A), having complementarity determining region (CDR) amino acid sequences as set forth in: SEQ ID NOs: 53 (CDR1), 69 (CDR2) and 85 (CDR3), sequentially arranged from N to C on a light chain of the antibody; and SEQ ID NOs: 5 (CDR1), 21 (CDR2) and 37 (CDR3), sequentially arranged from N to C on a heavy chain of the antibody.

According to an aspect of the present invention there is provided an antibody comprising an antigen recognition region which binds a semaphorin 3A (Sema3A), having complementarity determining region (CDR) amino acid sequences as set forth in Table 2 on a light chain of the antibody; and CDR amino acid sequences as set forth in Table 1, on a heavy chain of the antibody.

According to an aspect of the present invention there is provided an method of treating a disease or injury associated with imbalanced or abnormal activity of semaphorin 3A in a subject in need thereof, the method comprising administering to the subject a therapeutically effective amount of the antibody disclosed herein, thereby treating the disease or injury associate with imbalanced or abnormal activity of semaphorin 3A in the subject.

According to an aspect of the present invention there is provided a method of diagnosing a disease associated with imbalanced or abnormal activity of semaphorin 3A in a subject, the method comprising contacting a sample of the subject with the antibody described herein, so as to analyze expression of semaphorin 3A, wherein an upregulation of expression of the semaphorin 3A is indicative of the disease associated with imbalanced or abnormal activity of semaphorin 3A.

According to an aspect of the present invention there is provided a method of treating a disease associated with imbalanced or abnormal activity of semaphorin 3A in a subject in need thereof comprising:
(a) analyzing in a sample of the subject for an amount of semaphorin 3A; and
(b) administering to the subject a therapeutically effective amount of the antibody described herein upon confirmation that the amount of the semaphorin 3A is above a predetermined level, thereby treating the disease associated with imbalanced or abnormal activity of semaphorin 3A.

According to an aspect of the present invention there is provided a pharmaceutical composition comprising the antibody described herein.

According to an aspect of the present invention there is provided an implant comprising the antibody described herein.

According to an aspect of the present invention there is provided an isolated polynucleotide encoding at least one CDR amino acid sequence selected from the group consisting of SEQ ID NOs: 53, 69, 85, 5, 21 and 37.

According to an aspect of the present invention there is provided a cell that comprises the isolated polynucleotide described herein.

According to an aspect of the present invention there is provided a method of generating the antibody described herein, comprising culturing the cell described herein under conditions that allows expression of the antibody.

According to embodiments of the present invention, the VL amino acid sequence as set forth in SEQ ID NO: 117.

According to embodiments of the present invention, the antibody has a VH amino acid sequence as set forth in SEQ ID NO: 101.

According to embodiments of the present invention, the antibody is attached to a detectable moiety or a therapeutic moiety.

According to embodiments of the present invention, the disease is an ocular disease.

According to embodiments of the present invention, the ocular disease is selected from the group consisting of non-arthritic ischemic optic atrophy (NAION), glaucoma and retinal detachment.

According to embodiments of the present invention, the disease is a neurodegenerative disease.

According to embodiments of the present invention, the injury comprises a neuronal injury.

According to embodiments of the present invention, the antibody comprises a detectable moiety.

According to embodiments of the present invention, the disease is an ocular disease.

According to embodiments of the present invention, the disease is a neurodegenerative disease.

According to embodiments of the present invention, the analyzing is effected using an antibody.

According to embodiments of the present invention, the antibody is the antibody described herein.

According to embodiments of the present invention, the isolated polynucleotide encodes the CDR amino acid sequence as set forth in SEQ ID NOs: 53, 69 and 85.

According to embodiments of the present invention, the isolated polynucleotide encodes the CDR amino acid sequence as set forth in SEQ ID NOs: 5, 21 and 37.

According to embodiments of the present invention, the isolated polynucleotide encodes the CDR amino acid sequence as set forth in SEQ ID NOs: 53, 69, 85, 5, 21 and 37.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 5A-D are photographs of a DRG repulsion assay for 3H4 and 3E12 IgGs. Chick dorsal root ganglia were exposed to Sema3A secreted from HEK293 cells The DRGs were fixed in 3% formaldehyde (FA) for an hour and stained with phalloidin (stress actin fibers). Control treated cells (FIG. 5A) sprouted axons. DRGs that were cultured with Sema3A secreting HEK293 cells but received no treatment (FIG. 5B) did not sprout any axons. The DRGs that were treated with 3H4 IgG (FIG. 5C) sprouted many axons, and the axons that grew towards the 293 HEK cells had intact growth cones. The DRGs that were treated with 3E12 IgG (FIG. 5D) sprouted less axons and the axons that did grow underwent growth cone collapse in the region facing the 293 HEK cells. Yellow arrows indicate the direction of Sema3A secretion from 293 HEK cells. Yellow boxes show the region the fluorescent images were taken from.

FIGS. 6A-F are graphs and photographs of results of retrograde labeling of live retinal ganglion cells (RGC) following axotomy of the optic nerve (ON) in an in vivo assay. Adult male Wistar rats, 12-15-weeks-old, were deeply anaesthetized (xylazine 50 mg/kg and ketamine 35 mg/kg), and their right ON was exposed by lateral canthotomy. The conjunctiva was incised lateral to the eye globe at the border of the cornea. The optic nerve was exposed following isolation of the external and retractor bulbi muscles. Through a small opening in the meninges (50-100 µm), the nerve fibers were completely transected at a distance of 2-3 mm from the globe. A glass dissector with a 50 µm tip and a smooth blunt edge assured that there would be no damage to the nerve vasculature and ON blood supply and there would be minimal damage to the meninges. The injury was unilateral in all animals. The surgery was immediately followed by an injection of either Sema3A inhibitor or PBS (for the untreated group) into the vitreous. After 12 days the retrograde neurotracer 4-di-10-Asp was inserted into the optic nerve. This neurotracer stains only live RGCs. Two days later, the retinas were isolated, mounted on a slide and viewed under a fluorescence microscope. Random fields were selected and the number of live RGC was counted. The retinas treated either with 3H4 Fab (or 3H4 IgG have a large number of living RGC while untreated retinas (or retinas treated with 3E12-IgG) have only a few RGCs that remained alive. FIG. 6A: Control; FIG. 6B: Axotomy+PBS; FIG. 6C: Axotomy+3H4 Fab; FIG. 6D: Axotomy+3H4 IgG; FIG. 6E: Axotomy+3E12 IgG; FIG. 6F: Bar graph representation of RGC survival according to FIGS. 6A-E.

FIG. 8A: 3E12 Fab and 3E12 IgG were conjugated with Alexa FLUOR® 680 dye in order to detect them with an in vivo imaging system. Rats were anesthetized and injected intravitreously with 6 µl of Alexa FLUOR® 680-conjugated antibody or Fab. One rat was injected with Alexa 680-3E12-Fab and the other rat was injected with Alexa FLUOR® 680-3E12-IgG. The fluorescence emanating from the rats' eyes were quantified every 24 hours for 3 days and again on day 6. The relative clearance of the Fab and IgG reflect known differences in intravitreal clearance of antibodies with Fabs known to be cleared faster. Clearance of either the 3H4 Fab (FIG. 8B) or a Fab binding streptavidin as a negative control (Fab SA; FIG. 8C) from eyes that are either normal or post-axotomy. Axotomy causes a selective retardation of the 3H4 Fab, suggesting that expression of the target assists retention of the Fab.

FIG. 9B) did not prevent RGC loss compared to control (FIG. 9A).

DESCRIPTION OF SPECIFIC EMBODIMENTS OF THE INVENTION

Figure 1A:
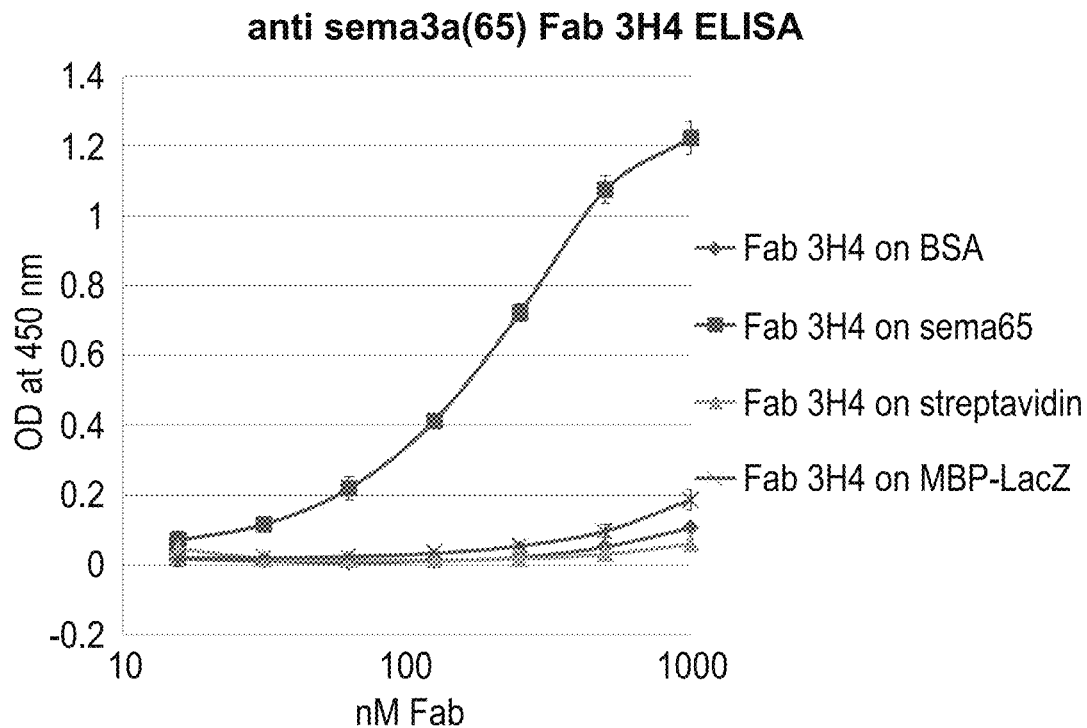
FIGS. 1A-B are graphs illustrating purification and ELISA binding evaluation of anti Sema3a isolated Fabs for estimated Kd values. The analyzed antibody was added in 2 fold dilution series starting at 1 µM to the antigen (Sema3A) coated wells (5 µg/ml). Bound antibodies were detected with horseradish peroxidase (HRP)-conjugated goat anti human H+L secondary antibodies. Fab 3H4 (FIG. 1A), L4B8 and L4E6 (FIG. 1B) are presented.

The present invention, in some embodiments thereof, relates to an antibody that binds to semaphorin 3A and uses thereof.

The present inventors have generated and sequenced novel antibodies capable of binding with high affinity to Semaphorin 3A.

The present inventors have shown using both cell culture experiments (FIGS. 3A-D, 4 and 5A-D) and animal models (FIGS. 6A-F and 9A-C) that such antibodies may be used to treat a myriad of diseases associated with an imbalance of Semaphorin 3A.

Thus, according to a first aspect of the present invention there is provided an antibody comprising an antigen recognition region which binds a semaphorin 3A (Sema3A), having complementarity determining region (CDR) amino acid sequences as set forth in: SEQ ID NOs: 53 (CDR1), 69 (CDR2) and 85 (CDR3), sequentially arranged from N to C on a light chain of the antibody; and SEQ ID NOs: 5 (CDR1), 21 (CDR2) and 37 (CDR3), sequentially arranged from N to C on a heavy chain of the antibody.

The antibody of this aspect of the present invention may comprise a VH amino acid sequence as set forth in SEQ ID NO: 101 and a VL amino acid sequence as set forth in SEQ ID NO: 117. The CDR sequences of the antibody are as set forth in SEQ ID NOs: 5, 21, 37, 53, 69 and 85.

According to a particular embodiment, the antibody comprises amino acid sequences which are at least 90% homologous/identical, at least 91% homologous/identical, at least 92% homologous/identical, least 93% homologous/identical, at least 94% homologous/identical, at least 95% homologous/identical, least 96% homologous/identical, at least 97% homologous/identical, at least 98% homologous/identical, at least 99% homologous/identical or even 100% homologous/identical to the sequences as set forth in SEQ ID NO: 101 and 117 (wherein the CDR sequences of the antibody are always 100% identical to those provided herein above).

According to another aspect of the present invention there is provided an antibody comprising an antigen recognition region which binds a semaphorin 3A (Sema3A), having complementarity determining region (CDR) amino acid sequences as set forth in Table 2 on a light chain of the antibody; and CDR amino acid sequences as set forth in Table 1, on a heavy chain of the antibody.

TABLE 1

Lists the CDR-H sequences (CDR-H1, CDR-H2-, and CDR-H3) for each of the listed antibody clones, 3A3 to L4B8, from top to bottom.

| Antibody | CDR-H1 | CDR-H2 | CDR-H3 |
| --- | --- | --- | --- |
| 3A3 | SYDMD (SEQ ID NO: 1) | AINSNGDSTYYPDTV KD (SEQ ID NO: 17) | AQGQWLFHNWFD H (SEQ ID NO: 33) |

TABLE 1-continued

Lists the CDR-H sequences (CDR-H1, CDR-H2-, and CDR-H3) for each of the listed antibody clones, 3A3 to L4B8, from top to bottom.

| Antibody | CDR-H1 | CDR-H2 | CDR-H3 |
| --- | --- | --- | --- |
| 3C7 | SYWMH (SEQ ID NO: 2) | STTGSGGSTYYADSVKG (SEQ ID NO: 18) | GTSGWYGIDY (SEQ ID NO: 34) |
| 3E12 | DHYMD (SEQ ID NO: 3) | AISGVGGSTYYADSVKG (SEQ ID NO: 19) | EDNSGSPDY (SEQ ID NO: 35) |
| 3G3 | DYWMH (SEQ ID NO: 4) | ALTGGGDTPWYPGSVKGR (SEQ ID NO: 20) | VKVVPRSRETDAFDV (SEQ ID NO: 36) |
| 3H4 | SYAVH (SEQ ID NO: 5) | STEGSGVGTSYTDSVKG (SEQ ID NO: 21) | MLGGGNPLDYLDY (SEQ ID NO: 37) |
| 3H8 | SYGMH (SEQ ID NO: 6) | YISSSGSHTSFADSVKG (SEQ ID NO: 22) | DGLFGIDY (SEQ ID NO: 38) |
| L4D10 | SYGMH (SEQ ID NO: 7) | SISPTTNYRSYADSLRGR (SEQ ID NO: 23) | GHRDRSGSPVGYLDY (SEQ ID NO: 39) |
| L4G11 | NNYMS (SEQ ID NO: 8) | GLSGFGRGAHYSDSVKG (SEQ ID NO: 24) | GAVGYLQWFPDV (SEQ ID NO: 40) |
| 3B7CorrC3 | AASGFTFTDYYMS (SEQ ID NO: 9) | AISDSGGMTYYADSVRG (SEQ ID NO: 25) | EPLGDHGDLRPDFDY (SEQ ID NO: 41) |
| 3A9CorrC6 | PYAMS (SEQ ID NO: 10) | VIFTSGTTNYADSVKG (SEQ ID NO: 26) | ELRRPGDGVPAATSDY (SEQ ID NO: 42) |
| 3G1CorrC10 | NHAMS (SEQ ID NO: 11) | SISASGGSTYYADSVKG (SEQ ID NO: 27) | AESGYQLDY (SEQ ID NO: 43) |
| 3E2CorrG9 | DFAMS (SEQ ID NO: 12) | SISSNSSYIYYADSVKG (SEQ ID NO: 28) | GRVYGDFGKFDS (SEQ ID NO: 44) |
| L4D8 | DYYMS (SEQ ID NO: 13) | SISSSSSYIYYADSVKG (SEQ ID NO: 29) | GGDYDAFDI (SEQ ID NO: 45) |
| L4F8 | DYYMN (SEQ ID NO: 14) | RITNDGMSTAYADFVKG (SEQ ID NO: 30) | SPLEEGRITFRYWYFDL (SEQ ID NO: 46) |
| L4E6 | NFVMN (SEQ ID NO: 15) | RINTDGTSTNYADSVTG (SEQ ID NO: 31) | DYPLRRLMYYYYGMDV (SEQ ID NO: 47) |
| L4B8 | LYNIN (SEQ ID NO: 16) | TISGSGLNTYYSDPVKGR (SEQ ID NO: 32) | DEDTYAFN (SEQ ID NO: 48) |

TABLE 2

Lists the CDR-L sequences (CDR-L1, CDR-L2-, and CDR-L3) for each of the listed antibody clones, 3A3 to L4B8, from top to bottom.

| Antibody | CDR-L1 | CDR-L2 | CDR-L3 |
| --- | --- | --- | --- |
| 3A3 | SGGNSNIGDHYVS (SEQ ID NO: 49) | GDTHRPS (SEQ ID NO: 65) | GTWDSSLSAGV (SEQ ID NO: 81) |
| 3C7 | SGSSSNIGNNHVS (SEQ ID NO: 50) | CNNNRPS (SEQ ID NO: 66) | QVWDSSRDQGV (SEQ ID NO: 82) |
| 3 E 12 | ASQSVGSNLA (SEQ ID NO: 51) | GASSRAT (SEQ ID NO: 67) | QRYDGSPYT (SEQ ID NO: 83) |
| 3G3 | TGGPPNIGNNAVF (SEQ ID NO: 52) | ELTKRPS (SEQ ID NO: 68) | SSYTRVSTPV (SEQ ID NO: 84) |
| 3H4 | SGSSSNLGEGYDVH (SEQ ID NO: 53) | SDFRPSG (SEQ ID NO: 69) | AAWDDSLSSOV (SEQ ID NO: 85) |
| 3H8 | RASQSISSNLA (SEQ ID NO: 54) | GASSRAT (SEQ ID NO: 70) | QQRDWPPFT (SEQ ID NO: 86) |

TABLE 2-continued

Lists the CDR-L sequences (CDR-L1, CDR-L2-, and CDR-L3) for each of the listed antibody clones, 3A3 to L4B8, from top to bottom.

| Antibody | CDR-L1 | CDR-L2 | CDR-L3 |
|---|---|---|---|
| L4D10 | TGSSSNIGRNSVN (SEQ ID NO: 55) | SNHHRPS (SEQ ID NO: 71) | SSYAGSNKYV (SEQ ID NO: 87) |
| L4G11 | SGGRSNIGSNTVN (SEQ ID NO: 56) | NSNRPSG (SEQ ID NO: 72) | CSHARGDTLI (SEQ ID NO: 88) |
| 3B7CorrC3 | SGGSSNIGSQTVL (SEQ ID NO: 57) | NNKRPSG (SEQ ID NO: 73) | ASWDDSLSGGV (SEQ ID NO: 89) |
| 3A9CorrC6 | SGSTSNIGRNYVC (SEQ ID NO: 58) | ANNNRPS (SEQ ID NO: 74) | SSYTSSSTLV (SEQ ID NO: 90) |
| 3G1CorrC10 | RASQSVSSSYLA (SEQ ID NO: 59) | GVSNRAT (SEQ ID NO: 75) | QQSYSTPYT (SEQ ID NO: 91) |
| 3E2CorrG9 | TASQSVGRYLA (SEQ ID NO: 60) | GASSRAT (SEQ ID NO: 76) | QQYGSSLT (SEQ ID NO: 92) |
| L4D8 | SGRSSNVGSNSVN (SEQ ID NO: 61) | TNDQRPS (SEQ ID NO: 77) | SSYTSSSTRV (SEQ ID NO: 93) |
| L4F8 | RASQSVSSNLA (SEQ ID NO: 62) | DASNRAT (SEQ ID NO: 78) | QQGDSYPYT (SEQ ID NO: 94) |
| L4E6 | RASQTISSNLAW (SEQ ID NO: 63) | GASSRAT (SEQ ID NO: 79) | QQYSWSPRVYS (SEQ ID NO: 95) |
| L4B8 | RASQSVSSSYLA (SEQ ID NO: 64) | GASTRAP (SEQ ID NO: 80) | HQRGSGDT (SEQ ID NO: 96) |

In one embodiment, CDRH1 comprises the amino acid sequence of SEQ ID NO: 1, wherein CDR-H2 comprises the amino acid sequence of SEQ ID NO: 17, wherein CDR-H3 comprises the amino acid sequence of SEQ ID NO: 33, wherein CDR-L1 comprises the amino acid sequence of SEQ ID NO: 49, wherein CDR-L2 comprises the amino acid sequence of SEQ ID NO: 65, and wherein CDR-L3 comprises the amino acid sequence of SEQ ID NO: 81.

In another embodiment, CDRH1 comprises the amino acid sequence of SEQ ID NO: 2, wherein CDR-H2 comprises the amino acid sequence of SEQ ID NO: 18, wherein CDR-H3 comprises the amino acid sequence of SEQ ID NO: 34, wherein CDR-L1 comprises the amino acid sequence of SEQ ID NO: 50 wherein CDR-L2 comprises the amino acid sequence of SEQ ID NO: 66, and wherein CDR-L3 comprises the amino acid sequence of SEQ ID NO: 82.

In another embodiment, CDRH1 comprises the amino acid sequence of SEQ ID NO: 3, wherein CDR-H2 comprises the amino acid sequence of SEQ ID NO: 19, wherein CDR-H3 comprises the amino acid sequence of SEQ ID NO: 35, wherein CDR-L1 comprises the amino acid sequence of SEQ ID NO: 51, wherein CDR-L2 comprises the amino acid sequence of SEQ ID NO: 67, and wherein CDR-L3 comprises the amino acid sequence of SEQ ID NO: 83.

In another embodiment, CDRH1 comprises the amino acid sequence of SEQ ID NO: 4, wherein CDR-H2 comprises the amino acid sequence of SEQ ID NO: 20, wherein CDR-H3 comprises the amino acid sequence of SEQ ID NO: 36, wherein CDR-L1 comprises the amino acid sequence of SEQ ID NO: 52, wherein CDR-L2 comprises the amino acid sequence of SEQ ID NO: 68, and wherein CDR-L3 comprises the amino acid sequence of SEQ ID NO: 84.

In another embodiment, CDRH1 comprises the amino acid sequence of SEQ ID NO: 5, wherein CDR-H2 comprises the amino acid sequence of SEQ ID NO: 21 wherein CDR-H3 comprises the amino acid sequence of SEQ ID NO: 37, wherein CDR-L1 comprises the amino acid sequence of SEQ ID NO: 53, wherein CDR-L2 comprises the amino acid sequence of SEQ ID NO: 69, and wherein CDR-L3 comprises the amino acid sequence of SEQ ID NO: 85.

In another embodiment, CDRH1 comprises the amino acid sequence of SEQ ID NO: 6, wherein CDR-H2 comprises the amino acid sequence of SEQ ID NO: 22, wherein CDR-H3 comprises the amino acid sequence of SEQ ID NO: 38, wherein CDR-L1 comprises the amino acid sequence of SEQ ID NO: 54, wherein CDR-L2 comprises the amino acid sequence of SEQ ID NO: 70, and wherein CDR-L3 comprises the amino acid sequence of SEQ ID NO: 86.

In another embodiment, CDRH1 comprises the amino acid sequence of SEQ ID NO: 7, wherein CDR-H2 comprises the amino acid sequence of SEQ ID NO: 23, wherein CDR-H3 comprises the amino acid sequence of SEQ ID NO: 39, wherein CDR-L1 comprises the amino acid sequence of SEQ ID NO: 55, wherein CDR-L2 comprises the amino acid sequence of SEQ ID NO: 71, and wherein CDR-L3 comprises the amino acid sequence of SEQ ID NO: 87.

In another embodiment, CDRH1 comprises the amino acid sequence of SEQ ID NO: 8, wherein CDR-H2 comprises the amino acid sequence of SEQ ID NO: 24, wherein CDR-H3 comprises the amino acid sequence of SEQ ID NO: 40, wherein CDR-L1 comprises the amino acid sequence of SEQ ID NO: 56, wherein CDR-L2 comprises the amino acid sequence of SEQ ID NO: 72, and wherein CDR-L3 comprises the amino acid sequence of SEQ ID NO: 88.

In another embodiment, CDRH1 comprises the amino acid sequence of SEQ ID NO: 9, wherein CDR-H2 comprises the amino acid sequence of SEQ ID NO: 25, wherein CDR-H3 comprises the amino acid sequence of SEQ ID NO: 41, wherein CDR-L1 comprises the amino acid sequence of SEQ ID NO: 57, wherein CDR-L2 comprises the amino acid sequence of SEQ ID NO: 73, and wherein CDR-L3 comprises the amino acid sequence of SEQ ID NO: 89.

In another embodiment, CDRH1 comprises the amino acid sequence of SEQ ID NO: 10, wherein CDR-H2 comprises the amino acid sequence of SEQ ID NO: 26, wherein CDR-H3 comprises the amino acid sequence of SEQ ID NO: 42, wherein CDR-L1 comprises the amino acid sequence of SEQ ID NO: 58, wherein CDR-L2 comprises the amino acid sequence of SEQ ID NO: 74, and wherein CDR-L3 comprises the amino acid sequence of SEQ ID NO: 90.

In another embodiment, CDRH1 comprises the amino acid sequence of SEQ ID NO: 11, wherein CDR-H2 comprises the amino acid sequence of SEQ ID NO: 27, wherein CDR-H3 comprises the amino acid sequence of SEQ ID NO: 43, wherein CDR-L1 comprises the amino acid sequence of SEQ ID NO: 59, wherein CDR-L2 comprises the amino acid sequence of SEQ ID NO: 75, and wherein CDR-L3 comprises the amino acid sequence of SEQ ID NO: 91.

In another embodiment, CDRH1 comprises the amino acid sequence of SEQ ID NO: 12, wherein CDR-H2 comprises the amino acid sequence of SEQ ID NO: 28, wherein CDR-H3 comprises the amino acid sequence of SEQ ID NO: 44, wherein CDR-L1 comprises the amino acid sequence of SEQ ID NO: 60, wherein CDR-L2 comprises the amino acid sequence of SEQ ID NO: 76, and wherein CDR-L3 comprises the amino acid sequence of SEQ ID NO: 92.

In another embodiment, CDRH1 comprises the amino acid sequence of SEQ ID NO: 13, wherein CDR-H2 comprises the amino acid sequence of SEQ ID NO: 29, wherein CDR-H3 comprises the amino acid sequence of SEQ ID NO: 45, wherein CDR-L1 comprises the amino acid sequence of SEQ ID NO: 61, wherein CDR-L2 comprises the amino acid sequence of SEQ ID NO: 77, and wherein CDR-L3 comprises the amino acid sequence of SEQ ID NO: 93.

In another embodiment, CDRH1 comprises the amino acid sequence of SEQ ID NO: 14, wherein CDR-H2 comprises the amino acid sequence of SEQ ID NO: 30, wherein CDR-H3 comprises the amino acid sequence of SEQ ID NO: 46, wherein CDR-L1 comprises the amino acid sequence of SEQ ID NO: 62, wherein CDR-L2 comprises the amino acid sequence of SEQ ID NO: 78, and wherein CDR-L3 comprises the amino acid sequence of SEQ ID NO: 94.

In another embodiment, CDRH1 comprises the amino acid sequence of SEQ ID NO: 15, wherein CDR-H2 comprises the amino acid sequence of SEQ ID NO: 31, wherein CDR-H3 comprises the amino acid sequence of SEQ ID NO: 47, wherein CDR-L1 comprises the amino acid sequence of SEQ ID NO: 63, wherein CDR-L2 comprises the amino acid sequence of SEQ ID NO: 79, and wherein CDR-L3 comprises the amino acid sequence of SEQ ID NO: 95.

In another embodiment, CDRH1 comprises the amino acid sequence of SEQ ID NO: 16, wherein CDR-H2 comprises the amino acid sequence of SEQ ID NO: 32, wherein CDR-H3 comprises the amino acid sequence of SEQ ID NO: 48, wherein CDR-L1 comprises the amino acid sequence of SEQ ID NO: 64, wherein CDR-L2 comprises the amino acid sequence of SEQ ID NO: 80, and wherein CDR-L3 comprises the amino acid sequence of SEQ ID NO: 96.

According to a particular embodiment, the antibodies described herein comprises amino acid sequences which are at least 90% homologous/identical, at least 91% homologous/identical, at least 92% homologous/identical, least 93% homologous/identical, at least 94% homologous/identical, at least 95% homologous/identical, least 96% homologous/identical, at least 97% homologous/identical, at least 98% homologous/identical, at least 99% homologous/identical or even 100% homologous/identical to the sequences set forth in Tables 3 and 4 (wherein the CDR sequences of the antibody are always 100% identical to those provided herein above).

TABLE 3

Lists variable heavy chain domain (VH domain) amino acid sequences for each of the listed antibody clones, 3A3 to L4B8, from top to bottom. CDR sequences of the variable heavy chain domain sequences, as identified by Kabat, are indicated by underlining.

| Antibody | Variable Heavy (VH) Domain |
| --- | --- |
| 3A3 | EVQLLESGGGLVQPGGSLRLSCAASGFTFTSYDMDWVRQAPGKGLEWVSAINS NGDSTYYPDTVKDRFTISRDNSKNTLYLQMNSLRAEDTAVYYCARAQGQWLF HNWFDHWGQGTLVTVSS (SEQ ID NO: 97) |
| 3C7 | EVQLLESGGGLVQPGGSLRLSCAASGFTVSSYWMHWVRQAPGKGLEWVSSTT GSGGSTYYADSVKGRFTISRDNSKNTLYLQMNSLRAEDTAVYYCARGTSGWYG IDYWGQGTLVTVSS (SEQ ID NO: 98) |
| 3E12 | EVQLLESGGGLVQPGGSLRLSCAASGFTFSDHYMDWVRQAPGKGL EWVSAISGVGGSTYYADSVKGRFTISRDNSKNTLYLOMNSLRAEDT AVYYCAREDNSGSPDYWGQGTLVTVSS (SEQ ID NO: 99) |
| 3G3 | EVQLLESGGGLVQPGGSLRLSCAASGFTFNDYWMHWVRQAPGKGLEWVSALT GGGDTPWYPGSVKGRFTISRDNSKNTLYLQMNSLRAEDTAVYYCARVKVVPRS RETDAFDVWGQGTLVTVSS (SEQ ID NO: 100) |
| 3H4 | EVQLLESGGGLVQPGGSLRLSCAASGFTFRSYAVHWVRQAPGKGLE WVSSTEGSGVGTSYTDSVKGRFTISRDNSKNTLYLOMNSLRAEDTA VYYCARMLGGGNPLDYLDYWGQGTLVTVSS (SEQ ID NO: 101) |

TABLE 3-continued

Lists variable heavy chain domain (VH domain) amino acid sequences for each of the listed antibody clones, 3A3 to L4B8, from top to bottom. CDR sequences of the variable heavy chain domain sequences, as identified by Kabat, are indicated by underlining.

| Antibody | Variable Heavy (VH) Domain |
|---|---|
| 3H8 | EVQLLESGGGLVQPGGSLRLSCAASGFTFSSYGMHWVRQAPGKGLEWVSYISSS GSHTSFADSVKGRFTISRDNSKNTLYLQMNSLRAEDTAVYYCARDGLFGIDYW GQGTLVTVSS (SEQ ID NO: 102) |
| L4D10 | EVQLLESGGGLVQPGGSLRLSCAASGFTFRSYGMHWVRQAPGKGLEWVSSISPT TNYRSYADSLRGRFTISRDNSKNTLYLQMNSLRAEDTAVYYCARGHRDRSGSP VGYLDYWGQGTLVTVSS (SEQ ID NO: 103) |
| L4G11 | EVQLLESGGGLVQPGGSLRLSCAASGFTVRNNYMSWVRQAPGKGLEWVSGLS GFGRGAHYSDSVKGRFTISRDNSKNTLYLQMNSLRAEDTAVYYCARGAVGYLQ WFPDVWGQGTLVTVSS (SEQ ID NO: 104) |
| 3B7CorrC3 | EVQLLESGGGLVQPGGSLRLSCAASGFTFTDYYMSWVRQAPGKRLEWVSAISD SGGMTYYADSVRGRFTISRDNSKNTLYLQMNSLKAEDTAVYYCAREPLGDHGD LRPDFDYWGQGTLVTVSS (SEQ ID NO: 105) |
| 3A9CorrC6 | EVQLLESGGGLVQPGGSLRLSCAASGFTFSPYAMSWVRQAPGKGLEWVSVIFTS GTTNYADSVKGRFTISRDNSKNTLYLQMNSLRAEDTAVYYCARELRRPGDGVP AATSDYWGQGTLVTVSS (SEQ ID NO: 106) |
| 3G1CorrC10 | EVQLLESGGGLVQPGGSLRLSCAASGFTFSNHAMSWVRQAPGKGLEWVSSISAS GGSTYYADSVKGRFTISRDNSKNTLYLQMNSLRAEDTAVYYCARAESGYQLDY WGQGTLVTVSS (SEQ ID NO: 107) |
| 3E2CorrG9 | EVQLLESGGGLVQPGGSLRLSCAASGFTFGDFAMSWVRQAPGKGLEWVSSISSN SSYIYYADSVKGRFTISRDNSKNTLYLQMNSLRAEDTAVYYCARGRVYGDFGK FDSWGQGTLVTVSS (SEQ ID NO: 108) |
| L4D8 | EVQLLESGGGLVQPGGSLRLSCAASGFTFTDYYMSWVRQAPGKGLEWVSSISSS SSYIYYADSVKGRFTISRDNSKNTLYLQMNSLRAEDTAVYYCARGGDYDAFDI WGQGTLVTVSS (SEQ ID NO: 109) |
| L4F8 | EVQLLESGGGLVQPGGSLRLSCAASGFTFTDYYMNWVRQAPGKGLEWVSRITN DGMSTAYADFVKGRFTISRDNSKNTLYLQMNSLRAEDTAVYYCARSPLEEGRIT FRYWYFDLWGQGTLVTVSS ISEQ ID NO: 110) |
| L4E6 | EVQLLESGGGLVQPGGSLRLSCAASGFTFSNFVMNWVRQAPGKGLEWVSRINT DGTSTNYADSVTGRFTISRDNSKNTLYLQMNSLRAEDTAVYYCARDYPLRRLM YYYYGMDVWGQGTLVTVSS ISEQ ID NO: 111) |
| L4B8 | EVQLLESGGGLVQPGGSLRLPCAASGFTVGLYNINWVRQAPGKGLAWVSTISGS GLNTYYSDPVKGRFTISRDNSKNTLYLQMNSLRAEDTAVYYCARDEDTYAFNW GQGTLVTVSS (SEQ ID NO: 112) |

TABLE 4

Lists variable light chain domain (VL domain) amino acid sequences for each of the listed antibody clones, 3A3 to L4B8, from top to bottom. CDR sequences of the variable light chain domain sequences, as identified by Kabat, are indicated by underlining.

| Antibody | Variable Light (VL) Domain |
|---|---|
| 3A3 (Lambda) | QSVLTQPPSASGTPGQRVTISCSGGNSNIGDHYVSWYQQLPGTAPKLLIYGDTH RPSGVPDRFSGSKSGTSASLAISGLRSEDEADYYCGTWDSSLSAGVFGGGTKVT VL (SEQ ID NO: 113) |
| 3C7 (Lambda) | QSVLTQPPSASGTPGQRVTISCSGSSSNIGNNHVSWYQQLPGTAPKLLIYCNNN RPSGVPDRFSGSKSGTSASLAISGLRSEDEADYYCQVWDSSRDQGVFGGGTQV TVL (SEQ ID NO: 114) |
| 3E12 (Kappa) | DIVLTQSPGTLSLSPGERATLSCRASQSVGSNLAWYQQKPGQAPRL LIYGASSRATGIPDRESGSGSGTDFTLTISRLEPEDFAVYYCQRYDGS PYTFGQGTKVDIK (SEQ ID NO: 115) |
| 3G3 (Lamda) | QSVLTQPPSASGTPGQRVTISCTGGPPNIGNNAVFWYQQLPGKAPKLLIYELTK RPSGVPDRFSGSKSGTSASLAISGLRSEDEADYYCSSYTRVSTPVFGGGTQVTV L (SEQ ID NO: 116) |

TABLE 4-continued

Lists variable light chain domain (VL domain) amino acid sequences for each of the listed antibody clones, 3A3 to L4B8, from top to bottom. CDR sequences of the variable light chain domain sequences, as identified by Kabat, are indicated by underlining.

| Antibody | Variable Light (VL) Domain |
|---|---|
| 3H4 (Lambda) | QSVLTQPPSASGTPGQRVTISCSGSSSNLGEGYDVHWYQQLPGKAP KLLIYYSDFRPSGVSDRFSGSKSGTSASLAISGLQSEDEADYYCAAW DDSLSSQVFGGGTQVTVL (SEQ ID NO: 117) |
| 3H8 (Lambda) | DIVLTQSPGTLSLSPGERATLSCRASQSISSNLAWYQQKPGQAPRLLIYGASSRA TGIPDRFSGSGSGTDFTLTISRLEPEDFAVYYCQQRDWPPFTFGQGTKLEIK (SEQ ID NO: 118) |
| L4D10 (Lambda) | QSVLTQPPSASGTPGQRVTISCTGSSSNIGRNSVNWYQQLPGTAPKLLIYSNHHR PSGVPDRFSGSKSGTSASLAISGLRSEDEADYYCSSYAGSNKYVFGTGTQVTVL (SEQ ID NO: 119) |
| L4G11 (Lambda) | QSVLTQPPSASGTPGQRVTISCSGGRSNIGSNTVNWYQQLPGKAPKLLIYGNSN RPSGVPDRFSGSKSGTSASLAISGLRSEDEADYYCCSHARGDTLIFGVGTKLTVL (SEQ ID NO: 120) |
| 3B7CorrC3 (Lambda) | QSVLTQPPSASGTPGQRVTISCSGGSSNIGSQTVLWYQQLPGTAPKLLIYDNNK RPSGVPDRFSGSKSGTSASLAISGLRSEDEADYYCASWDDSLSGGVFGGGTKVT VL (SEQ ID NO: 121) |
| 3A9CorrC6 (Lambda) | QSVLTQPPSASGTPGQRVTISCSGSTSNIGRNYVCWYQQLPGKAPKLLIYANNN RPSGVPDRFSGSKSGTSASLAISGLRSEDEADYYCSSYTSSSTLVFGGGTQLTVL (SEQ ID NO: 122) |
| 3G1CorrC10 (Kappa) | DIVLTQSPGTLSLSPGERATLSCRASQSVSSSYLAWYQQKPGQAPRLLIYGVSN RATGIPDRFSGSGSGTDFTLTISRLEPEDFAVYYCQQSYSTPYTFGPGTKLDIK (SEQ ID NO: 123) |
| 3E2CorrG9 (Kappa) | DIVLTQSPGTLSLSPGERATLSCTASQSVGRYLAWYQQKPGQAPRLLIYGASSR ATGIPDRFSGSGSGTDFTLTISRLEPEDFAVYYCQQYGSSLTFGGGTKLDIK (SEQ ID NO: 124) |
| L4D8 (Kappa) | QSVLTQPPSASGTPGQRVTISCSGRSSNVGSNSVNWYQQLPGTAPKLLIYTNDQ RPSGVSDRFSGSKSGTSASLAISGLLSEDEADYYCSSYTSSSTRVFGTGTKLTVL (SEQ ID NO: 125) |
| L4F8 (Kappa) | DIVLTQSPGTLSLSPGERATLSCRASQSVSSNLAWYQQKPGQAPRLLIYDASNR ATGIPDRFSGSGSGTDFTLTISRLEPEDFAVYYCQQGDSYPYTFGQGTKLEIK (SEQ ID NO: 126) |
| L4E6 (Kappa) | DIVLTQSPGTLSLSPGERATLSCRASQTISSNLAWYQQKPGQAPRLLIYGASSRA TGIPDRFSGSGSGTDFTLTISRLEPEDFAVYYCQQYSWSPRVYSFGQGTKLEIK (SEQ ID NO: 127) |
| L4B8 (Kappa) | DIVLTQSPGTLSLSPGERATLSCRASQSVSSSYLAWYQQKPGQAPRLLIYGASTR APGIPDRFSGSGSGTDFTLTISRLEPEDFAVYYCHQRGSGDTFGPGTKVEIK (SEQ ID NO: 128) |

The antibodies described herein are able to specifically bind to human semaphorin 3A. As shown in the drawings and examples herein, they also bind rat semaphorin 3A.

According to one embodiment the dissociation constant ($K_D$) from a Sema3A protein is no higher than $10^{-7}$ M; no higher than $10^{-8}$ M; no higher than $10^{-9}$ M; no higher than $10^{-10}$ M; no higher than $10^{-11}$ M; no higher than $10^{-12}$ M; or even no higher than $10^{-13}$ M. In another embodiment, the antibody has an on rate to a Sema3A protein of at least $10^2 M^{-1}s^{-1}$; at least $10^3 M^{-1}s^{-1}$; at least $10^4 M^{-1}s^{-1}$; at least $10^5 M^{-1}s^{-1}$; and at least $10^6 M^{-1}s^{-1}$. In another embodiment, the antibody has an off rate from a Sema3A protein of at most about $10^{-3}s^{-1}$; at most about $10^{-4}s^{-1}$; at most about $10^{-5}s^{-1}$; and at most about $10^{-6}s^{-1}$.

Semaphorin 3 (also abbreviated "Sema3A") is a protein, which in humans is encoded by the SEMA3A gene (Gene ID: 10371). Sema3A is a member of the semaphorin family and encodes a protein with an Ig-like C2-type (immunoglobulin-like) domain, a PSI domain and a Sema domain. This secreted protein can function as either a chemorepulsive agent, inhibiting axonal outgrowth, or as a chemoattractive agent, stimulating the growth of apical dendrites. In both cases, the protein is vital for normal neuronal pattern development. Increased expression of this protein is associated with schizophrenia and is seen in a variety of human tumor cell lines. Also, aberrant release of this protein is associated with the progression of Alzheimer's disease. Typically, Sema3A is secreted by neurons and surrounding tissue to guide migrating cells and axons in the developing nervous system.

Human semaphorin 3A (Sema3A): (according to NCBI: ncbi(dot)nlm(dot)nih(dot)gov/protein/NP_006071.1) has an amino acid sequence as set forth in SEQ ID NO: 135.

The antibodies described herein may also bind a non-human Sema3A protein such as, for example, a murine Sema3A protein having a sequence as set forth in UniProtKB 008665; a canine Sema3A protein having a sequence as set forth in UniProtKB E2QX94, a bovine Sema3A protein having a sequence as set forth in UniProtKB F1MEW1, a rat Sema3A protein having a sequence as set forth in UniProtKB Q63548, a chicken Sema3A protein having a sequence as set forth in UniProtKB F1NVZ5, a pig Sema3A protein having a sequence as set forth in UniProtKB I3LPP7, or a horse Sema3A protein having a sequence as set forth in UniProtKB F6RIR4.

According to a particular embodiment, the antibodies described herein specifically bind the amino acid sequence CSVPGPNGIDTHFDELQDVF (SEQ ID NO: 137) of the Sema3A protein.

As used herein the term "antibody", refers to an intact antibody molecule and the phrase "antibody fragment" refers to a functional fragment thereof, such as Fab, F(ab')2, and Fv that are capable of binding to macrophages. These functional antibody fragments are defined as follows: (i) Fab, the fragment which contains a monovalent antigen-binding fragment of an antibody molecule, can be produced by digestion of whole antibody with the enzyme papain to yield an intact light chain and a portion of one heavy chain; (ii) Fab', the fragment of an antibody molecule that can be obtained by treating whole antibody with pepsin, followed by reduction, to yield an intact light chain and a portion of the heavy chain; two Fab' fragments are obtained per antibody molecule; (iii) (Fab')$_2$, the fragment of the antibody that can be obtained by treating whole antibody with the enzyme pepsin without subsequent reduction; F(ab')2 is a dimer of two Fab' fragments held together by two disulfide bonds; (iv) Fv, defined as a genetically engineered fragment containing the variable region of the light chain and the variable region of the heavy chain expressed as two chains; (v) Single chain antibody ("SCA or scFv"), a genetically engineered molecule containing the variable region of the light chain and the variable region of the heavy chain, linked by a suitable polypeptide linker as a genetically fused single chain molecule; and (vi) Peptides coding for a single complementarity-determining region (CDR).

As used herein, the terms "complementarity-determining region" or "CDR" are used interchangeably to refer to the antigen binding regions found within the variable region of the heavy and light chain polypeptides. Generally, antibodies comprise three CDRs in each of the VH (CDR HI or HI; CDR H2 or H2; and CDR H3 or H3) and three in each of the VL (CDR LI or LI; CDR L2 or L2; and CDR L3 or L3).

The identity of the amino acid residues in a particular antibody that make up a variable region or a CDR can be determined using methods well known in the art and include methods such as sequence variability as defined by Kabat et al. (See. e.g., Kabat et al., 1992, Sequences of Proteins of Immunological Interest, 5th ed., Public Health Service, NIH, Washington D.C.), location of the structural loop regions as defined by Chothia et al. (see, e.g., Chothia et al., Nature 342:877-883, 1989), a compromise between Kabat and Chothia using Oxford Molecular's AbM antibody modeling software (now Accelrys®, see, Martin et al., 1989, Proc. Natl Acad Sci USA. 86:9268; and world wide web site www(dot)bioinf-org(dot)uk/abs), available complex crystal structures as defined by the contact definition (see MacCallum et al., J. Mol. Biol. 262:732-745, 1996) and the "conformational definition" (see, e.g., Makabe et al., Journal of Biological Chemistry, 283:1156-1166, 2008).

As used herein, the "variable regions" and "CDRs" may refer to variable regions and CDRs defined by any approach known in the art, including combinations of approaches.

Methods of generating antibodies (i.e., monoclonal and polyclonal) are well known in the art. Antibodies may be generated via any one of several methods known in the art, which methods can employ induction of in vivo production of antibody molecules, screening immunoglobulin libraries or panels of highly specific binding reagents as disclosed [Orlandi D. R. et al. (1989) Proc. Natl. Acad. Sci. 86:3833-3837, Winter G. et al. (1991) Nature 349:293-299] or generation of monoclonal antibody molecules by continuous cell lines in culture. These include but are not limited to, the hybridoma technique, the human B-cell hybridoma technique, and the Epstein-Bar-Virus (EBV)-hybridoma technique [Kohler G., et al. (1975) Nature 256:495-497, Kozbor D., et al. (1985) J. Immunol. Methods 81:31-42, Cote R. J. et al. (1983) Proc. Natl. Acad. Sci. 80:2026-2030, Cole S. P. et al. (1984) Mol. Cell. Biol. 62:109-120].

In cases where the invention compounds are too small to elicit a strong immunogenic response, such antigens (haptens) can be coupled to antigenically neutral carriers such as keyhole limpet hemocyanin (KLH) or serum albumin [e.g., bovine serum albumin (BSA)] carriers (see U.S. Pat. Nos. 5,189,178 and 5,239,078). Coupling to carrier can be effected using methods well known in the art; For example, direct coupling to amino groups can be effected and optionally followed by reduction of imino linkage formed. Alternatively, the carrier can be coupled using condensing agents such as dicyclohexyl carbodiimide or other carbodiimide dehydrating agents. Linker compounds can also be used to effect the coupling; both homobifunctional and heterobifunctional linkers are available from Pierce Chemical Company, Rockford, Ill. The resulting immunogenic complex can then be injected into suitable mammalian subjects such as mice, rabbits, and the like. Suitable protocols involve repeated injection of the immunogen in the presence of adjuvants according to a schedule which boosts production of antibodies in the serum. The titers of the immune serum can readily be measured using immunoassay procedures which are well known in the art.

The antisera obtained can be used directly or monoclonal antibodies may be obtained as described hereinabove.

Antibody fragments can be obtained using methods well known in the art. (See for example, Harlow and Lane, Antibodies: A Laboratory Manual, Cold Spring Harbor Laboratory, New York, 1988, incorporated herein by reference). For example, antibody fragments according to the present invention can be prepared by proteolytic hydrolysis of the antibody or by expression in *E. coli* or mammalian cells (e.g. Chinese hamster ovary cell culture or other protein expression systems) of DNA encoding the fragment.

Alternatively, antibody fragments can be obtained by pepsin or papain digestion of whole antibodies by conventional methods. For example, antibody fragments can be produced by enzymatic cleavage of antibodies with pepsin to provide a 5S fragment denoted F(ab')$_2$. This fragment can be further cleaved using a thiol reducing agent, and optionally a blocking group for the sulfhydryl groups resulting from cleavage of disulfide linkages, to produce 3.5S Fab' monovalent fragments. Alternatively, an enzymatic cleavage using pepsin produces two monovalent Fab' fragments and an Fc fragment directly. These methods are described, for example, by Goldenberg, U.S. Pat. Nos. 4,036,945 and 4,331,647, and references contained therein, which patents are hereby incorporated by reference in their entirety. See also Porter, R. R., Biochem. J., 73: 119-126, 1959. Other methods of cleaving antibodies, such as separation of heavy chains to form monovalent light-heavy chain fragments, further cleavage of fragments, or other enzymatic, chemical, or genetic techniques may also be used, so long as the fragments bind to the antigen that is recognized by the intact antibody.

Fv fragments comprise an association of $V_H$ and $V_L$ chains. This association may be noncovalent, as described in Inbar et al., Proc. Nat'l Acad. Sci. USA 69:2659-62, 1972. Alternatively, the variable chains can be linked by an intermolecular disulfide bond or cross-linked by chemicals such as glutaraldehyde. Preferably, the Fv fragments comprise $V_H$ and $V_L$ chains connected by a peptide linker. These single-chain antigen binding proteins (scFv) are prepared by constructing a structural gene comprising DNA sequences encoding the $V_H$ and $V_L$ domains connected by an oligonucleotide. The structural gene is inserted into an expression vector, which is subsequently introduced into a host cell such as E. coli. The recombinant host cells synthesize a single polypeptide chain with a linker peptide bridging the two V domains. Methods for producing scFvs are described, for example, by Whitlow and Filpula, Methods, 2: 97-105, 1991; Bird et al., Science 242:423-426, 1988; Pack et al., Bio/Technology 11:1271-77, 1993; and Ladner et al., U.S. Pat. No. 4,946,778.

CDR peptides ("minimal recognition units") can be obtained by constructing genes encoding the CDR of an antibody of interest. Such genes are prepared, for example, by using the polymerase chain reaction to synthesize the variable region from RNA of antibody-producing cells. See, for example, Larrick and Fry, Methods, 2: 106-10, 1991.

In one embodiment, the antibody has a dissociation constant ($K_D$) from a Sema3A protein selected from the group consisting of at most about $10^{-7}$ M; at most about $10^{-8}$ M; at most about $10^{-9}$ M; at most about $10^{-10}$ M; at most about $10^{-11}$ M; at most about $10^{-12}$ M; and at most about $10^{-13}$ M. In another embodiment, the antibody has an on rate to a Sema3A protein selected from the group consisting of at least about $10^2 M^{-1} s^{-1}$; at least about $10^3 M^{-1} s^{-1}$; at least about $10^4 M^{-1} s^{-1}$; at least about $10^5 M^{-1} s^{-1}$; and at least about $10^6 M^{-1} s^{-1}$. In another embodiment, the antibody has an off rate from a Sema3A protein selected from the group consisting of: at most about $10^{-3} s^{-1}$; at most about $10^{-4} s^{-1}$; at most about $10^{-5} s^{-1}$; and at most about $10^{-6} s^{-1}$.

The affinity and binding kinetics of the anti-Sema3A antibody can be tested using any suitable method including but not limited to biosensor technology (e.g., OCTET or BIACORE).

In one embodiment, provided herein is the antibody described herein, wherein the antibody further comprises a CH1 domain of a heavy chain constant domain selected from the group consisting of IgG, IgG1, IgG2, IgG2A, IgG2B, IgG2C, IgG3, IgG4, IgA1, IgA2, IgD, IgM, and IgE constant domains. In another embodiment, the CH1 domain comprises an amino acid sequence that is at least 90% identical to the amino acid sequence set forth in SEQ ID NO: 130. In another embodiment, the CH1 domain comprises the amino acid sequence set forth in SEQ ID NO: 130.

In one embodiment, provided herein is the antibody described herein, wherein the antibody further comprises a heavy chain constant domain selected from the group consisting of IgG, IgG1, IgG2, IgG2A, IgG2B, IgG2C, IgG3, IgG4, IgA1, IgA2, IgD, IgM, and IgE constant domains. In another embodiment, the antibody further comprises a heavy chain constant domain selected from the group consisting of human IgG, human IgG1, human IgG2, human IgG2A, human IgG2B, human IgG2C, human IgG3, human IgG4, human IgA1, human IgA2, human IgD, human IgM, and human IgE constant domains. In another embodiment, the antibody further comprises a human IgG heavy chain constant domain. In another embodiment, the human IgG heavy chain constant domain comprises an amino acid sequence that is at least 90% identical to the amino acid sequence set forth in SEQ ID NO. 129. In another embodiment, the human IgG heavy chain constant domain comprises the amino acid sequence set forth in SEQ ID NO. 129.

In one embodiment, provided herein is an antibody described herein, that further comprises a light chain immunoglobulin constant domain, wherein the light chain constant domain is an Ig kappa constant domain. In another embodiment, the Ig kappa constant domain is a human Ig kappa constant domain. In another embodiment, the Ig kappa constant domain comprises an amino acid sequence that is at least 90% identical to the amino acid sequence set forth in SEQ ID NO: 130. In another embodiment, the Ig kappa constant domain comprises the amino acid sequence set forth in SEQ ID NO: 130.

In one embodiment, provided herein is an antibody described herein, that further comprises a light chain immunoglobulin constant domain, wherein the light chain constant domain is an Ig lambda constant domain. In another embodiment, the Ig lambda constant domain is a human Ig lambda constant domain. In another embodiment, the Ig lambda constant domain comprises an amino acid sequence that is at least 90% identical to the amino acid sequence set forth in SEQ ID NO: 132. In another embodiment, the Ig lambda constant domain comprises the amino acid sequence set forth in SEQ ID NO: 132.

In one embodiment, the antibody is isolated.

An "isolated antibody", as used herein, refers to an antibody that is substantially free of other antibodies having different antigenic specificities (e.g., an isolated antibody that specifically binds Sema3A is substantially free of antibodies that specifically bind antigens other than Sema3A). An isolated antibody that specifically binds Sema3A complex may, however, have cross-reactivity to other antigens, such as Sema3A molecules from other species. Moreover, an isolated antibody may be substantially free of other cellular material and/or chemicals.

The antibodies described herein may have variable and constant regions derived from human germline immunoglobulin sequences.

Antibodies with reduced fucose content have been reported to have an increased affinity for Fc receptors, such as, e.g., FcγRIIIa. Accordingly, in certain embodiments, the anti-Sema3A antibodies or antigen-binding fragments thereof described herein have reduced fucose content or no fucose content. Such antibodies can be produced using techniques known to one skilled in the art. For example, the antibodies can be expressed in cells deficient or lacking the ability of fucosylation. In a specific example, cell lines with a knockout of both alleles of α1,6-fucosyltransferase can be used to produce antibodies with reduced fucose content. The Potelligent R™ system (Lonza) is an example of such a system that can be used to produce antibodies with reduced fucose content. Alternatively, antibodies or antigen-binding fragments with reduced fucose content or no fucose content can be produced by, e.g.: (i) culturing cells under conditions which prevent or reduce fucosylation; (ii) posttranslational removal of fucose (e.g., with a fucosidase enzyme); (iii) post-translational addition of the desired carbohydrate, e.g., after recombinant expression of a non-glycosylated glycoprotein; or (iv) purification of the glycoprotein so as to select for antibodies or antigen-binding fragments thereof which are not fucsoylated. See, e.g., Longmore G D & Schachter H (1982) Carbohydr Res 100: 365-92 and Imai-Nishiya H et al., (2007) BMC Biotechnol. 7: 84 for methods for producing antibodies or antigen-binding fragments thereof with no fucose content or reduced fucose content.

In some embodiments, anti-Sema3A antibodies or antigen-binding fragments thereof described herein have an increased affinity for CD32B (also known as FcγRIIB or FCGR2B), e.g., as compared to an antibody with a wild-type Fc region, e.g., an IgG1 Fc. In some embodiments, anti-Sema3A antibodies or antigen-binding fragments thereof described herein have a selectively increased affinity for CD32B (FcγRIIB) over both CD32A (FcγRIIA) and CD16 (FcγRIIIA) Sequence alterations that result in increased affinity for CD32B are provided, for example, in Mimoto et al., *Protein Engineering, Design & Selection* 10: 589-598 (2013), Chu et al., Molecular Immunology 45: 3926-3933 (2008), and Strohl, Current Opinion in Biology 20: 685-691 (2009), each of which is herein incorporated by reference in its entirety. In some embodiments, the antibody or antigen-binding fragment with an increased affinity for CD32B comprises a heavy chain constant region, e.g., an IgG1 constant region, or fragment thereof comprising a mutation selected from the group consisting of: G236D, P238D, S239D, S267E, L328F, L328E, an arginine inserted after position 236, and combinations thereof, numbered according to EU index (Kabat et al., Sequences of Proteins of Immunological Interest, U.S. Department of Health and Human Services, Bethesda (1991)). In some embodiments, the antibody or antigen-binding fragment with an increased affinity for CD32B comprises a heavy chain constant region, e.g., an IgG1 constant region, or fragment thereof comprising S267E and L328F substitutions. In some embodiments, the antibody or antigen-binding fragment with an increased affinity for CD32B comprises a heavy chain constant region, e.g., an IgG1 constant region, or fragment thereof comprising P238D and L328E substitutions. In some embodiments, the antibody or antigen-binding fragment with an increased affinity for CD32B comprises a heavy chain constant region, e.g., an IgG1 constant region, or fragment thereof comprising a P238D substitution and substitution selected from the group consisting of E233D, G237D, H268D, P271G, A330R, and combinations thereof. In some embodiments, the antibody or antigen-binding fragment with an increased affinity for CD32B comprises a heavy chain constant region, e.g., an IgG1 constant region, or fragment thereof comprising P238D, E233D, G237D, H268D, P271G, and A330R substitutions. In some embodiments, the antibody or antigen-binding fragment with an increased affinity for CD32B comprises a heavy chain constant region, e.g., an IgG1 constant region, or fragment thereof comprising G236D and S267E. In some embodiments, the antibody or antigen-binding fragment with an increased affinity for CD32B comprises a heavy chain constant region, e.g., an IgG1 constant region, or fragment thereof comprising S239D and S267E. In some embodiments, the antibody or antigen-binding fragment with an increased affinity for CD32B comprises a heavy chain constant region, e.g., an IgG1 constant region, or fragment thereof comprising S267E and L328F. In some embodiments, the antibody or antigen-binding fragment with an increased affinity for CD32B comprises a heavy chain constant region, e.g., an IgG1 constant region, or fragment thereof comprising an arginine inserted after position 236 and L328R.

In some embodiments, the heavy and/or light chain variable domain(s) sequence(s) of the antibodies provided herein can be used to generate, for example, CDR-grafted, chimeric, humanized, or composite human antibodies or antigen-binding fragments, as described elsewhere herein. As understood by one of ordinary skill in the art, any variant, CDR-grafted, chimeric, humanized, or composite antibodies or antigen-binding fragments derived from any of the antibodies provided herein may be useful in the compositions and methods described herein and will maintain the ability to immunospecifically bind Sema3A, such that the variant, CDR-grafted, chimeric, humanized, or composite antibody or antigen-binding fragment thereof has at least 50%, at least 60%, at least 70%, at least 80%, at least 90%, at least 95% or more binding to Sema3A relative to the original antibody from which it is derived.

In some embodiments, the antibodies provided herein comprise mutations that confer desirable properties to the antibodies. For example, to avoid potential complications due to Fab-arm exchange, which is known to occur with native IgG4 mAbs, the antibodies provided herein may comprise a stabilizing 'Adair' mutation (Angal S., et al., "A single amino acid substitution abolishes the heterogeneity of chimeric mouse/human (IgG4) antibody," Mol Immunol 30, 105-108; 1993), where serine 228 (EU numbering; residue 241 Kabat numbering) is converted to proline resulting in an IgG1-like (CPPCP (SEQ ID NO: 134)) hinge sequence. Accordingly, any of the antibodies may include a stabilizing 'Adair' mutation or the amino acid sequence CPPCP (SEQ ID NO: 134).

In another embodiment, the antibodies described herein are recombinant antibodies.

The term "recombinant antibody", as used herein refers to an antibody that is expressed using a recombinant expression vector transfected into a host cell, antibodies isolated from a recombinant, combinatorial human antibody library (Hoogenboom H. R., (1997) *TIB Tech.* 15:62-70; Azzazy H., and Highsmith W. E., (2002) *Clin. Biochem.* 35:425-445; Gavilondo J. V., and Larrick J. W. (2002) BioTechniques 29:128-145; Hoogenboom H., and Chames P. (2000) *Immunology Today* 21:371-378), antibodies isolated from an animal (e.g., a mouse) that is transgenic for human immunoglobulin genes (see, e.g., Taylor, L. D., et al. (1992) *Nucl. Acids Res.* 20:6287-6295; Kellermann S-A., and Green L. L. (2002) *Current Opinion in Biotechnology* 13:593-597; Little M. et al. (2000) Immunology Today 21:364-370) or antibodies prepared, expressed, created or isolated by any other means that involves splicing of human immunoglobulin gene sequences to other DNA sequences. Such recombinant human antibodies have variable and constant regions derived from human germline immunoglobulin sequences. In certain embodiments, however, such recombinant human antibodies are subjected to in vitro mutagenesis (or, when an animal transgenic for human Ig sequences is used, in vivo somatic mutagenesis) and thus the amino acid sequences of the VH and VL regions of the recombinant antibodies are sequences that, while derived from and related to human germline VH and VL sequences, may not naturally exist within the human antibody germline repertoire in vivo. One embodiment of the disclosure provides fully human antibodies capable of binding human Sema3A which can be generated using techniques well known in the art, such as, but not limited to, using human Ig phage libraries such as those disclosed in Jermutus et al., PCT publication No. WO 2005/007699 A2.

Thus, according to another aspect of the present invention there is provided an isolated polynucleotide encoding at least one CDR amino acid sequence selected from the group consisting of SEQ ID NOs: 53, 69, 85, 5, 21 and 37. The polynucleotide may encode the CDRs of the light chain (e.g. SEQ ID NOs: 53, 69 and 85) and/or CDRs of the heavy chain (e.g. SEQ ID NOs: 5, 21 and 37). Optionally, the polynucleotide may encode each of the CDRs of the antibody. The polynucleotide may further encode sequences which encode for the antibody backbone (e.g. IgG1, 2, 3, or 4). The backbone may comprise human sequences.

Polynucleotides encoding the CDRs of the additional antibodies disclosed in Tables 1 and 2 are also contemplated.

The polynucleotide of some embodiments of the invention can be used, preferably cloned into a nucleic acid construct of some embodiments of the invention, for genetically directing the production of the antibodies or antibody chains in the transformed host cell of some embodiments of the invention.

The polynucleotide of some embodiments of the invention can be introduced into host cells by any one of a variety of known methods within the art. Such methods can be found generally described in Sambrook et al., [Molecular Cloning: A Laboratory Manual, Cold Springs Harbor Laboratory, New York (1989, 1992)]; Ausubel et al., [Current Protocols in Molecular Biology, John Wiley and Sons, Baltimore, Maryland (1989)]; Chang et al., [Somatic Gene Therapy, CRC Press, Ann Arbor, MI (1995)]; Vega et al., [Gene Targeting, CRC Press, Ann Arbor MI (1995)]; Vectors [A Survey of Molecular Cloning Vectors and Their Uses, Butterworths, Boston MA (1988)] and Gilboa et al. [Biotechniques 4 (6): 504-512 (1986)] and include, for example, stable or transient transfection, lipofection, electroporation and infection with recombinant viral vectors.

Host cells may be a prokaryotic or eukaryotic cell. The polynucleotide or vector which is present in the host cell may either be integrated into the genome of the host cell or it may be maintained extrachromosomally. The host cell can be any prokaryotic or eukaryotic cell, such as a bacterial, insect, fungal, plant, animal or human cell. In some embodiments, fungal cells are, for example, those of the genus *Saccharomyces*, in particular those of the species *S. cerevisiae*. The term "prokaryotic" includes all bacteria which can be transformed or transfected with a DNA or RNA molecules for the expression of an antibody or the corresponding immunoglobulin chains. Prokaryotic hosts may include gram negative as well as gram positive bacteria such as, for example, *E. coli*, *S. typhimurium*, *Serratia marcescens* and *Bacillus subtilis*. The term "eukaryotic" includes yeast, higher plants, insects and vertebrate cells, e.g., mammalian cells, such as NSO, CHO and HEK293 cells. Depending upon the host employed in a recombinant production procedure, the antibodies or immunoglobulin chains encoded by the polynucleotide may be glycosylated or may be non-glycosylated. Antibodies or the corresponding immunoglobulin chains may also include an initial methionine amino acid residue.

According to some embodiments of the invention, the antibody may be conjugated to a functional moiety (also referred to as an "immunoconjugate") such as a detectable or a therapeutic moiety. The immunoconjugate molecule can be an isolated molecule such as a soluble and/or a synthetic molecule.

Various types of detectable or reporter moieties may be conjugated to the antibody of the invention. These include, but not are limited to, a radioactive isotope (such as [125] iodine), a phosphorescent chemical, a chemiluminescent chemical, a fluorescent chemical (fluorophore), an enzyme, a fluorescent polypeptide, an affinity tag, and molecules (contrast agents) detectable by Positron Emission Tomography (PET) or Magnetic Resonance Imaging (MRI).

Examples of suitable fluorophores include, but are not limited to, phycoerythrin (PE), fluorescein isothiocyanate (FITC), Cy-chrome, rhodamine, green fluorescent protein (GFP), blue fluorescent protein (BFP), Texas red, PE-Cy5, and the like. For additional guidance regarding fluorophore selection, methods of linking fluorophores to various types of molecules see Richard P. Haugland, "Molecular Probes: Handbook of Fluorescent Probes and Research Chemicals 1992-1994", 5th ed., Molecular Probes, Inc. (1994); U.S. Pat. No. 6,037,137 to Oncoimmunin Inc.; Hermanson, "Bioconjugate Techniques", Academic Press New York, N.Y. (1995); Kay M. et al., 1995. Biochemistry 34:293; Stubbs et al., 1996. Biochemistry 35:937; Gakamsky D. et al., "Evaluating Receptor Stoichiometry by Fluorescence Resonance Energy Transfer," in "Receptors: A Practical Approach," 2nd ed., Stanford C. and Horton R. (eds.), Oxford University Press, U K. (2001); U.S. Pat. No. 6,350,466 to Targesome, Inc.]. Fluorescence detection methods which can be used to detect the antibody when conjugated to a fluorescent detectable moiety include, for example, fluorescence activated flow cytometry (FACS), immunofluorescence confocal microscopy, fluorescence in-situ hybridization (FISH) and fluorescence resonance energy transfer (FRET).

Numerous types of enzymes may be attached to the antibody of the invention [e.g., horseradish peroxidase (HPR), beta-galactosidase, and alkaline phosphatase (AP)] and detection of enzyme-conjugated antibodies can be performed using ELISA (e.g., in solution), enzyme-linked immunohistochemical assay (e.g., in a fixed tissue), enzyme-linked chemiluminescence assay (e.g., in an electrophoretically separated protein mixture) or other methods known in the art [see e.g., Khatkhatay M I. and Desai M., 1999. J Immunoassay 20:151-83; Wisdom G B., 1994. Methods Mol Biol. 32:433-40; Ishikawa E. et al., 1983. J Immunoassay 4:209-327; Oellerich M., 1980. J Clin Chem Clin Biochem. 18:197-208; Schuurs A H. and van Weemen B K., 1980. J Immunoassay 1:229-49).

The affinity tag (or a member of a binding pair) can be an antigen identifiable by a corresponding antibody [e.g., digoxigenin (DIG) which is identified by an anti-DIG antibody) or a molecule having a high affinity towards the tag [e.g., streptavidin and biotin]. The antibody or the molecule which binds the affinity tag can be fluorescently labeled or conjugated to enzyme as described above.

Various methods, widely practiced in the art, may be employed to attach a streptavidin or biotin molecule to the antibody of the invention. For example, a biotin molecule may be attached to the antibody of the invention via the recognition sequence of a biotin protein ligase (e.g., BirA) as described in the Examples section which follows and in Denkberg, G. et al., 2000. Eur. J. Immunol. 30:3522-3532. Alternatively, a streptavidin molecule may be attached to an antibody fragment, such as a single chain Fv, essentially as described in Cloutier S M. et al., 2000. Molecular Immunology 37:1067-1077; Dübel S. et al., 1995. J Immunol Methods 178:201; Huston J S. et al., 1991. Methods in Enzymology 203:46; Kipriyanov S M. et al., 1995. Hum Antibodies Hybridomas 6:93; Kipriyanov S M. et al., 1996. Protein Engineering 9:203; Pearce L A. et al., 1997. Biochem Molec Biol Intl 42:1179-1188).

Functional moieties, such as fluorophores, conjugated to streptavidin are commercially available from essentially all major suppliers of immunofluorescence flow cytometry reagents (for example, Pharmingen or Becton-Dickinson).

According to some embodiments of the invention, biotin conjugated antibodies are bound to a streptavidin molecule to form a multivalent composition (e.g., a dimmer or tetramer form of the antibody).

Table 5 provides non-limiting examples of identifiable moieties which can be conjugated to the antibody of the invention.

TABLE 5

| Identifiable Moiety | Amino Acid sequence (GenBank Accession No.) | Nucleic Acid sequence (GenBank Accession No.) |
|---|---|---|
| Green Fluorescent protein | AAL33912 | AF435427 |
| Alkaline phosphatase | AAK73766 | AY042185 |
| Peroxidase | CAA00083 | A00740 |
| Histidine tag | Amino acids 264-269 of GenBank Accession No. AAK09208 | Nucleotides 790-807 of GenBank Accession No. AF329457 |
| Myc tag | Amino acids 273-283 of GenBank Accession No. AAK09208 | Nucleotides 817-849 of GenBank Accession No. AF329457 |
| Biotin ligase tag | LHHILDAQ $\underline{K}$MVWNHR SEQ ID NO: 136 | |
| orange fluorescent protein | AAL33917 | AF435432 |
| Beta galactosidase | ACH42114 | EU626139 |
| Streptavidin | AAM49066 | AF283893 |

As mentioned, the antibody may be conjugated to a therapeutic moiety. The therapeutic moiety can be, for example, a cytotoxic moiety, a toxic moiety, a cytokine moiety and a second antibody moiety comprising a different specificity to the antibodies of the invention.

Non-limiting examples of therapeutic moieties which can be conjugated to the antibody of the invention are provided in Table 6, hereinbelow.

TABLE 6

| Therapeutic moiety | Amino acid sequence (GenBank Accession No) | Nucleic acid sequence (GenBank Accession No) |
|---|---|---|
| Pseudomonas exotoxin | ABU63124 | EU090068 |
| Diphtheria toxin | AAV70486 | AY820132.1 |
| interleukin 2 | CAA00227 | A02159 |
| CD3 | P07766 | X03884 |
| CD16 | NP_000560.5 | NM_000569.6 |
| interleukin 4 | NP_000580.1 | NM_000589.2 |
| HLA-A2 | P01892 | K02883 |
| interleukin 10 | P22301 | M57627 |
| Ricin toxin | EEF27734 | EQ975183 |

The functional moiety (the detectable or therapeutic moiety of the invention) may be attached or conjugated to the antibody of the invention in various ways, depending on the context, application and purpose.

When the functional moiety is a polypeptide, the immunoconjugate may be produced by recombinant means. For example, the nucleic acid sequence encoding a toxin (e.g., PE38KDEL) or a fluorescent protein [e.g., green fluorescent protein (GFP), red fluorescent protein (RFP) or yellow fluorescent protein (YFP)] may be ligated in-frame with the nucleic acid sequence encoding the antibody of the invention and be expressed in a host cell to produce a recombinant conjugated antibody. Alternatively, the functional moiety may be chemically synthesized by, for example, the stepwise addition of one or more amino acid residues in defined order such as solid phase peptide synthetic techniques.

A functional moiety may also be attached to the antibody of the invention using standard chemical synthesis techniques widely practiced in the art [see e.g., worldwideweb (dot) chemistry (dot) org/portal/Chemistry)], such as using any suitable chemical linkage, direct or indirect, as via a peptide bond (when the functional moiety is a polypeptide), or via covalent bonding to an intervening linker element, such as a linker peptide or other chemical moiety, such as an organic polymer. Chimeric peptides may be linked via bonding at the carboxy (C) or amino (N) termini of the peptides, or via bonding to internal chemical groups such as straight, branched or cyclic side chains, internal carbon or nitrogen atoms, and the like. Description of fluorescent labeling of antibodies is provided in details in U.S. Pat. Nos. 3,940,475, 4,289,747, and 4,376,110.

Exemplary methods for conjugating peptide moieties (therapeutic or detectable moieties) to the antibody of the invention are described herein below:

SPDP conjugation—A non-limiting example of a method of SPDP conjugation is described in Cumber et al. (1985, Methods of Enzymology 112: 207-224). Briefly, a peptide, such as a detectable or therapeutic moiety (e.g., 1.7 mg/ml) is mixed with a 10-fold excess of SPDP (50 mM in ethanol); the antibody is mixed with a 25-fold excess of SPDP in 20 mM sodium phosphate, 0.10 M NaCl pH 7.2 and each of the reactions is incubated for about 3 hours at room temperature. The reactions are then dialyzed against PBS. The peptide is reduced, e.g., with 50 mM DTT for 1 hour at room temperature. The reduced peptide is desalted by equilibration on G-25 column (up to 5% sample/column volume) with 50 mM $KH_2PO_4$ pH 6.5. The reduced peptide is combined with the SPDP-antibody in a molar ratio of 1:10 antibody:peptide and incubated at 4° C. overnight to form a peptide-antibody conjugate.

Glutaraldehyde conjugation—A non-limiting example of a method of glutaraldehyde conjugation is described in G. T. Hermanson (1996, "Antibody Modification and Conjugation, in Bioconjugate Techniques, Academic Press, San Diego). Briefly, the antibody and the peptide (1.1 mg/ml) are mixed at a 10-fold excess with 0.05% glutaraldehyde in 0.1 M phosphate, 0.15 M NaCl pH 6.8, and allowed to react for 2 hours at room temperature. 0.01 M lysine can be added to block excess sites. After-the reaction, the excess glutaraldehyde is removed using a G-25 column equilibrated with PBS (10% v/v sample/column volumes)

Carbodiimide conjugation—Conjugation of a peptide with an antibody can be accomplished using a dehydrating agent such as a carbodiimide, e.g., in the presence of 4-dimethyl aminopyridine. Carbodiimide conjugation can be used to form a covalent bond between a carboxyl group of peptide and an hydroxyl group of an antibody (resulting in the formation of an ester bond), or an amino group of an antibody (resulting in the formation of an amide bond) or a sulfhydryl group of an antibody (resulting in the formation of a thioester bond). Likewise, carbodiimide coupling can be used to form analogous covalent bonds between a carbon group of an antibody and an hydroxyl, amino or sulfhydryl group of the peptide [see, J. March, Advanced Organic Chemistry: Reaction's, Mechanism, and Structure, pp. 349-50 & 372-74 (3d ed.), 1985]. For example, the peptide can be conjugated to an antibody via a covalent bond using a carbodiimide, such as dicyclohexylcarbodiimide [B. Neises et al. (1978), Angew Chem., Int. Ed. Engl. 17:522; A. Hassner et al. (1978, Tetrahedron Lett. 4475); E. P. Boden et al. (1986, J. Org. Chem. 50:2394) and L. J. Mathias (1979, Synthesis 561)].

As is mentioned hereinabove, one specific use for an antibody directed against Semaphorin 3A is prevention or treatment of diseases or injuries associated with imbalanced or abnormal activity of semaphorin 3A.

Thus, according to another aspect of the present invention there is provided a method of treating a disease or injury associated with imbalanced or abnormal activity of semaphorin 3A in a subject in need thereof, the method comprising administering to the subject a therapeutically effective amount of the antibody described herein, thereby treating the disease or injury associate with imbalanced or abnormal activity of semaphorin 3A in the subject.

Subjects which may be treated include mammalian subjects, such as humans.

According to one embodiment, the disease is an ocular disease, including but not limited to non-arthritic ischemic optic atrophy (NAION), glaucoma and retinal detachment.

According to another embodiment, the disease is a CNS disease or disorder.

Representative examples of CNS diseases or disorders that can be beneficially treated with the antibodies described herein include, but are not limited to, a pain disorder, a motion disorder, a dissociative disorder, a mood disorder, an affective disorder, a neurodegenerative disease or disorder and a convulsive disorder.

More specific examples of such conditions include, but are not limited to, Parkinson's, ALS, Multiple Sclerosis, Huntingdon's disease, autoimmune encephalomyelitis, diabetic neuropathy, glaucomatous neuropathy, macular degeneration, action tremors and tardive dyskinesia, panic, anxiety, depression, alcoholism, insomnia, manic behavior, Alzheimer's and epilepsy.

In other embodiments, the subject is suffering from a trauma to the brain, eye, ear, or spinal cord. In some embodiments, the trauma is the result of an ischemia (e.g., an ischemic stroke) to the brain, eye, ear, or spinal cord. In some embodiments, the injury includes a chronic insult to the brain, eye, ear, or spinal cord. In some embodiments, the injury includes an acute insult to the brain, eye, ear, or spinal cord. In some embodiments, the disorder includes a thrombotic event, a vascular insufficiency, an inflammatory reaction to an infectious agent, a detachment of the retina, an injury to hair cells of the ear, a pressure to the spinal cord, a stroke, trauma to the brain or major sensory nerves, any infarct of a major nerve or system or an acute ischemia of a major nerve or system.

Another use for an antibody directed against semaphorin 3A is diagnosis of a disease associated with an upregulation of expression of semaphorin 3A.

Thus, according to another aspect of the present invention there is provided a method of diagnosing a disease associated with imbalanced or abnormal activity of semaphorin 3A in a subject, the method comprising contacting a sample of the subject with an antibody described herein (e.g. 3H4) so as to analyze expression of semaphorin 3A, wherein an upregulation of expression of the semaphorin 3A is indicative of the disease associated with imbalanced or abnormal activity of semaphorin 3A.

Methods of analyzing expression of semaphorin 3A using the disclosed antibody include, but are not limited to Western analysis, immunoprecipitation and immunohistochemistry.

A sample can be a liquid such as urine, saliva, cerebrospinal fluid, blood, serum or the like; a solid or semi-solid such as tissues, feces, or the like; or, alternatively, a solid tissue such as those commonly used in histological diagnosis.

Typically the amount of semaphorin 3A is compared with a control (a corresponding sample from a healthy subject) or known amounts of semaphorin 3A which correspond to a healthy subject).

Following the diagnosis, the subject may be informed of the outcome. Further additional diagnostic tests may be carried out on the basis of the outcome of the tests using the semaphorin 3A antibody disclosed herein.

It will be appreciated that as well as performing the diagnosis in vitro (i.e. on samples of the subject), the diagnosis may also be effected in vivo.

Diseases which may be diagnosed include those listed above for diseases which can be treated.

The antibodies of the present invention may be administered to the subject per se or as part of a pharmaceutical composition.

As used herein a "pharmaceutical composition" refers to a preparation of one or more of the active ingredients described herein with other chemical components such as physiologically suitable carriers and excipients. The purpose of a pharmaceutical composition is to facilitate administration of a compound to an organism.

Herein the term "active ingredient" refers to the antibody accountable for the biological effect.

Hereinafter, the phrases "physiologically acceptable carrier" and "pharmaceutically acceptable carrier" which may be interchangeably used refer to a carrier or a diluent that does not cause significant irritation to an organism and does not abrogate the biological activity and properties of the administered compound. An adjuvant is included under these phrases.

Herein the term "excipient" refers to an inert substance added to a pharmaceutical composition to further facilitate administration of an active ingredient. Examples, without limitation, of excipients include calcium carbonate, calcium phosphate, various sugars and types of starch, cellulose derivatives, gelatin, vegetable oils and polyethylene glycols.

Techniques for formulation and administration of drugs may be found in "Remington's Pharmaceutical Sciences," Mack Publishing Co., Easton, PA, latest edition, which is incorporated herein by reference.

Suitable routes of administration may, for example, include oral, rectal, transmucosal, especially transnasal, intestinal or parenteral delivery, including intramuscular, subcutaneous and intramedullary injections as well as intrathecal, direct intraventricular, intracardiac, e.g., into the right or left ventricular cavity, into the common coronary artery, intravenous, intraperitoneal, intranasal, or intraocular injections.

For delivery to the eye, topical, local ocular (i.e., subconjunctival, intravitreal, retrobulbar, intracameral), and systemic delivery is contemplated. Formulations for effecting same are known in the art. The most appropriate method of administration depends on the area of the eye to be medicated. The conjunctiva, cornea, anterior chamber, and iris may respond to topical therapy. The eyelids may be treated with topical therapy or systemic therapy. The posterior segment typically requires systemic therapy, because most topical medications do not penetrate to the posterior segment. Retrobulbar and orbital tissues are typically treated systemically.

Conventional approaches for drug delivery to the CNS include: neurosurgical strategies (e.g., intracerebral injection or intracerebroventricular infusion); molecular manipulation of the agent (e.g., production of a chimeric fusion protein that comprises a transport peptide that has an affinity for an endothelial cell surface molecule in combination with an agent that is itself incapable of crossing the BBB) in an attempt to exploit one of the endogenous transport pathways of the BBB; pharmacological strategies designed to increase the lipid solubility of an agent (e.g., conjugation of water-soluble agents to lipid or cholesterol carriers); and the transitory disruption of the integrity of the BBB by hyperosmotic disruption (resulting from the infusion of a mannitol solution into the carotid artery or the use of a biologically active agent such as an angiotensin peptide). However, each of these strategies has limitations, such as the inherent risks associated with an invasive surgical procedure, a size limitation imposed by a limitation inherent in the endogenous transport systems, potentially undesirable biological side effects associated with the systemic administration of a chimeric molecule comprised of a carrier motif that could be active outside of the CNS, and the possible risk of brain damage within regions of the brain where the BBB is disrupted, which renders it a suboptimal delivery method.

Alternately, one may administer the pharmaceutical composition in a local rather than systemic manner, for example, via injection of the pharmaceutical composition directly into a tissue region of a patient.

The term "tissue" refers to part of an organism consisting of an aggregate of cells having a similar structure and/or a common function. Examples include, but are not limited to, brain tissue, retina, skin tissue, hepatic tissue, pancreatic tissue, bone, cartilage, connective tissue, blood tissue, muscle tissue, cardiac tissue brain tissue, vascular tissue, renal tissue, pulmonary tissue, gonadal tissue, hematopoietic tissue.

Pharmaceutical compositions of the present invention may be manufactured by processes well known in the art, e.g., by means of conventional mixing, dissolving, granulating, dragee-making, levigating, emulsifying, encapsulating, entrapping or lyophilizing processes.

Pharmaceutical compositions for use in accordance with the present invention thus may be formulated in conventional manner using one or more physiologically acceptable carriers comprising excipients and auxiliaries, which facilitate processing of the active ingredients into preparations which, can be used pharmaceutically. Proper formulation is dependent upon the route of administration chosen.

For injection, the active ingredients of the pharmaceutical composition may be formulated in aqueous solutions, preferably in physiologically compatible buffers such as Hank's solution, Ringer's solution, or physiological salt buffer. For transmucosal administration, penetrants appropriate to the barrier to be permeated are used in the formulation. Such penetrants are generally known in the art.

For oral administration, the pharmaceutical composition can be formulated readily by combining the active compounds with pharmaceutically acceptable carriers well known in the art. Such carriers enable the pharmaceutical composition to be formulated as tablets, pills, dragees, capsules, liquids, gels, syrups, slurries, suspensions, and the like, for oral ingestion by a patient. Pharmacological preparations for oral use can be made using a solid excipient, optionally grinding the resulting mixture, and processing the mixture of granules, after adding suitable auxiliaries if desired, to obtain tablets or dragee cores. Suitable excipients are, in particular, fillers such as sugars, including lactose, sucrose, mannitol, or sorbitol; cellulose preparations such as, for example, maize starch, wheat starch, rice starch, potato starch, gelatin, gum tragacanth, methyl cellulose, hydroxypropylmethyl-cellulose, sodium carbomethylcellulose; and/or physiologically acceptable polymers such as polyvinylpyrrolidone (PVP). If desired, disintegrating agents may be added, such as cross-linked polyvinyl pyrrolidone, agar, or alginic acid or a salt thereof such as sodium alginate.

Dragee cores are provided with suitable coatings. For this purpose, concentrated sugar solutions may be used which may optionally contain gum arabic, talc, polyvinyl pyrrolidone, carbopol gel, polyethylene glycol, titanium dioxide, lacquer solutions and suitable organic solvents or solvent mixtures. Dyestuffs or pigments may be added to the tablets or dragee coatings for identification or to characterize different combinations of active compound doses.

Pharmaceutical compositions which can be used orally, include push-fit capsules made of gelatin as well as soft, sealed capsules made of gelatin and a plasticizer, such as glycerol or sorbitol. The push-fit capsules may contain the active ingredients in admixture with filler such as lactose, binders such as starches, lubricants such as talc or magnesium stearate and, optionally, stabilizers. In soft capsules, the active ingredients may be dissolved or suspended in suitable liquids, such as fatty oils, liquid paraffin, or liquid polyethylene glycols. In addition, stabilizers may be added. All formulations for oral administration should be in dosages suitable for the chosen route of administration.

For buccal administration, the compositions may take the form of tablets or lozenges formulated in conventional manner.

For administration by nasal inhalation, the active ingredients for use according to the present invention are conveniently delivered in the form of an aerosol spray presentation from a pressurized pack or a nebulizer with the use of a suitable propellant, e.g., dichlorodifluoromethane, trichlorofluoromethane, dichloro-tetrafluoroethane or carbon dioxide. In the case of a pressurized aerosol, the dosage unit may be determined by providing a valve to deliver a metered amount. Capsules and cartridges of, e.g., gelatin for use in a dispenser may be formulated containing a powder mix of the compound and a suitable powder base such as lactose or starch.

The pharmaceutical composition described herein may be formulated for parenteral administration, e.g., by bolus injection or continuous infusion. Formulations for injection may be presented in unit dosage form, e.g., in ampoules or in multidose containers with optionally, an added preservative. The compositions may be suspensions, solutions or emulsions in oily or aqueous vehicles, and may contain formulatory agents such as suspending, stabilizing and/or dispersing agents.

Pharmaceutical compositions for parenteral administration include aqueous solutions of the active preparation in water-soluble form. Additionally, suspensions of the active ingredients may be prepared as appropriate oily or water based injection suspensions. Suitable lipophilic solvents or vehicles include fatty oils such as sesame oil, or synthetic fatty acids esters such as ethyl oleate, triglycerides or liposomes. Aqueous injection suspensions may contain substances, which increase the viscosity of the suspension, such as sodium carboxymethyl cellulose, sorbitol or dextran. Optionally, the suspension may also contain suitable stabilizers or agents which increase the solubility of the active ingredients to allow for the preparation of highly concentrated solutions.

Alternatively, the active ingredient may be in powder form for constitution with a suitable vehicle, e.g., sterile, pyrogen-free water based solution, before use.

The pharmaceutical composition of the present invention may also be formulated in rectal compositions such as suppositories or retention enemas, using, e.g., conventional suppository bases such as cocoa butter or other glycerides.

Pharmaceutical compositions suitable for use in context of the present invention include compositions wherein the active ingredients are contained in an amount effective to achieve the intended purpose. More specifically, a therapeutically effective amount means an amount of active ingredients (antibody) effective to prevent, alleviate or ameliorate symptoms of a disorder (e.g., cancer/anthrax infection) or prolong the survival of the subject being treated.

Determination of a therapeutically effective amount is well within the capability of those skilled in the art, especially in light of the detailed disclosure provided herein.

For any preparation used in the methods of the invention, the therapeutically effective amount or dose can be estimated initially from in vitro and cell culture assays. For example, a dose can be formulated in animal models to achieve a desired concentration or titer. Such information can be used to more accurately determine useful doses in humans.

Toxicity and therapeutic efficacy of the active ingredients described herein can be determined by standard pharmaceutical procedures in vitro, in cell cultures or experimental animals. The data obtained from these in vitro and cell culture assays and animal studies can be used in formulating a range of dosage for use in human. The dosage may vary depending upon the dosage form employed and the route of administration utilized. The exact formulation, route of administration and dosage can be chosen by the individual physician in view of the patient's condition. (See e.g., Fingl, et al., 1975, in "The Pharmacological Basis of Therapeutics", Ch. 1 p. 1).

Dosage amount and interval may be adjusted individually to provide tissue or blood levels of the active ingredient which are sufficient to induce or suppress the biological effect (minimal effective concentration, MEC). The MEC will vary for each preparation, but can be estimated from in vitro data. Dosages necessary to achieve the MEC will depend on individual characteristics and route of administration. Detection assays can be used to determine plasma concentrations.

Depending on the severity and responsiveness of the condition to be treated, dosing can be of a single or a plurality of administrations, with course of treatment lasting from several days to several weeks or until cure is effected or diminution of the disease state is achieved.

The amount of a composition to be administered will, of course, be dependent on the subject being treated, the severity of the affliction, the manner of administration, the judgment of the prescribing physician, etc.

In another embodiment, the antibody is formulated in solution for injection and immediate release. In another embodiment, it is formulated for slow release. In another embodiment, it is formulated for delivery to a specific tissue such as the stroke penumbra, the inner ear or the vitreous of the eye. In a particular embodiment, the antibody is delivered using a solid implant.

As used herein, the term "implant" refers to an object that is designed to be placed partially or wholly within a patient's body for one or more therapeutic or prophylactic purposes for delivering therapeutic agents (i.e. the antibody described herein). Implants are typically composed of biologically compatible synthetic materials.

In one embodiment, the antibody in the implant is present from about 0.1 to about 50% W/W.

Compositions of some embodiments of the invention may, if desired, be presented in a pack or dispenser device, such as an FDA approved kit, which may contain one or more unit dosage forms containing the active ingredient. The pack may, for example, comprise metal or plastic foil, such as a blister pack. The pack or dispenser device may be accompanied by instructions for administration. The pack or dispenser may also be accommodated by a notice associated with the container in a form prescribed by a governmental agency regulating the manufacture, use or sale of pharmaceuticals, which notice is reflective of approval by the agency of the form of the compositions or human or veterinary administration. Such notice, for example, may be of labeling approved by the U.S. Food and Drug Administration for prescription drugs or of an approved product insert. Compositions comprising a preparation of the invention formulated in a compatible pharmaceutical carrier may also be prepared, placed in an appropriate container, and labeled for treatment of an indicated condition, as is further detailed above. The term "treating" refers to inhibiting, preventing or arresting the development of a pathology (disease, disorder or condition) and/or causing the reduction, remission, or regression of a pathology. Those of skill in the art will understand that various methodologies and assays can be used to assess the development of a pathology, and similarly, various methodologies and assays may be used to assess the reduction, remission or regression of a pathology.

As used herein, the term "preventing" refers to keeping a disease, disorder or condition from occurring in a subject who may be at risk for the disease, but has not yet been diagnosed as having the disease.

As used herein, the term "subject" includes mammals, preferably human beings at any age which suffer from the pathology. Preferably, this term encompasses individuals who are at risk to develop the pathology.

The terms "comprises", "comprising", "includes", "including", "having" and their conjugates mean "including but not limited to".

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non limiting fashion.

Generally, the nomenclature used herein and the laboratory procedures utilized in the present invention include molecular, biochemical, microbiological and recombinant DNA techniques. Such techniques are thoroughly explained in the literature. See, for example, "Molecular Cloning: A laboratory Manual" Sambrook et al., (1989); "Current Protocols in Molecular Biology" Volumes I-III Ausubel, R. M., ed. (1994); Ausubel et al., "Current Protocols in Molecular Biology", John Wiley and Sons, Baltimore, Maryland (1989); Perbal, "A Practical Guide to Molecular Cloning", John Wiley & Sons, New York (1988); Watson et al., "Recombinant DNA", Scientific American Books, New York; Birren et al. (eds) "Genome Analysis: A Laboratory Manual Series", Vols. 1-4, Cold Spring Harbor Laboratory Press, New York (1998); methodologies as set forth in U.S. Pat. Nos. 4,666,828; 4,683,202; 4,801,531; 5,192,659 and 5,272,057; "Cell Biology: A Laboratory Handbook", Volumes I-III Cellis, J. E., ed. (1994); "Culture of Animal Cells—A Manual of Basic Technique" by Freshney, Wiley-Liss, N.Y. (1994), Third Edition; "Current Protocols in Immunology" Volumes I-III Coligan J. E., ed. (1994); Stites et al. (eds), "Basic and Clinical Immunology" (8th Edition), Appleton & Lange, Norwalk, CT (1994); Mishell and Shiigi (eds), "Selected Methods in Cellular Immunology", W. H. Freeman and Co., New York (1980); available immunoassays are extensively described in the patent and scientific literature, see, for example, U.S. Pat. Nos. 3,791,932; 3,839,153; 3,850,752; 3,850,578; 3,853,987; 3,867,517; 3,879,262; 3,901,654; 3,935,074; 3,984,533; 3,996,345; 4,034,074; 4,098,876; 4,879,219; 5,011,771 and 5,281,521; "Oligonucleotide Synthesis" Gait, M. J., ed. (1984); "Nucleic Acid Hybridization" Hames, B. D., and Higgins S. J., eds. (1985); "Transcription and Translation" Hames, B. D., and Higgins S. J., eds. (1984); "Animal Cell Culture" Freshney, R. I., ed. (1986); "Immobilized Cells and Enzymes" IRL Press, (1986); "A Practical Guide to Molecular Cloning" Perbal, B., (1984) and "Methods in Enzymology" Vol. 1-317, Academic Press; "PCR Protocols: A Guide To Methods And Applications", Academic Press, San Diego, CA (1990); Marshak et al., "Strategies for Protein Purification and Characterization—A Laboratory Course Manual" CSHL Press (1996); all of which are incorporated by reference as if fully set forth herein. Other general references are provided throughout this document. The procedures therein are believed to be well known in the art and are provided for the convenience of the reader. All the information contained therein is incorporated herein by reference.

Example 1

Affinity-Selection Panning of an Antibody Phage Display Library for Sema3A Antibodies and Antigen-Binding Fragments Thereof that Bind to Sema3A Sema3A-specific antibodies were isolated from the "Ronit 1" human antibody phage display library (Azriel-Rosenfeld et al., 2004, Journal of Molecular Biology, 335, 177-92). Full length Sema3A protein or peptides sequences (residues 252-260 or 359-366) were generated from the Sema3A region that binds the receptor and were used as baits with the aim of generating functional antibodies that would block the Seam3A interaction site with its receptor. In addition, recombinant Sema3a was used as bait for isolating additional antibodies. To screen for Sema3A peptide binders, 4 synthetic peptides, corresponding to different regions of Sema3a were used. The peptides were biotinylated to facilitate their complexing with the carrier proteins avidin and streptavidin. After four selection cycles a single antibody clone that binds to PEP2 (Sema3a dimerization interface) was isolated. This antibody, named PEP1C4 bound with high affinity to PEP2 but very weakly to the Sema3a protein.

To obtain higher affinity binders of Sema3a, recombinant pure Sema3a protein was prepared. HEK293 cells were used to express Sema3A in a secreted and truncated form. The 65 kDa furin cleavage contains the functional regions of Sema3a and this was used to isolate Sema3a-specific phage antibodies. The phage Sema3A(65) complexes were isolated using an immobilized Sema3a-specific mouse monoclonal antibody (Shirvan et al., 2002, The Journal of Biological Chemistry, 277, 49799-807) that does not inhibit semaphorin signaling. A total of 16 different (at the sequence level) Sema3a-specific phage antibodies were isolated and validated as specific binders.

Figure 1B:
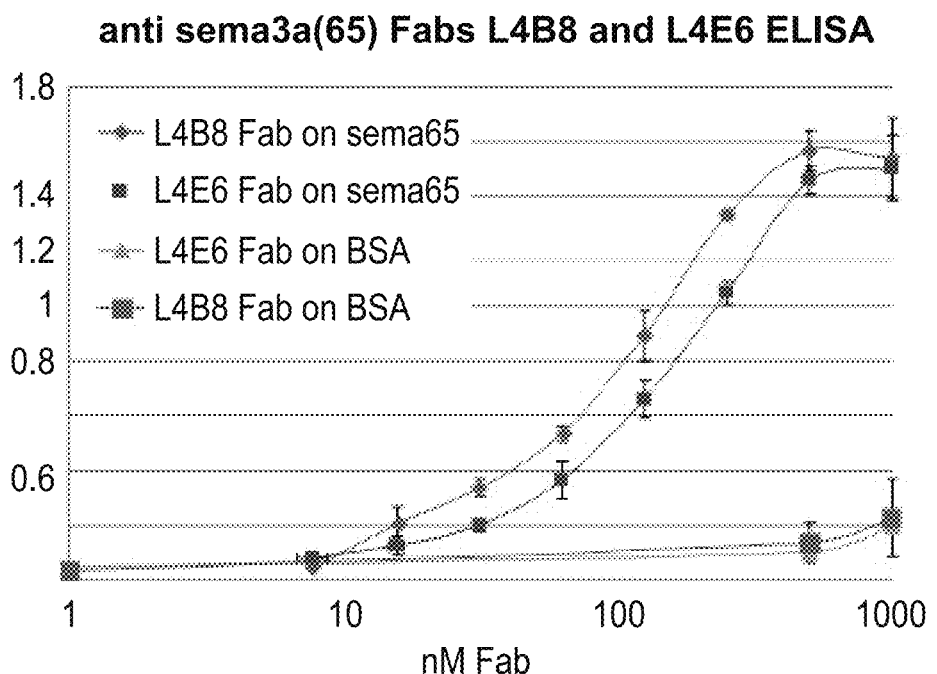

Fabs were converted from phage-displayed scFvs to soluble expression as Fabs in a process in which the VH and VL domains were made as synthetic genes optimized for expression in *E. coli* (SEQ ID NOs: 1-6 GeneArt, Germany) appended with a C-terminal His tag fused to the Fd fragment of the heavy chain). SEQ ID NOS: 7-12 were not subject to codon optimization. SEQ ID NOS: 13-16 received optimization of only the heavy chain VH. The Fabs were produced by bacterial expression and refolding essentially as described in Hakim et al., 2009 ("*mAbs*, 1, 281-7) and purified with Ni-NTA metal-chelate chromatography (His-Trap columns, GE Healthcare). The Fabs were evaluated for Sema3a binding affinity and specificity by ELISA (FIGS. 1A-B). The Fabs were ranked according to manufacturability and apparent binding affinity to Sema3a. The leading candidates were tested for inhibition of Sema3a-mediated signaling. Table 1 lists the Sema3a protein-binding heavy chain variable region CDRs that were isolated, produced and characterized. Table 2 lists the Sema3a protein-binding light chain variable region CDRs that were isolated, produced and characterized. Table 3 lists the variable heavy chain domain amino acid sequences of the clones. Table 4 lists the variable light chain domain amino acid sequences of the clones. The anti-PEP2 Fab PEP1C4 bound Sema3a protein very weakly and was not included in the further evaluation.

Example 2

Production of Full Size Human IgG1 Antibodies Using Bacterial Expression

The Fabs described above were also produced as human IgG along with an isotype control antibody that binds streptavidin using a bacterial expression system (Hakim and Benhar, Id.; Luria et al., 2012, mAbs 4, 373-84). IgGs produced this way are aglycosylated, hence they do not activate complement nor do they engage immune effector cells (since they do not bind Fc gamma receptors).

To produce IgGs, plasmids that carry the heavy and the light chains were introduced separately into *E. coli* cells and the cultures were induced with IPTG. The heavy and light chains accumulated as insoluble inclusion bodies that were recovered and solubilized in a 6M guanidinium hydrochloride Tris buffer. The solubilized inclusion bodies were mixed at a 1:2 heavy chain/light chain molar ration, reduced using DTE and refolded by rapid mixing into a refolding solution consisting of Tris, oxidized glutathione and arginine. The refolding was incubated at 10° C. for 60 hr. The refolded IgG was then concentration using a diafiltration device and buffer exchanged to 20 mM Tris(HCl) pH 7.0, 500 mM NaCl. The concentrated refolded IgGs were loaded onto MABSELECT® columns and eluted using 0.1 M Citric acid pH 3.0. The eluted IgG was neutralized with 1.5M Tris (HCl) pH 8.5. To remove aggregates, the IgGs were separated on a 320 ml SEPHACRYL® HIPREP® 26/60 column developed with PBS. The pure monomeric IgG was stored at −80° C.

Example 3

Inhibition of Sema3a in a U87MG Cell Based Scratch Assay by Fabs and IgGs

Figure 2:
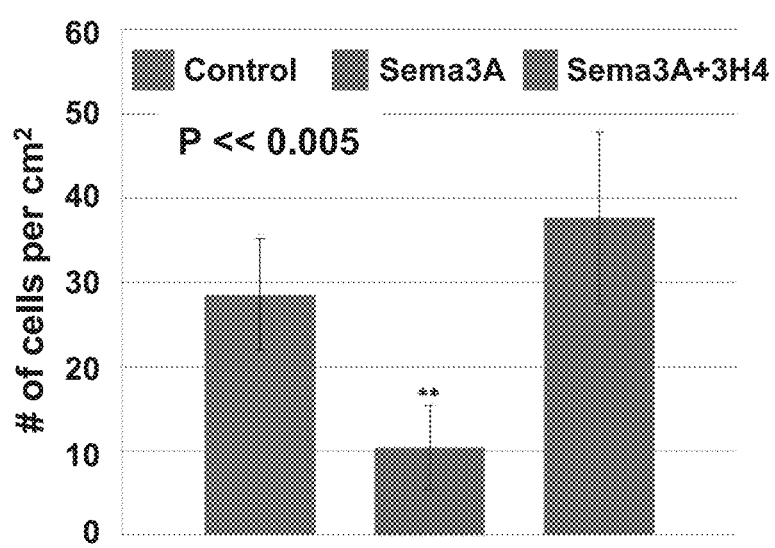
FIG. 2 is a bar graph summarizing the results of a Scratch Assay for Fab 3H4: $3 \times 10^4$ U87MG cells were seeded per well. After 2 days, a scratch was made in each well using 100 µl tip. 250 ng/ml of Sema3A was incubated with 10 µg/ml of Fab 3H4 for 30 minutes at room temperature (RT). The mixture was then incubated with the U87MG cells for another 24 hours (hr) at 37° C. The reaction was stopped by removing the medium and adding 4% PFA in phosphate buffered saline (PBS) for 10 min. The cells were then stained with DAPI and images were taken with a fluorescence microscope. The number of cells in the scratch was quantified by using ImageJ software. Fab 3H4 inhibited Sema3A, enabling U87MG cells to migrate into the scratch. Control: left; Sema3A: middle; and Sema3A+3H4: right.
Figure 3A:
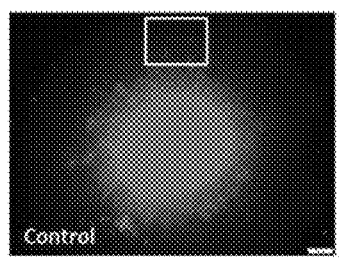
FIGS. 3A-D are photographs of a dorsal root ganglia (DRG) repulsion assay for Fab 3H4 (FIG. 3C) and Fab 3E12 (FIG. 3D) compared to control (FIG. 3A) and no treatment (FIG. 3B). The changes in morphology are shown. Chick DRG were exposed to Sema3A secreted from HEK293 cells. The DRGs were fixed in 3% formaldehyde (FA) for an hour and stained with phalloidin, which labels stress actin fibers. There are three columns of representative photos for each treatment. On the left is the entire DRG; the middle and right columns are increased resolutions of the left column. The various treatments used are indicated in the left image and this applies to the entire row. DRGs that were cultured with Sema3A secreting HEK293 cells but received no treatment sprouted fewer axons and the axons that did grow underwent growth cone collapse in the region facing the 293 HEK cells. The DRGs that were treated with either Fab 3H4 or 3E12 sprouted more axons than the untreated group, and the axons that grew towards the 293 HEK cells had intact growth cones (yellow arrows). Bar=100 µm, 40 µm, 20 µm respectively.
Figure 3A:
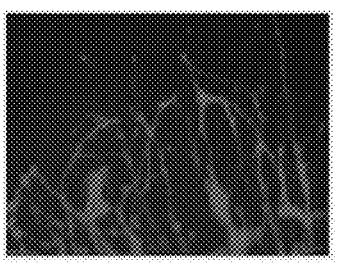
Figure 3A:
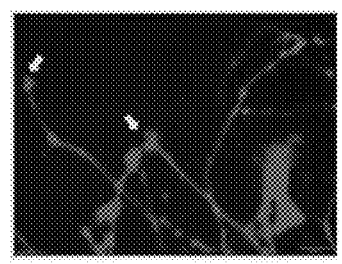
Figure 3B:
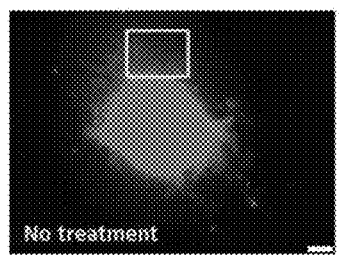
Figure 3B:
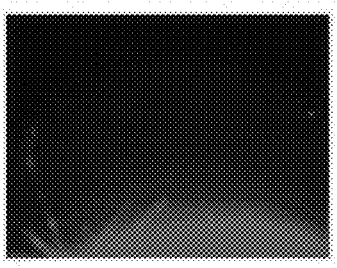
Figure 3B:
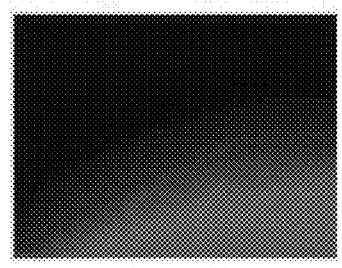
Figure 3C:
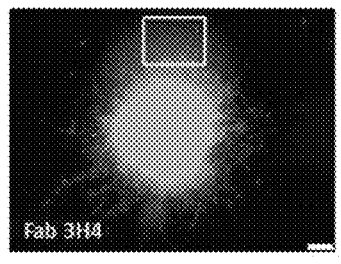
Figure 3C:
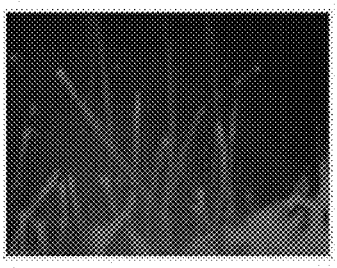
Figure 3C:
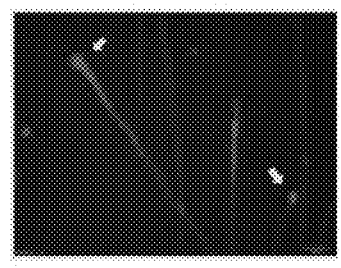
Figure 3D:
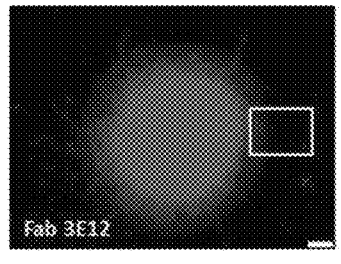
Figure 3D:
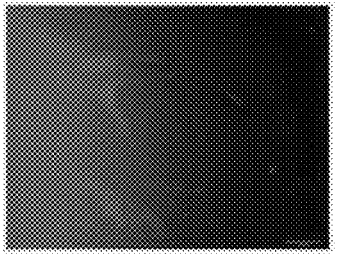
Figure 3D:
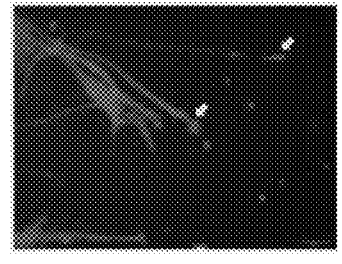
Figure 4:
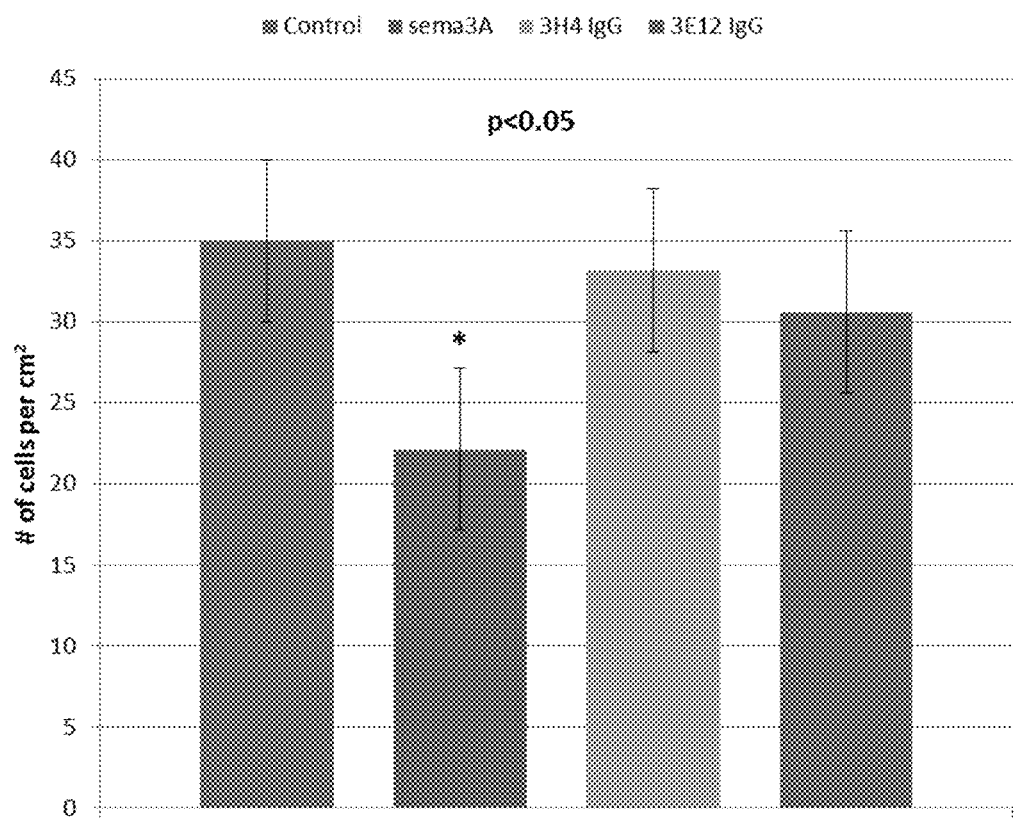
FIG. 4 is a bar graph summarizing the results of a Scratch Assay for 3H4 and 3E12 (as full-size IgGs) using the same conditions as for FIG. 2. Bars are from left to right: control, Sema3A, 3H4 IgG and 3E12 IgG.
Figure 5A:
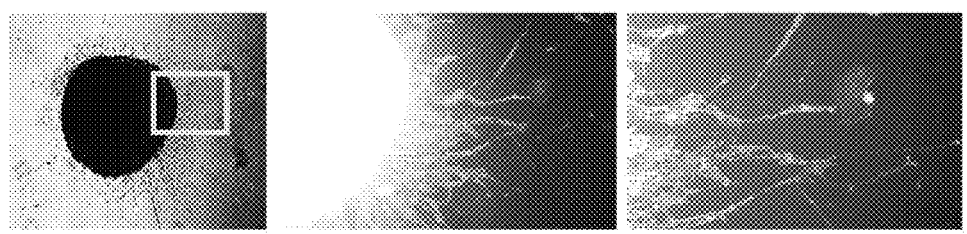
Figure 5B:
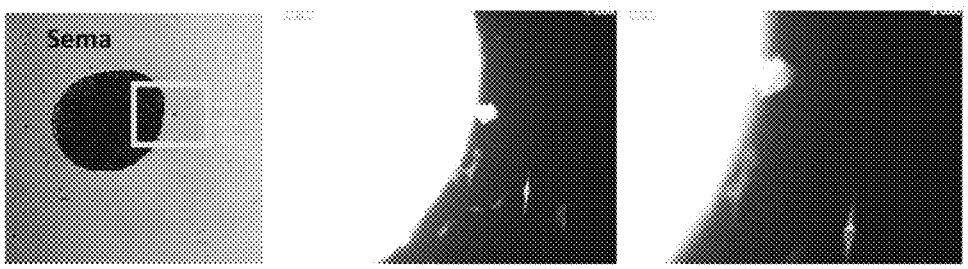
Figure 5C:
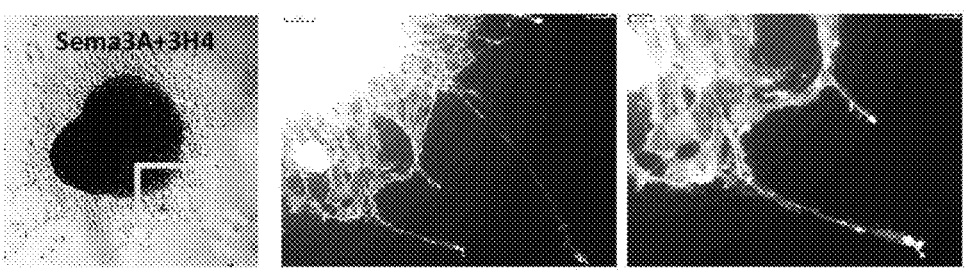
Figure 5D:
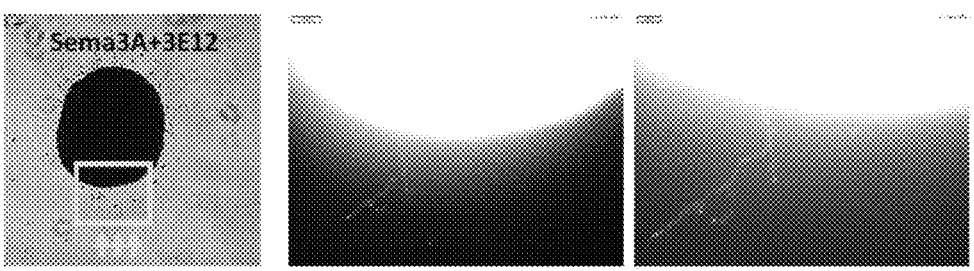
Figure 6F:
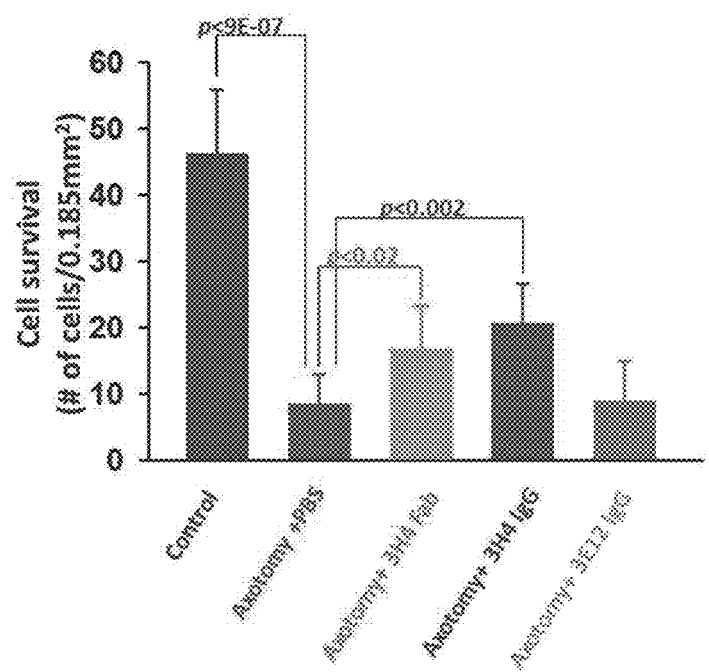
Figure 7:
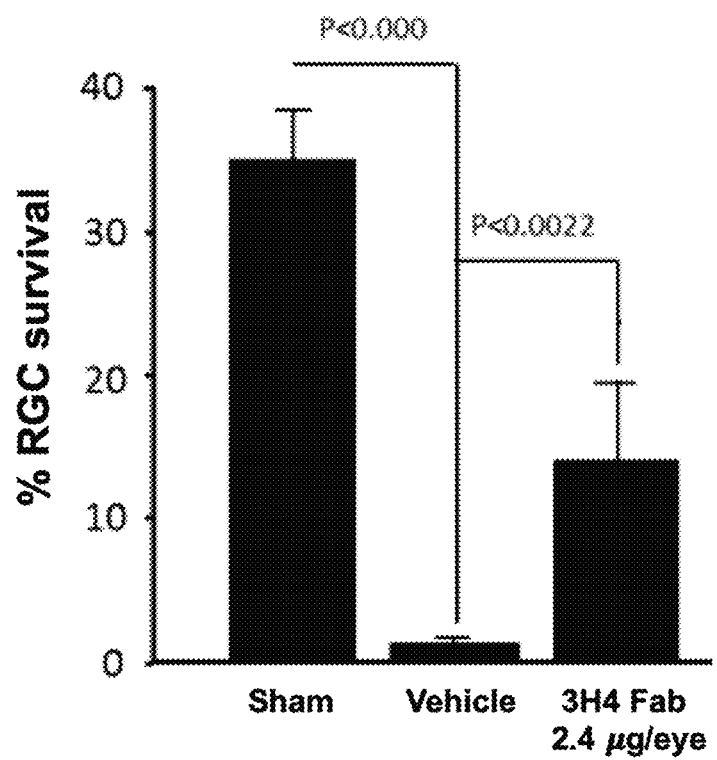
FIG. 7 is a bar graph illustrating the survival of rat RGCs following axotomy. Rats were treated with intraocular injections of solutions of 3H4 Fab (2.4 µg/eye) compared to Sham or Vehicle controls. Statistical significance is shown.

To evaluate the potential of selected Fabs to inhibit Sema3a, experiments were carried out using cultured cells that are responsive to externally-added Sema3a. Results from a U87MG cell scratch assay are shown in FIG. 2. Fab 3H4 reduced the Sema3a-mediated inhibition of migration of the cells into the scratch while treatment with Sema3A alone does not. Results from a separate Scratch Assay are provided in FIG. 4. 3H4 IgG and 3E12 IgG reduced the Sema3a-mediated inhibition of migration of the cells into the scratch compared to controls.

Additional cell-based assays were carried out on chicken embryo dorsal root ganglia (DRGs). Sema3a inhibits sprouting of the DRGs. As shown in FIGS. 3A-D, Fab 3H4 inhibited Sema3a action on Axon/neurite outgrowth while Fab 3E12 did not. Fab 3H4 and 3E12 were also tested as full size human IgGs in this DRG repulsion assay (FIGS. 5A-D). As observed for the corresponding Fabs, 3H4 IgG inhibited Sema3a while 3E12 IgG did not.

Example 4

Antibody Mediated Inhibition of Sema3A Mediated RGC Apoptosis in a Rat Optic Nerve Axotomy Model To evaluate the potential of the antibodies to inhibit Sema3a in a relevant small animal model, a rat axotomy study was carried out. The studies were carried out essentially as described in Shirvan et al., Id. Adult male Sprague-Dawley rats (8-10 weeks old, 300 g) were anesthetized (50 mg/kg xylazine and 35 mg/kg ketamine), and their left optic nerves were exposed by lateral canthotomy. Briefly, the conjunctivae were incised lateral to the cornea, and the retractor bulbus muscles were separated. Through a small opening in the meninges (200 µm), the nerve fibers were completely transected at a distance of 2-3 mm from the globe. The procedure was performed without damage to the nerve vasculature and optic nerve blood supply and with minimal damage to the meninges by the use of a specially designed glass dissector with a 200-µm tip and a smooth blunt edge (Solomon et al., 1996, Journal of Neuroscience Methods, 70, 21-5). The injury was unilateral in all animals, and the other eye served as a control.

For protective antibody treatment, the axotomized animals were divided into four groups of 4-6 rats each. Two groups were injected with purified anti-Sema3A antibodies (Fab or IgG) at a single dose of 10 µg in a volume of 3 µl. The rats were injected with the antibody 24 h post-injury. The anti-Sema3A antibodies were injected into the vitreous body of the axotomized eye. Injection was performed using a glass pipette that was inserted into the eye globe. Insertion was at the corneal limbic border behind the lens, over the optic nerve head area and close to the retinal surface. Injection of the anti-Sema3A antibody did not cause any signs of inflammation or irritation or any other changes that may indicate that this treatment is toxic. Clinical examination of the eyes was performed using a slit lamp, and the eyes were monitored for any signs of hyperemia, edema, discharge, fibrin, and other inflammatory parameters. At day 8 following axotomy of the optic nerve, the rats were anesthetized. Small crystals of the lipophilic neurotracer dye 4-(4-(dide-cylamino)styryl)-N-methylpyridinium iodide (4-Di-10-Asp; Molecular Probes, Inc.) were dissolved (1 mM) in incomplete Freund's adjuvant (DIFCO®). This dye serves as a marker for living RGCs because it is transmitted through the axonal network and stains the cell bodies of live neurons only, whereas nonviable neurons as well as other cell types such as endothelial cells remained unstained (Lazarov-Spiegler et al., 1999, *Vision Research*, 39, 169-75). The dye was applied to the transected nerve 0.5 mm from the proximal border of the transection site. The site of injury was visible by its grayish color in comparison with the rest of the nerve, which maintained its original color. Four days after dye application, retinas were excised, whole-mounted on Millipore filters, fixed in 4% paraformaldehyde (PFA) in phosphate-buffered saline (PBS), and viewed under a fluorescent microscope using a fluorescein isothiocyanate filter. Two independent and blinded researchers counted the number of labeled RGC in flat-mounted retinas by fluorescent microscopy. For each retina, 20 representative microscopic fields were evaluated: 10 fields from the peripheral area and 10 fields from the central area (each field covering an area of 0.069 mm$^2$). Central retinal areas were defined as located within two-thirds from the optic disc, and peripheral retinal areas were defined as located within one-third of the retinal radius. (These definitions were based on the apparent change in density of RGC between the two central and peripheral areas.) Retinas from eyes that were subjected to axotomy contained fewer living RGC and were compared with intact retinas (FIGS. 6A-F, 7) and Fab 3H4 was neuroprotective both as Fab and as IgG. In contrast, 3E12 IgG was not protective in this model.

Example 5

Measuring Clearance of Fluorescently-Labeled Antibodies from Rat Eyes

Figure 8A:
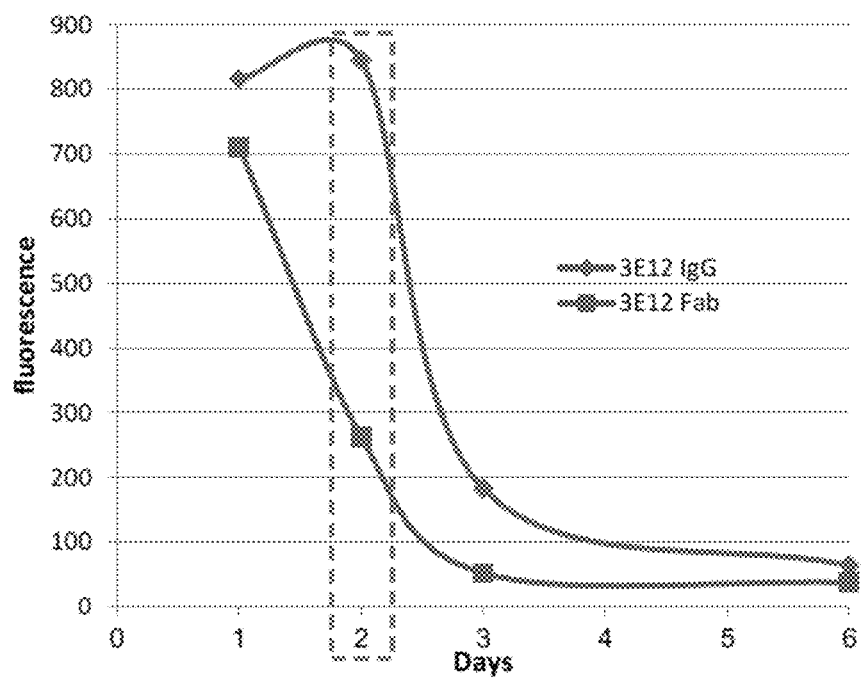
FIGS. 8A-C are graphs showing clearance rate of Fabs and IgGs from rat eyes.
Figure 8B:
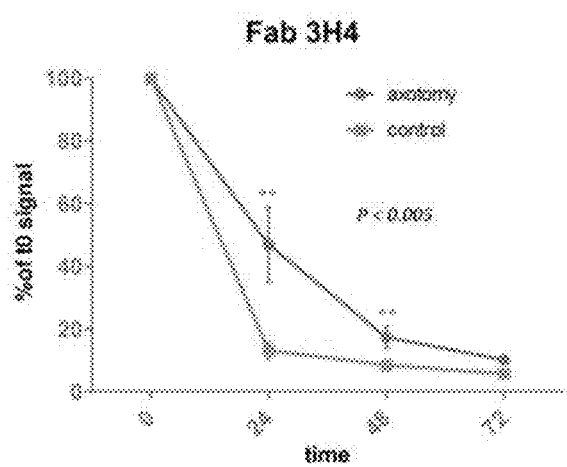
Figure 8C:
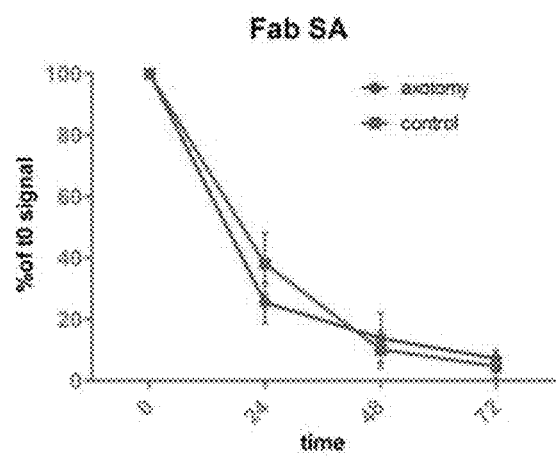
Figures 9A, 9B, 9C:
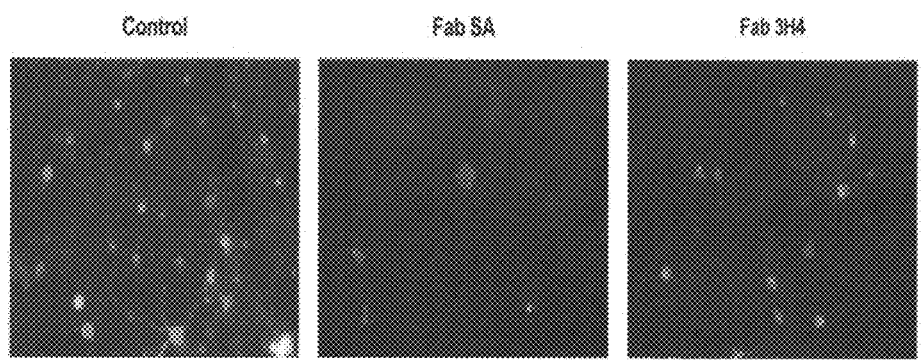
FIGS. 9A-C are photographs illustrating the effect of Sema3A antibody 3H4 Fab tested in a retinal detachment model in rats. 3H4 Fab was able to prevent RGC to some extent 14 days after retinal detachment (FIG. 9C). Treatment with the unrelated Fab that binds streptavidin (Isotype control Fab SA.

Clearance of binding proteins from the eye can indicate both pharmacokinetic properties and potentially also affinity for the target. To examine these properties, two independent experiments were carried out. In the first experiment, 3E12 IgG and 3E12 Fab were labelled with ALEXA FLUOR® 680 according to the supplier's protocol. Clearance of the labelled antibody and compound was monitored by total whole eye fluorescence. These data confirmed that the larger IgG is retained longer in the eye (FIG. 8A). To determine whether the expression of Sema3A in the eye leads to retention of binding proteins, Fab 3H4 and a Fab of an anti-streptavidin antibody (anti-SA, that does not bind Sema3A, serving as control; FIG. 8C) were labeled with ALEXA FLUOR® 594 according to the supplier's protocol. In this experiment, the clearance study was carried out in axotomized and in naïve rats because previous results show increased levels of Sema3A in the retina following optic nerve axotomy. To examine whether axotomy alters the pharmacokinetics of 3H4 Fab, fluorescent conjugated antibody was intraocularly injected and the level of the antibody was measured at different time points. FIG. 8B shows clearance kinetics which indicate that the Fab 3H4 is cleared slower in the axotomized eyes, most likely because binding of its target prolongs residence time. Nonetheless, these data also indicates that the Fab remains at high levels in the eye for about 3 days (the known half-life for other Fabs is about 2 hrs). Efforts to prolong exposure may be beneficial. Data are reported in FIGS. 8A-C.

Example 6

Retinal Detachment in Rats

To determine whether inhibitors of Sema3A could influence the outcome of retinal detachment, rats as in Example 4, were anesthetized (Xylazine 50 mg/kg and Ketamine 35 mg/kg) and the pupil dilated with Tropicamide drops 0.5%. Retinal detachment was induced by injecting 5 µl of saline via a 32 G needle under the retina (inserted at the cornel border in the anterior chamber, under the iris between the lens and the ora serrata). This procedure detached approximately half of the retinal area. The rats were divided in two treatment groups: Group A was immediately injected with 2 microliters of Fab 3H4 and Group B the same, 3 days later, a third group was injected with saline at induction and served as control. The same protocol of staining the RGC and flat mounting of the retina for RGC live counting was used as that in Example 4 (data reported in FIGS. 9A-C).

Example 7

Non Arthritic Ischemic Optic Atrophy (NAION) in Rabbits

The Fab 3H4 was used to treat non arthritic ischemic optic atrophy (NAION) in a model created in New Zealand rabbit. The Fab 3H4 was injected in the right eye of rabbit at 24 hours following the initiation of the NAION. At 14 days following the assault the optic nerve of the right eye underwent an axotomy of the nerve and stained with Di-Asp marker. The staining allowed for the determination of the number of live retinal ganglion cells (RGC). Following staining, the rabbits were sacrificed and flat mounting of the retina was performed. The retina was examined under microscope and the viability of RGC was evaluated by counting viable RGC. 48%-50% of RGCs were found to be viable compared to 18%-20% found in axotomised optic nerve with no treatment.

Example 8

Treatment of Glaucoma in Rabbits

The Fab 3H4 was used to treat acute glaucoma in an induced-high intraocular pressure (IOP) rabbit model.

High intraocular pressure (IOP) in male, 12 weeks old, New Zealand albino rabbits, under deeply anesthesia (Xylasine and Ketamine), was created by introducing in the anterior chamber a maintainer cannula (used in cataract surgery) and connecting it to an intravenous infusion pack of 500 cc volume containing saline. The pack was fixed at 80 cm height and created an IOP of 45 mmHg to 50 mmHg. This IOP was maintained for 1.5 hour. Twenty four hours following the assault, intravitreal implants loaded with Sema3A 3H4 Fab or blank implants, serving as control, were introduced into the eye globe using vitrectomy technique. Following 14 days from the assault the same procedure of staining the RGC, flat mounting and counting live RGC was done.

Figures 10A, 10B, 10C:
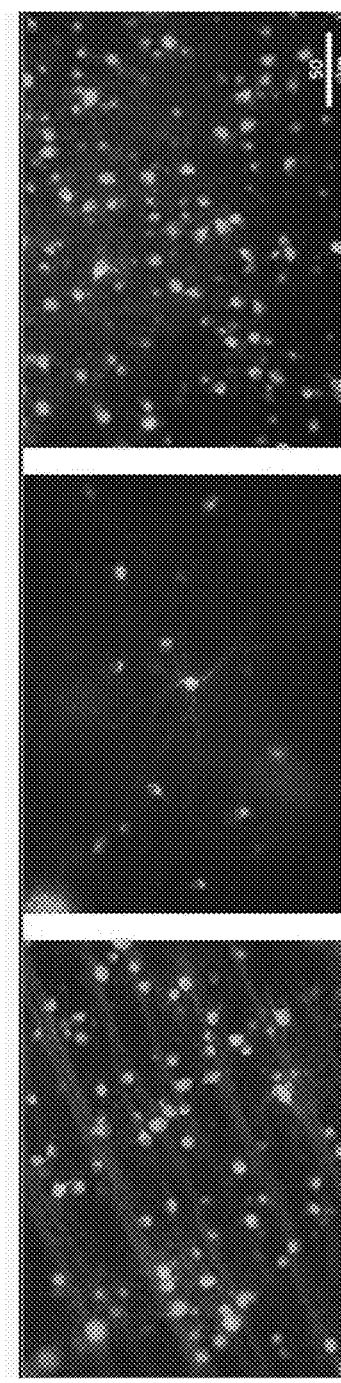
FIGS. 10A-C are photographs illustrating the effect of Sema3A antibody 3H4 tested in a rabbit glaucoma model.

FIGS. 10A-C are photographs of fluorescently stained retinal ganglion cells obtained from the rabbit 14 days after insult. Anti-Sema3A treatment with 3H4 antibody was associated with protection of RGC.

Example 9

Efficacy of 3H4 Antibody

Rats were subjected to optic nerve axotomy and treated with either vehicle of 3H4 Fab. Vehicle animals received PBS as a single intravitreal injection. The treated animals received 2.4 µg/eye 3H4 Fab.

Results

Figure 11:
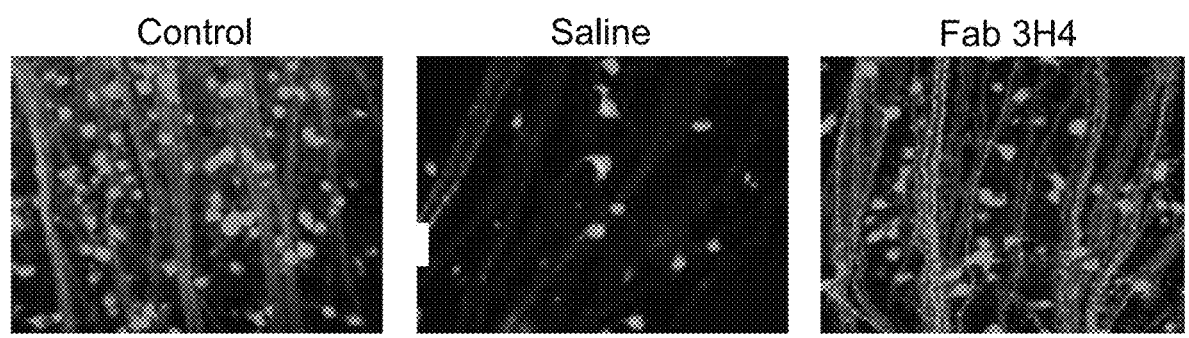
FIG. 11 are photographs of rat retina and plot of RGC survival. The control image (left) is of a retina of a healthy rat. Vehicle and 3H4 Fab treated group were subjected to axotomy immediately prior to treatment. Data from 14 days following optic nerve surgery and 2 days following Di-Asp retrograde staining of RGC.
Figure 11:
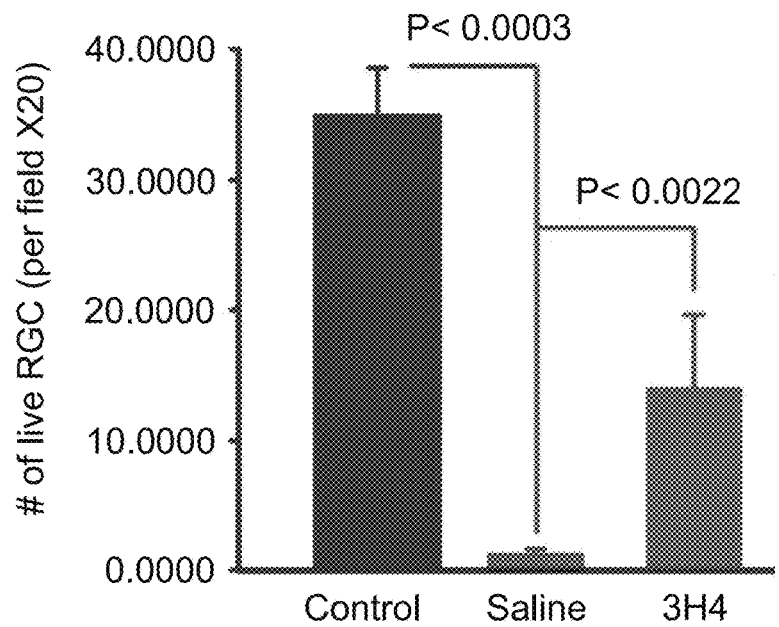

As shown in FIG. 11, rats that received the 3H4 antibody had more live cells than those treated with vehicle.

Example 10

Toxicity of 3H4 Antibody

Rats were subjected to intravitreal treatment of antibodies according to Table 7, herein below. Four days later the eyes were enucleated, fixed and prepared for histology.

TABLE 7

| Treatment | Batch | Dose (µg/eye) | Administration details (µL/eye) (concentration) | N |
|---|---|---|---|---|
| SA | IgG α-streptavidin | 4 µg | 4 µl 1 mg/ml | 1 |
| 3E12 Fab | Fab 3E12 | 4.4 µg | 4 µl 1.1 mg/ml | 1 |
| 3E12 IgG | IgG 3E12 | 4 µg | 4 µl 1 mg/ml | 1 |
| 3H4 IgG | IgG 3H4 | 4.6 µg | 4 µl 1.15 mg/ml | 1 |

Figure 12:
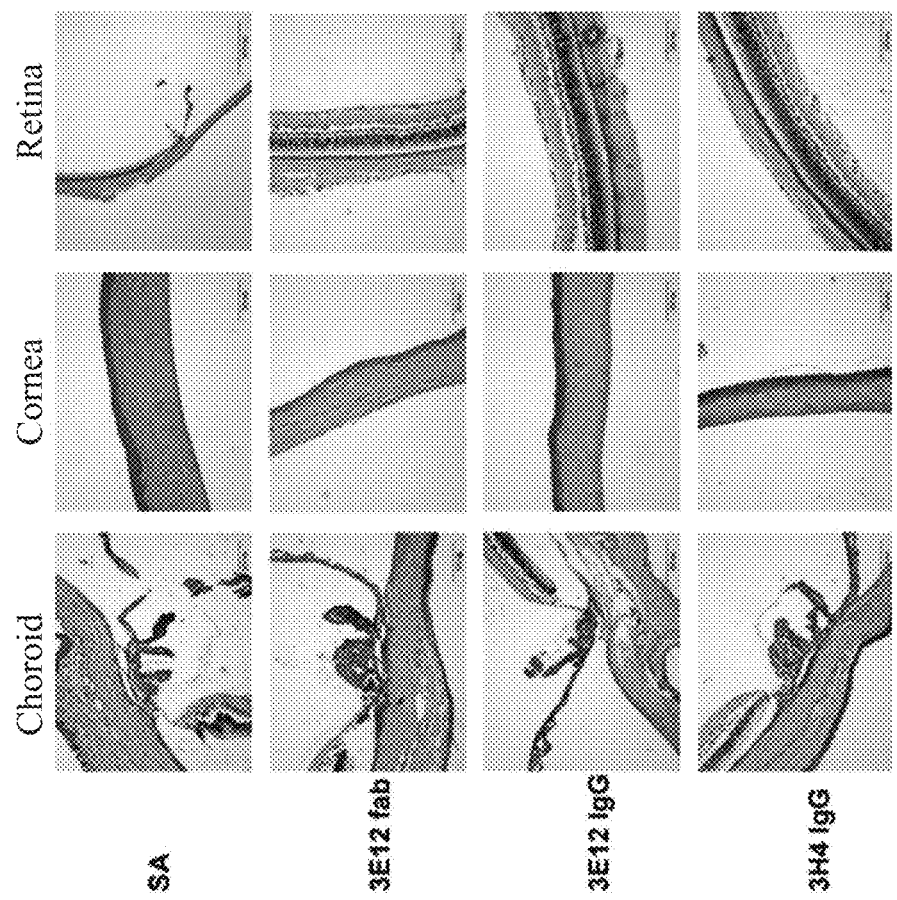
FIG. 12 are representative photographs from chroroid, cornea and retina of animals treated with either anti-Sema3A antibodies (3E12-Fab, 3E12-IgG and 3H4-IgG) or non-specific anti-streptavidin (SA) IgG.

As illustrated in FIG. 12, Hematoxylin-Eosin staining showed no signs of toxicity or inflammation in the choroid, cornea and retina of treated eyes.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method of treating an ocular disease selected from the group consisting of non-arthritic ischemic optic atrophy (NAION), glaucoma and retinal detachment in a subject in need thereof, the method comprising administering to the subject a therapeutically effective amount of an antibody comprising an antigen recognition region which binds a semaphorin 3A (Sema3A), having complementarity determining region (CDR) amino acid sequences as set forth in: SEQ ID NOs: 53 (CDR1), 69 (CDR2) and 85 (CDR3), sequentially arranged from N to C on a light chain of the antibody; and SEQ ID NOs: 5 (CDR1), 21 (CDR2) and 37 (CDR3), sequentially arranged from N to C on a heavy chain of the antibody, thereby treating the ocular disease in the subject.

2. The method of claim 1, wherein said antibody has a VL amino acid sequence as set forth in SEQ ID NO: 117 and/or a VH amino acid sequence as set forth in SEQ ID NO: 101.

* * * * *

SEQUENCE LISTING

<160> NUMBER OF SEQ ID NOS: 137

<210> SEQ ID NO 1

```
<211> LENGTH: 5
<212> TYPE: PRT
<213> ORGANISM: Artificial sequence
<220> FEATURE:
<223> OTHER INFORMATION: complementarity determining regions (CDRs)
      amino acid sequence

<400> SEQUENCE: 1

Ser Tyr Asp Met Asp
1               5

<210> SEQ ID NO 2
<211> LENGTH: 5
<212> TYPE: PRT
<213> ORGANISM: Artificial sequence
<220> FEATURE:
<223> OTHER INFORMATION: complementarity determining regions (CDRs)
      amino acid sequence

<400> SEQUENCE: 2

Ser Tyr Trp Met His
1               5

<210> SEQ ID NO 3
<211> LENGTH: 5
<212> TYPE: PRT
<213> ORGANISM: Artificial sequence
<220> FEATURE:
<223> OTHER INFORMATION: complementarity determining regions (CDRs)
      amino acid sequence

<400> SEQUENCE: 3

Asp His Tyr Met Asp
1               5

<210> SEQ ID NO 4
<211> LENGTH: 5
<212> TYPE: PRT
<213> ORGANISM: Artificial sequence
<220> FEATURE:
<223> OTHER INFORMATION: complementarity determining regions (CDRs)
      amino acid sequence

<400> SEQUENCE: 4

Asp Tyr Trp Met His
1               5

<210> SEQ ID NO 5
<211> LENGTH: 5
<212> TYPE: PRT
<213> ORGANISM: Artificial sequence
<220> FEATURE:
<223> OTHER INFORMATION: complementarity determining regions (CDRs)
      amino acid sequence

<400> SEQUENCE: 5

Ser Tyr Ala Val His
1               5

<210> SEQ ID NO 6
<211> LENGTH: 5
<212> TYPE: PRT
<213> ORGANISM: Artificial sequence
<220> FEATURE:
<223> OTHER INFORMATION: complementarity determining regions (CDRs)
      amino acid sequence

<400> SEQUENCE: 6
```

Ser Tyr Gly Met His
1               5

<210> SEQ ID NO 7
<211> LENGTH: 5
<212> TYPE: PRT
<213> ORGANISM: Artificial sequence
<220> FEATURE:
<223> OTHER INFORMATION: complementarity determining regions (CDRs)
      amino acid sequence

<400> SEQUENCE: 7

Ser Tyr Gly Met His
1               5

<210> SEQ ID NO 8
<211> LENGTH: 5
<212> TYPE: PRT
<213> ORGANISM: Artificial sequence
<220> FEATURE:
<223> OTHER INFORMATION: complementarity determining regions (CDRs)
      amino acid sequence

<400> SEQUENCE: 8

Asn Asn Tyr Met Ser
1               5

<210> SEQ ID NO 9
<211> LENGTH: 13
<212> TYPE: PRT
<213> ORGANISM: Artificial sequence
<220> FEATURE:
<223> OTHER INFORMATION: complementarity determining regions (CDRs)
      amino acid sequence

<400> SEQUENCE: 9

Ala Ala Ser Gly Phe Thr Phe Thr Asp Tyr Tyr Met Ser
1               5                   10

<210> SEQ ID NO 10
<211> LENGTH: 5
<212> TYPE: PRT
<213> ORGANISM: Artificial sequence
<220> FEATURE:
<223> OTHER INFORMATION: complementarity determining regions (CDRs)
      amino acid sequence

<400> SEQUENCE: 10

Pro Tyr Ala Met Ser
1               5

<210> SEQ ID NO 11
<211> LENGTH: 5
<212> TYPE: PRT
<213> ORGANISM: Artificial sequence
<220> FEATURE:
<223> OTHER INFORMATION: complementarity determining regions (CDRs)
      amino acid sequence

<400> SEQUENCE: 11

Asn His Ala Met Ser
1               5

<210> SEQ ID NO 12
<211> LENGTH: 5
<212> TYPE: PRT
<213> ORGANISM: Artificial sequence
<220> FEATURE:

<223> OTHER INFORMATION: complementarity determining regions (CDRs)
      amino acid sequence

<400> SEQUENCE: 12

Asp Phe Ala Met Ser
1               5

<210> SEQ ID NO 13
<211> LENGTH: 5
<212> TYPE: PRT
<213> ORGANISM: Artificial sequence
<220> FEATURE:
<223> OTHER INFORMATION: complementarity determining regions (CDRs)
      amino acid sequence

<400> SEQUENCE: 13

Asp Tyr Tyr Met Ser
1               5

<210> SEQ ID NO 14
<211> LENGTH: 5
<212> TYPE: PRT
<213> ORGANISM: Artificial sequence
<220> FEATURE:
<223> OTHER INFORMATION: complementarity determining regions (CDRs)
      amino acid sequence

<400> SEQUENCE: 14

Asp Tyr Tyr Met Asn
1               5

<210> SEQ ID NO 15
<211> LENGTH: 5
<212> TYPE: PRT
<213> ORGANISM: Artificial sequence
<220> FEATURE:
<223> OTHER INFORMATION: complementarity determining regions (CDRs)
      amino acid sequence

<400> SEQUENCE: 15

Asn Phe Val Met Asn
1               5

<210> SEQ ID NO 16
<211> LENGTH: 5
<212> TYPE: PRT
<213> ORGANISM: Artificial sequence
<220> FEATURE:
<223> OTHER INFORMATION: complementarity determining regions (CDRs)
      amino acid sequence

<400> SEQUENCE: 16

Leu Tyr Asn Ile Asn
1               5

<210> SEQ ID NO 17
<211> LENGTH: 17
<212> TYPE: PRT
<213> ORGANISM: Artificial sequence
<220> FEATURE:
<223> OTHER INFORMATION: complementarity determining regions (CDRs)
      amino acid sequence

<400> SEQUENCE: 17

Ala Ile Asn Ser Asn Gly Asp Ser Thr Tyr Tyr Pro Asp Thr Val Lys
1               5                   10                  15

Asp

<210> SEQ ID NO 18
<211> LENGTH: 17
<212> TYPE: PRT
<213> ORGANISM: Artificial sequence
<220> FEATURE:
<223> OTHER INFORMATION: complementarity determining regions (CDRs)
    amino acid sequence

<400> SEQUENCE: 18

Ser Thr Thr Gly Ser Gly Gly Ser Thr Tyr Tyr Ala Asp Ser Val Lys
1               5                   10                  15

Gly

<210> SEQ ID NO 19
<211> LENGTH: 17
<212> TYPE: PRT
<213> ORGANISM: Artificial sequence
<220> FEATURE:
<223> OTHER INFORMATION: complementarity determining regions (CDRs)
    amino acid sequence

<400> SEQUENCE: 19

Ala Ile Ser Gly Val Gly Gly Ser Thr Tyr Tyr Ala Asp Ser Val Lys
1               5                   10                  15

Gly

<210> SEQ ID NO 20
<211> LENGTH: 18
<212> TYPE: PRT
<213> ORGANISM: Artificial sequence
<220> FEATURE:
<223> OTHER INFORMATION: complementarity determining regions (CDRs)
    amino acid sequence

<400> SEQUENCE: 20

Ala Leu Thr Gly Gly Gly Asp Thr Pro Trp Tyr Pro Gly Ser Val Lys
1               5                   10                  15

Gly Arg

<210> SEQ ID NO 21
<211> LENGTH: 17
<212> TYPE: PRT
<213> ORGANISM: Artificial sequence
<220> FEATURE:
<223> OTHER INFORMATION: complementarity determining regions (CDRs)
    amino acid sequence

<400> SEQUENCE: 21

Ser Thr Glu Gly Ser Gly Val Gly Thr Ser Tyr Thr Asp Ser Val Lys
1               5                   10                  15

Gly

<210> SEQ ID NO 22
<211> LENGTH: 17
<212> TYPE: PRT
<213> ORGANISM: Artificial sequence
<220> FEATURE:
<223> OTHER INFORMATION: complementarity determining regions (CDRs)
    amino acid sequence

<400> SEQUENCE: 22

Tyr Ile Ser Ser Ser Gly Ser His Thr Ser Phe Ala Asp Ser Val Lys
1               5                   10                  15

Gly

<210> SEQ ID NO 23
<211> LENGTH: 18
<212> TYPE: PRT
<213> ORGANISM: Artificial sequence
<220> FEATURE:
<223> OTHER INFORMATION: complementarity determining regions (CDRs)
      amino acid sequence

<400> SEQUENCE: 23

Ser Ile Ser Pro Thr Thr Asn Tyr Arg Ser Tyr Ala Asp Ser Leu Arg
1               5                   10                  15

Gly Arg

<210> SEQ ID NO 24
<211> LENGTH: 17
<212> TYPE: PRT
<213> ORGANISM: Artificial sequence
<220> FEATURE:
<223> OTHER INFORMATION: complementarity determining regions (CDRs)
      amino acid sequence

<400> SEQUENCE: 24

Gly Leu Ser Gly Phe Gly Arg Gly Ala His Tyr Ser Asp Ser Val Lys
1               5                   10                  15

Gly

<210> SEQ ID NO 25
<211> LENGTH: 17
<212> TYPE: PRT
<213> ORGANISM: Artificial sequence
<220> FEATURE:
<223> OTHER INFORMATION: complementarity determining regions (CDRs)
      amino acid sequence

<400> SEQUENCE: 25

Ala Ile Ser Asp Ser Gly Gly Met Thr Tyr Tyr Ala Asp Ser Val Arg
1               5                   10                  15

Gly

<210> SEQ ID NO 26
<211> LENGTH: 16
<212> TYPE: PRT
<213> ORGANISM: Artificial sequence
<220> FEATURE:
<223> OTHER INFORMATION: complementarity determining regions (CDRs)
      amino acid sequence

<400> SEQUENCE: 26

Val Ile Phe Thr Ser Gly Thr Thr Asn Tyr Ala Asp Ser Val Lys Gly
1               5                   10                  15

<210> SEQ ID NO 27
<211> LENGTH: 17
<212> TYPE: PRT
<213> ORGANISM: Artificial sequence
<220> FEATURE:
<223> OTHER INFORMATION: complementarity determining regions (CDRs)
      amino acid sequence

<400> SEQUENCE: 27

Ser Ile Ser Ala Ser Gly Gly Ser Thr Tyr Tyr Ala Asp Ser Val Lys
1               5                   10                  15

Gly

```
<210> SEQ ID NO 28
<211> LENGTH: 17
<212> TYPE: PRT
<213> ORGANISM: Artificial sequence
<220> FEATURE:
<223> OTHER INFORMATION: complementarity determining regions (CDRs)
      amino acid sequence

<400> SEQUENCE: 28

Ser Ile Ser Ser Asn Ser Ser Tyr Ile Tyr Tyr Ala Asp Ser Val Lys
1               5                   10                  15
Gly

<210> SEQ ID NO 29
<211> LENGTH: 17
<212> TYPE: PRT
<213> ORGANISM: Artificial sequence
<220> FEATURE:
<223> OTHER INFORMATION: complementarity determining regions (CDRs)
      amino acid sequence

<400> SEQUENCE: 29

Ser Ile Ser Ser Ser Ser Ser Tyr Ile Tyr Tyr Ala Asp Ser Val Lys
1               5                   10                  15
Gly

<210> SEQ ID NO 30
<211> LENGTH: 17
<212> TYPE: PRT
<213> ORGANISM: Artificial sequence
<220> FEATURE:
<223> OTHER INFORMATION: complementarity determining regions (CDRs)
      amino acid sequence

<400> SEQUENCE: 30

Arg Ile Thr Asn Asp Gly Met Ser Thr Ala Tyr Ala Asp Phe Val Lys
1               5                   10                  15
Gly

<210> SEQ ID NO 31
<211> LENGTH: 17
<212> TYPE: PRT
<213> ORGANISM: Artificial sequence
<220> FEATURE:
<223> OTHER INFORMATION: complementarity determining regions (CDRs)
      amino acid sequence

<400> SEQUENCE: 31

Arg Ile Asn Thr Asp Gly Thr Ser Thr Asn Tyr Ala Asp Ser Val Thr
1               5                   10                  15
Gly

<210> SEQ ID NO 32
<211> LENGTH: 18
<212> TYPE: PRT
<213> ORGANISM: Artificial sequence
<220> FEATURE:
<223> OTHER INFORMATION: complementarity determining regions (CDRs)
      amino acid sequence

<400> SEQUENCE: 32

Thr Ile Ser Gly Ser Gly Leu Asn Thr Tyr Tyr Ser Asp Pro Val Lys
1               5                   10                  15
```

Gly Arg

<210> SEQ ID NO 33
<211> LENGTH: 13
<212> TYPE: PRT
<213> ORGANISM: Artificial sequence
<220> FEATURE:
<223> OTHER INFORMATION: complementarity determining regions (CDRs)
      amino acid sequence

<400> SEQUENCE: 33

Ala Gln Gly Gln Trp Leu Phe His Asn Trp Phe Asp His
1               5                   10

<210> SEQ ID NO 34
<211> LENGTH: 10
<212> TYPE: PRT
<213> ORGANISM: Artificial sequence
<220> FEATURE:
<223> OTHER INFORMATION: complementarity determining regions (CDRs)
      amino acid sequence

<400> SEQUENCE: 34

Gly Thr Ser Gly Trp Tyr Gly Ile Asp Tyr
1               5                   10

<210> SEQ ID NO 35
<211> LENGTH: 9
<212> TYPE: PRT
<213> ORGANISM: Artificial sequence
<220> FEATURE:
<223> OTHER INFORMATION: complementarity determining regions (CDRs)
      amino acid sequence

<400> SEQUENCE: 35

Glu Asp Asn Ser Gly Ser Pro Asp Tyr
1               5

<210> SEQ ID NO 36
<211> LENGTH: 15
<212> TYPE: PRT
<213> ORGANISM: Artificial sequence
<220> FEATURE:
<223> OTHER INFORMATION: complementarity determining regions (CDRs)
      amino acid sequence

<400> SEQUENCE: 36

Val Lys Val Val Pro Arg Ser Arg Glu Thr Asp Ala Phe Asp Val
1               5                   10                  15

<210> SEQ ID NO 37
<211> LENGTH: 13
<212> TYPE: PRT
<213> ORGANISM: Artificial sequence
<220> FEATURE:
<223> OTHER INFORMATION: complementarity determining regions (CDRs)
      amino acid sequence

<400> SEQUENCE: 37

Met Leu Gly Gly Gly Asn Pro Leu Asp Tyr Leu Asp Tyr
1               5                   10

<210> SEQ ID NO 38
<211> LENGTH: 8
<212> TYPE: PRT
<213> ORGANISM: Artificial sequence
<220> FEATURE:
<223> OTHER INFORMATION: complementarity determining regions (CDRs)

amino acid sequence

<400> SEQUENCE: 38

Asp Gly Leu Phe Gly Ile Asp Tyr
1               5

<210> SEQ ID NO 39
<211> LENGTH: 15
<212> TYPE: PRT
<213> ORGANISM: Artificial sequence
<220> FEATURE:
<223> OTHER INFORMATION: complementarity determining regions (CDRs)
      amino acid sequence

<400> SEQUENCE: 39

Gly His Arg Asp Arg Ser Gly Ser Pro Val Gly Tyr Leu Asp Tyr
1               5                   10                  15

<210> SEQ ID NO 40
<211> LENGTH: 12
<212> TYPE: PRT
<213> ORGANISM: Artificial sequence
<220> FEATURE:
<223> OTHER INFORMATION: complementarity determining regions (CDRs)
      amino acid sequence

<400> SEQUENCE: 40

Gly Ala Val Gly Tyr Leu Gln Trp Phe Pro Asp Val
1               5                   10

<210> SEQ ID NO 41
<211> LENGTH: 15
<212> TYPE: PRT
<213> ORGANISM: Artificial sequence
<220> FEATURE:
<223> OTHER INFORMATION: complementarity determining regions (CDRs)
      amino acid sequence

<400> SEQUENCE: 41

Glu Pro Leu Gly Asp His Gly Asp Leu Arg Pro Asp Phe Asp Tyr
1               5                   10                  15

<210> SEQ ID NO 42
<211> LENGTH: 16
<212> TYPE: PRT
<213> ORGANISM: Artificial sequence
<220> FEATURE:
<223> OTHER INFORMATION: complementarity determining regions (CDRs)
      amino acid sequence

<400> SEQUENCE: 42

Glu Leu Arg Arg Pro Gly Asp Gly Val Pro Ala Ala Thr Ser Asp Tyr
1               5                   10                  15

<210> SEQ ID NO 43
<211> LENGTH: 9
<212> TYPE: PRT
<213> ORGANISM: Artificial sequence
<220> FEATURE:
<223> OTHER INFORMATION: complementarity determining regions (CDRs)
      amino acid sequence

<400> SEQUENCE: 43

Ala Glu Ser Gly Tyr Gln Leu Asp Tyr
1               5

<210> SEQ ID NO 44

```
<211> LENGTH: 12
<212> TYPE: PRT
<213> ORGANISM: Artificial sequence
<220> FEATURE:
<223> OTHER INFORMATION: complementarity determining regions (CDRs)
      amino acid sequence

<400> SEQUENCE: 44

Gly Arg Val Tyr Gly Asp Phe Gly Lys Phe Asp Ser
1               5                   10

<210> SEQ ID NO 45
<211> LENGTH: 9
<212> TYPE: PRT
<213> ORGANISM: Artificial sequence
<220> FEATURE:
<223> OTHER INFORMATION: complementarity determining regions (CDRs)
      amino acid sequence

<400> SEQUENCE: 45

Gly Gly Asp Tyr Asp Ala Phe Asp Ile
1               5

<210> SEQ ID NO 46
<211> LENGTH: 17
<212> TYPE: PRT
<213> ORGANISM: Artificial sequence
<220> FEATURE:
<223> OTHER INFORMATION: complementarity determining regions (CDRs)
      amino acid sequence

<400> SEQUENCE: 46

Ser Pro Leu Glu Glu Gly Arg Ile Thr Phe Arg Tyr Trp Tyr Phe Asp
1               5                   10                  15

Leu

<210> SEQ ID NO 47
<211> LENGTH: 16
<212> TYPE: PRT
<213> ORGANISM: Artificial sequence
<220> FEATURE:
<223> OTHER INFORMATION: complementarity determining regions (CDRs)
      amino acid sequence

<400> SEQUENCE: 47

Asp Tyr Pro Leu Arg Arg Leu Met Tyr Tyr Tyr Tyr Gly Met Asp Val
1               5                   10                  15

<210> SEQ ID NO 48
<211> LENGTH: 8
<212> TYPE: PRT
<213> ORGANISM: Artificial sequence
<220> FEATURE:
<223> OTHER INFORMATION: complementarity determining regions (CDRs)
      amino acid sequence

<400> SEQUENCE: 48

Asp Glu Asp Thr Tyr Ala Phe Asn
1               5

<210> SEQ ID NO 49
<211> LENGTH: 13
<212> TYPE: PRT
<213> ORGANISM: Artificial sequence
<220> FEATURE:
<223> OTHER INFORMATION: complementarity determining regions (CDRs)
      amino acid sequence
```

```
<400> SEQUENCE: 49

Ser Gly Gly Asn Ser Asn Ile Gly Asp His Tyr Val Ser
1               5                   10

<210> SEQ ID NO 50
<211> LENGTH: 13
<212> TYPE: PRT
<213> ORGANISM: Artificial sequence
<220> FEATURE:
<223> OTHER INFORMATION: complementarity determining regions (CDRs)
      amino acid sequence

<400> SEQUENCE: 50

Ser Gly Ser Ser Ser Asn Ile Gly Asn Asn His Val Ser
1               5                   10

<210> SEQ ID NO 51
<211> LENGTH: 10
<212> TYPE: PRT
<213> ORGANISM: Artificial sequence
<220> FEATURE:
<223> OTHER INFORMATION: complementarity determining regions (CDRs)
      amino acid sequence

<400> SEQUENCE: 51

Ala Ser Gln Ser Val Gly Ser Asn Leu Ala
1               5                   10

<210> SEQ ID NO 52
<211> LENGTH: 13
<212> TYPE: PRT
<213> ORGANISM: Artificial sequence
<220> FEATURE:
<223> OTHER INFORMATION: complementarity determining regions (CDRs)
      amino acid sequence

<400> SEQUENCE: 52

Thr Gly Gly Pro Pro Asn Ile Gly Asn Asn Ala Val Phe
1               5                   10

<210> SEQ ID NO 53
<211> LENGTH: 14
<212> TYPE: PRT
<213> ORGANISM: Artificial sequence
<220> FEATURE:
<223> OTHER INFORMATION: complementarity determining regions (CDRs)
      amino acid sequence

<400> SEQUENCE: 53

Ser Gly Ser Ser Ser Asn Leu Gly Glu Gly Tyr Asp Val His
1               5                   10

<210> SEQ ID NO 54
<211> LENGTH: 11
<212> TYPE: PRT
<213> ORGANISM: Artificial sequence
<220> FEATURE:
<223> OTHER INFORMATION: complementarity determining regions (CDRs)
      amino acid sequence

<400> SEQUENCE: 54

Arg Ala Ser Gln Ser Ile Ser Ser Asn Leu Ala
1               5                   10

<210> SEQ ID NO 55
<211> LENGTH: 13
<212> TYPE: PRT
```

```
<213> ORGANISM: Artificial sequence
<220> FEATURE:
<223> OTHER INFORMATION: complementarity determining regions (CDRs)
      amino acid sequence

<400> SEQUENCE: 55

Thr Gly Ser Ser Ser Asn Ile Gly Arg Asn Ser Val Asn
1               5                   10

<210> SEQ ID NO 56
<211> LENGTH: 13
<212> TYPE: PRT
<213> ORGANISM: Artificial sequence
<220> FEATURE:
<223> OTHER INFORMATION: complementarity determining regions (CDRs)
      amino acid sequence

<400> SEQUENCE: 56

Ser Gly Gly Arg Ser Asn Ile Gly Ser Asn Thr Val Asn
1               5                   10

<210> SEQ ID NO 57
<211> LENGTH: 13
<212> TYPE: PRT
<213> ORGANISM: Artificial sequence
<220> FEATURE:
<223> OTHER INFORMATION: complementarity determining regions (CDRs)
      amino acid sequence

<400> SEQUENCE: 57

Ser Gly Gly Ser Ser Asn Ile Gly Ser Gln Thr Val Leu
1               5                   10

<210> SEQ ID NO 58
<211> LENGTH: 13
<212> TYPE: PRT
<213> ORGANISM: Artificial sequence
<220> FEATURE:
<223> OTHER INFORMATION: complementarity determining regions (CDRs)
      amino acid sequence

<400> SEQUENCE: 58

Ser Gly Ser Thr Ser Asn Ile Gly Arg Asn Tyr Val Cys
1               5                   10

<210> SEQ ID NO 59
<211> LENGTH: 12
<212> TYPE: PRT
<213> ORGANISM: Artificial sequence
<220> FEATURE:
<223> OTHER INFORMATION: complementarity determining regions (CDRs)
      amino acid sequence

<400> SEQUENCE: 59

Arg Ala Ser Gln Ser Val Ser Ser Ser Tyr Leu Ala
1               5                   10

<210> SEQ ID NO 60
<211> LENGTH: 11
<212> TYPE: PRT
<213> ORGANISM: Artificial sequence
<220> FEATURE:
<223> OTHER INFORMATION: complementarity determining regions (CDRs)
      amino acid sequence

<400> SEQUENCE: 60

Thr Ala Ser Gln Ser Val Gly Arg Tyr Leu Ala
1               5                   10
```

<210> SEQ ID NO 61
<211> LENGTH: 13
<212> TYPE: PRT
<213> ORGANISM: Artificial sequence
<220> FEATURE:
<223> OTHER INFORMATION: complementarity determining regions (CDRs) amino acid sequence

<400> SEQUENCE: 61

Ser Gly Arg Ser Ser Asn Val Gly Ser Asn Ser Val Asn
1               5                   10

<210> SEQ ID NO 62
<211> LENGTH: 11
<212> TYPE: PRT
<213> ORGANISM: Artificial sequence
<220> FEATURE:
<223> OTHER INFORMATION: complementarity determining regions (CDRs) amino acid sequence

<400> SEQUENCE: 62

Arg Ala Ser Gln Ser Val Ser Ser Asn Leu Ala
1               5                   10

<210> SEQ ID NO 63
<211> LENGTH: 12
<212> TYPE: PRT
<213> ORGANISM: Artificial sequence
<220> FEATURE:
<223> OTHER INFORMATION: complementarity determining regions (CDRs) amino acid sequence

<400> SEQUENCE: 63

Arg Ala Ser Gln Thr Ile Ser Ser Asn Leu Ala Trp
1               5                   10

<210> SEQ ID NO 64
<211> LENGTH: 12
<212> TYPE: PRT
<213> ORGANISM: Artificial sequence
<220> FEATURE:
<223> OTHER INFORMATION: complementarity determining regions (CDRs) amino acid sequence

<400> SEQUENCE: 64

Arg Ala Ser Gln Ser Val Ser Ser Tyr Leu Ala
1               5                   10

<210> SEQ ID NO 65
<211> LENGTH: 7
<212> TYPE: PRT
<213> ORGANISM: Artificial sequence
<220> FEATURE:
<223> OTHER INFORMATION: complementarity determining regions (CDRs) amino acid sequence

<400> SEQUENCE: 65

Gly Asp Thr His Arg Pro Ser
1               5

<210> SEQ ID NO 66
<211> LENGTH: 7
<212> TYPE: PRT
<213> ORGANISM: Artificial sequence
<220> FEATURE:
<223> OTHER INFORMATION: complementarity determining regions (CDRs) amino acid sequence

```
<400> SEQUENCE: 66

Cys Asn Asn Arg Pro Ser
1               5

<210> SEQ ID NO 67
<211> LENGTH: 7
<212> TYPE: PRT
<213> ORGANISM: Artificial sequence
<220> FEATURE:
<223> OTHER INFORMATION: complementarity determining regions (CDRs)
      amino acid sequence

<400> SEQUENCE: 67

Gly Ala Ser Ser Arg Ala Thr
1               5

<210> SEQ ID NO 68
<211> LENGTH: 7
<212> TYPE: PRT
<213> ORGANISM: Artificial sequence
<220> FEATURE:
<223> OTHER INFORMATION: complementarity determining regions (CDRs)
      amino acid sequence

<400> SEQUENCE: 68

Glu Leu Thr Lys Arg Pro Ser
1               5

<210> SEQ ID NO 69
<211> LENGTH: 7
<212> TYPE: PRT
<213> ORGANISM: Artificial sequence
<220> FEATURE:
<223> OTHER INFORMATION: complementarity determining regions (CDRs)
      amino acid sequence

<400> SEQUENCE: 69

Ser Asp Phe Arg Pro Ser Gly
1               5

<210> SEQ ID NO 70
<211> LENGTH: 7
<212> TYPE: PRT
<213> ORGANISM: Artificial sequence
<220> FEATURE:
<223> OTHER INFORMATION: complementarity determining regions (CDRs)
      amino acid sequence

<400> SEQUENCE: 70

Gly Ala Ser Ser Arg Ala Thr
1               5

<210> SEQ ID NO 71
<211> LENGTH: 7
<212> TYPE: PRT
<213> ORGANISM: Artificial sequence
<220> FEATURE:
<223> OTHER INFORMATION: complementarity determining regions (CDRs)
      amino acid sequence

<400> SEQUENCE: 71

Ser Asn His His Arg Pro Ser
1               5

<210> SEQ ID NO 72
<211> LENGTH: 7
```

```
<212> TYPE: PRT
<213> ORGANISM: Artificial sequence
<220> FEATURE:
<223> OTHER INFORMATION: complementarity determining regions (CDRs)
      amino acid sequence

<400> SEQUENCE: 72

Asn Ser Asn Arg Pro Ser Gly
1               5

<210> SEQ ID NO 73
<211> LENGTH: 7
<212> TYPE: PRT
<213> ORGANISM: Artificial sequence
<220> FEATURE:
<223> OTHER INFORMATION: complementarity determining regions (CDRs)
      amino acid sequence

<400> SEQUENCE: 73

Asn Asn Lys Arg Pro Ser Gly
1               5

<210> SEQ ID NO 74
<211> LENGTH: 7
<212> TYPE: PRT
<213> ORGANISM: Artificial sequence
<220> FEATURE:
<223> OTHER INFORMATION: complementarity determining regions (CDRs)
      amino acid sequence

<400> SEQUENCE: 74

Ala Asn Asn Asn Arg Pro Ser
1               5

<210> SEQ ID NO 75
<211> LENGTH: 7
<212> TYPE: PRT
<213> ORGANISM: Artificial sequence
<220> FEATURE:
<223> OTHER INFORMATION: complementarity determining regions (CDRs)
      amino acid sequence

<400> SEQUENCE: 75

Gly Val Ser Asn Arg Ala Thr
1               5

<210> SEQ ID NO 76
<211> LENGTH: 7
<212> TYPE: PRT
<213> ORGANISM: Artificial sequence
<220> FEATURE:
<223> OTHER INFORMATION: complementarity determining regions (CDRs)
      amino acid sequence

<400> SEQUENCE: 76

Gly Ala Ser Ser Arg Ala Thr
1               5

<210> SEQ ID NO 77
<211> LENGTH: 7
<212> TYPE: PRT
<213> ORGANISM: Artificial sequence
<220> FEATURE:
<223> OTHER INFORMATION: complementarity determining regions (CDRs)
      amino acid sequence

<400> SEQUENCE: 77

Thr Asn Asp Gln Arg Pro Ser
```

```
1               5

<210> SEQ ID NO 78
<211> LENGTH: 7
<212> TYPE: PRT
<213> ORGANISM: Artificial sequence
<220> FEATURE:
<223> OTHER INFORMATION: complementarity determining regions (CDRs)
      amino acid sequence

<400> SEQUENCE: 78

Asp Ala Ser Asn Arg Ala Thr
1               5

<210> SEQ ID NO 79
<211> LENGTH: 7
<212> TYPE: PRT
<213> ORGANISM: Artificial sequence
<220> FEATURE:
<223> OTHER INFORMATION: complementarity determining regions (CDRs)
      amino acid sequence

<400> SEQUENCE: 79

Gly Ala Ser Ser Arg Ala Thr
1               5

<210> SEQ ID NO 80
<211> LENGTH: 7
<212> TYPE: PRT
<213> ORGANISM: Artificial sequence
<220> FEATURE:
<223> OTHER INFORMATION: complementarity determining regions (CDRs)
      amino acid sequence

<400> SEQUENCE: 80

Gly Ala Ser Thr Arg Ala Pro
1               5

<210> SEQ ID NO 81
<211> LENGTH: 11
<212> TYPE: PRT
<213> ORGANISM: Artificial sequence
<220> FEATURE:
<223> OTHER INFORMATION: complementarity determining regions (CDRs)
      amino acid sequence

<400> SEQUENCE: 81

Gly Thr Trp Asp Ser Ser Leu Ser Ala Gly Val
1               5                   10

<210> SEQ ID NO 82
<211> LENGTH: 11
<212> TYPE: PRT
<213> ORGANISM: Artificial sequence
<220> FEATURE:
<223> OTHER INFORMATION: complementarity determining regions (CDRs)
      amino acid sequence

<400> SEQUENCE: 82

Gln Val Trp Asp Ser Ser Arg Asp Gln Gly Val
1               5                   10

<210> SEQ ID NO 83
<211> LENGTH: 9
<212> TYPE: PRT
<213> ORGANISM: Artificial sequence
<220> FEATURE:
<223> OTHER INFORMATION: complementarity determining regions (CDRs)
```

```
<400> SEQUENCE: 83

Gln Arg Tyr Asp Gly Ser Pro Tyr Thr
1               5

<210> SEQ ID NO 84
<211> LENGTH: 10
<212> TYPE: PRT
<213> ORGANISM: Artificial sequence
<220> FEATURE:
<223> OTHER INFORMATION: complementarity determining regions (CDRs)
      amino acid sequence

<400> SEQUENCE: 84

Ser Ser Tyr Thr Arg Val Ser Thr Pro Val
1               5                   10

<210> SEQ ID NO 85
<211> LENGTH: 11
<212> TYPE: PRT
<213> ORGANISM: Artificial sequence
<220> FEATURE:
<223> OTHER INFORMATION: complementarity determining regions (CDRs)
      amino acid sequence

<400> SEQUENCE: 85

Ala Ala Trp Asp Asp Ser Leu Ser Ser Gln Val
1               5                   10

<210> SEQ ID NO 86
<211> LENGTH: 9
<212> TYPE: PRT
<213> ORGANISM: Artificial sequence
<220> FEATURE:
<223> OTHER INFORMATION: complementarity determining regions (CDRs)
      amino acid sequence

<400> SEQUENCE: 86

Gln Gln Arg Asp Trp Pro Pro Phe Thr
1               5

<210> SEQ ID NO 87
<211> LENGTH: 10
<212> TYPE: PRT
<213> ORGANISM: Artificial sequence
<220> FEATURE:
<223> OTHER INFORMATION: complementarity determining regions (CDRs)
      amino acid sequence

<400> SEQUENCE: 87

Ser Ser Tyr Ala Gly Ser Asn Lys Tyr Val
1               5                   10

<210> SEQ ID NO 88
<211> LENGTH: 10
<212> TYPE: PRT
<213> ORGANISM: Artificial sequence
<220> FEATURE:
<223> OTHER INFORMATION: complementarity determining regions (CDRs)
      amino acid sequence

<400> SEQUENCE: 88

Cys Ser His Ala Arg Gly Asp Thr Leu Ile
1               5                   10

<210> SEQ ID NO 89
```

```
<211> LENGTH: 11
<212> TYPE: PRT
<213> ORGANISM: Artificial sequence
<220> FEATURE:
<223> OTHER INFORMATION: complementarity determining regions (CDRs)
      amino acid sequence

<400> SEQUENCE: 89

Ala Ser Trp Asp Asp Ser Leu Ser Gly Gly Val
1               5                   10

<210> SEQ ID NO 90
<211> LENGTH: 10
<212> TYPE: PRT
<213> ORGANISM: Artificial sequence
<220> FEATURE:
<223> OTHER INFORMATION: complementarity determining regions (CDRs)
      amino acid sequence

<400> SEQUENCE: 90

Ser Ser Tyr Thr Ser Ser Ser Thr Leu Val
1               5                   10

<210> SEQ ID NO 91
<211> LENGTH: 9
<212> TYPE: PRT
<213> ORGANISM: Artificial sequence
<220> FEATURE:
<223> OTHER INFORMATION: complementarity determining regions (CDRs)
      amino acid sequence

<400> SEQUENCE: 91

Gln Gln Ser Tyr Ser Thr Pro Tyr Thr
1               5

<210> SEQ ID NO 92
<211> LENGTH: 8
<212> TYPE: PRT
<213> ORGANISM: Artificial sequence
<220> FEATURE:
<223> OTHER INFORMATION: complementarity determining regions (CDRs)
      amino acid sequence

<400> SEQUENCE: 92

Gln Gln Tyr Gly Ser Ser Leu Thr
1               5

<210> SEQ ID NO 93
<211> LENGTH: 10
<212> TYPE: PRT
<213> ORGANISM: Artificial sequence
<220> FEATURE:
<223> OTHER INFORMATION: complementarity determining regions (CDRs)
      amino acid sequence

<400> SEQUENCE: 93

Ser Ser Tyr Thr Ser Ser Ser Thr Arg Val
1               5                   10

<210> SEQ ID NO 94
<211> LENGTH: 9
<212> TYPE: PRT
<213> ORGANISM: Artificial sequence
<220> FEATURE:
<223> OTHER INFORMATION: complementarity determining regions (CDRs)
      amino acid sequence

<400> SEQUENCE: 94
```

```
Gln Gln Gly Asp Ser Tyr Pro Tyr Thr
1               5
```

```
<210> SEQ ID NO 95
<211> LENGTH: 11
<212> TYPE: PRT
<213> ORGANISM: Artificial sequence
<220> FEATURE:
<223> OTHER INFORMATION: complementarity determining regions (CDRs)
      amino acid sequence

<400> SEQUENCE: 95

Gln Gln Tyr Ser Trp Ser Pro Arg Val Tyr Ser
1               5                   10
```

```
<210> SEQ ID NO 96
<211> LENGTH: 8
<212> TYPE: PRT
<213> ORGANISM: Artificial sequence
<220> FEATURE:
<223> OTHER INFORMATION: complementarity determining regions (CDRs)
      amino acid sequence

<400> SEQUENCE: 96

His Gln Arg Gly Ser Gly Asp Thr
1               5
```

```
<210> SEQ ID NO 97
<211> LENGTH: 122
<212> TYPE: PRT
<213> ORGANISM: Artificial sequence
<220> FEATURE:
<223> OTHER INFORMATION: Variable Heavy (VH) Domain amino acid sequence

<400> SEQUENCE: 97

Glu Val Gln Leu Leu Glu Ser Gly Gly Gly Leu Val Gln Pro Gly Gly
1               5                   10                  15

Ser Leu Arg Leu Ser Cys Ala Ala Ser Gly Phe Thr Phe Thr Ser Tyr
            20                  25                  30

Asp Met Asp Trp Val Arg Gln Ala Pro Gly Lys Gly Leu Glu Trp Val
        35                  40                  45

Ser Ala Ile Asn Ser Asn Gly Asp Ser Thr Tyr Tyr Pro Asp Thr Val
    50                  55                  60

Lys Asp Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Ala Arg Ala Gln Gly Gln Trp Leu Phe His Asn Trp Phe Asp His Trp
            100                 105                 110

Gly Gln Gly Thr Leu Val Thr Val Ser Ser
        115                 120
```

```
<210> SEQ ID NO 98
<211> LENGTH: 119
<212> TYPE: PRT
<213> ORGANISM: Artificial sequence
<220> FEATURE:
<223> OTHER INFORMATION: Variable Heavy (VH) Domain amino acid sequence

<400> SEQUENCE: 98

Glu Val Gln Leu Leu Glu Ser Gly Gly Gly Leu Val Gln Pro Gly Gly
1               5                   10                  15

Ser Leu Arg Leu Ser Cys Ala Ala Ser Gly Phe Thr Val Ser Ser Tyr
```

```
                    20                  25                  30

Trp Met His Trp Val Arg Gln Ala Pro Gly Lys Gly Leu Glu Trp Val
         35                  40                  45

Ser Ser Thr Thr Gly Ser Gly Gly Ser Thr Tyr Tyr Ala Asp Ser Val
     50                  55                  60

Lys Gly Arg Phe Thr Ile Ser Arg Asp Asn Ser Lys Asn Thr Leu Tyr
 65                  70                  75                  80

Leu Gln Met Asn Ser Leu Arg Ala Glu Asp Thr Ala Val Tyr Tyr Cys
                 85                  90                  95

Ala Arg Gly Thr Ser Gly Trp Tyr Gly Ile Asp Tyr Trp Gly Gln Gly
             100                 105                 110

Thr Leu Val Thr Val Ser Ser
        115

<210> SEQ ID NO 99
<211> LENGTH: 118
<212> TYPE: PRT
<213> ORGANISM: Artificial sequence
<220> FEATURE:
<223> OTHER INFORMATION: Variable Heavy (VH) Domain amino acid sequence

<400> SEQUENCE: 99

Glu Val Gln Leu Leu Glu Ser Gly Gly Gly Leu Val Gln Pro Gly Gly
 1               5                  10                  15

Ser Leu Arg Leu Ser Cys Ala Ala Ser Gly Phe Thr Phe Ser Asp His
                 20                  25                  30

Tyr Met Asp Trp Val Arg Gln Ala Pro Gly Lys Gly Leu Glu Trp Val
         35                  40                  45

Ser Ala Ile Ser Gly Val Gly Gly Ser Thr Tyr Tyr Ala Asp Ser Val
     50                  55                  60

Lys Gly Arg Phe Thr Ile Ser Arg Asp Asn Ser Lys Asn Thr Leu Tyr
 65                  70                  75                  80

Leu Gln Met Asn Ser Leu Arg Ala Glu Asp Thr Ala Val Tyr Tyr Cys
                 85                  90                  95

Ala Arg Glu Asp Asn Ser Gly Ser Pro Asp Tyr Trp Gly Gln Gly Thr
             100                 105                 110

Leu Val Thr Val Ser Ser
        115

<210> SEQ ID NO 100
<211> LENGTH: 124
<212> TYPE: PRT
<213> ORGANISM: Artificial sequence
<220> FEATURE:
<223> OTHER INFORMATION: Variable Heavy (VH) Domain amino acid sequence

<400> SEQUENCE: 100

Glu Val Gln Leu Leu Glu Ser Gly Gly Gly Leu Val Gln Pro Gly Gly
 1               5                  10                  15

Ser Leu Arg Leu Ser Cys Ala Ala Ser Gly Phe Thr Phe Asn Asp Tyr
                 20                  25                  30

Trp Met His Trp Val Arg Gln Ala Pro Gly Lys Gly Leu Glu Trp Val
         35                  40                  45

Ser Ala Leu Thr Gly Gly Gly Asp Thr Pro Trp Tyr Pro Gly Ser Val
     50                  55                  60

Lys Gly Arg Phe Thr Ile Ser Arg Asp Asn Ser Lys Asn Thr Leu Tyr
 65                  70                  75                  80
```

```
Leu Gln Met Asn Ser Leu Arg Ala Glu Asp Thr Ala Val Tyr Tyr Cys
                85                  90                  95

Ala Arg Val Lys Val Val Pro Ser Arg Glu Thr Asp Ala Phe Asp
        100                 105                 110

Val Trp Gly Gln Gly Thr Leu Val Thr Val Ser Ser
        115                 120

<210> SEQ ID NO 101
<211> LENGTH: 122
<212> TYPE: PRT
<213> ORGANISM: Artificial sequence
<220> FEATURE:
<223> OTHER INFORMATION: Variable Heavy (VH) Domain amino acid sequence

<400> SEQUENCE: 101

Glu Val Gln Leu Leu Glu Ser Gly Gly Gly Leu Val Gln Pro Gly Gly
1               5                   10                  15

Ser Leu Arg Leu Ser Cys Ala Ala Ser Gly Phe Thr Phe Arg Ser Tyr
            20                  25                  30

Ala Val His Trp Val Arg Gln Ala Pro Gly Lys Gly Leu Glu Trp Val
        35                  40                  45

Ser Ser Thr Glu Gly Ser Gly Val Gly Thr Ser Tyr Thr Asp Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Ala Arg Met Leu Gly Gly Asn Pro Leu Asp Tyr Leu Asp Tyr Trp
        100                 105                 110

Gly Gln Gly Thr Leu Val Thr Val Ser Ser
        115                 120

<210> SEQ ID NO 102
<211> LENGTH: 117
<212> TYPE: PRT
<213> ORGANISM: Artificial sequence
<220> FEATURE:
<223> OTHER INFORMATION: Variable Heavy (VH) Domain amino acid sequence

<400> SEQUENCE: 102

Glu Val Gln Leu Leu Glu Ser Gly Gly Gly Leu Val Gln Pro Gly Gly
1               5                   10                  15

Ser Leu Arg Leu Ser Cys Ala Ala Ser Gly Phe Thr Phe Ser Ser Tyr
            20                  25                  30

Gly Met His Trp Val Arg Gln Ala Pro Gly Lys Gly Leu Glu Trp Val
        35                  40                  45

Ser Tyr Ile Ser Ser Ser Gly Ser His Thr Ser Phe Ala Asp Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Ala Arg Asp Gly Leu Phe Gly Ile Asp Tyr Trp Gly Gln Gly Thr Leu
        100                 105                 110

Val Thr Val Ser Ser
        115

<210> SEQ ID NO 103
```

```
<211> LENGTH: 124
<212> TYPE: PRT
<213> ORGANISM: Artificial sequence
<220> FEATURE:
<223> OTHER INFORMATION: Variable Heavy (VH) Domain amino acid sequence

<400> SEQUENCE: 103

Glu Val Gln Leu Leu Glu Ser Gly Gly Gly Leu Val Gln Pro Gly Gly
1               5                   10                  15

Ser Leu Arg Leu Ser Cys Ala Ala Ser Gly Phe Thr Phe Arg Ser Tyr
            20                  25                  30

Gly Met His Trp Val Arg Gln Ala Pro Gly Lys Gly Leu Glu Trp Val
        35                  40                  45

Ser Ser Ile Ser Pro Thr Thr Asn Tyr Arg Ser Tyr Ala Asp Ser Leu
    50                  55                  60

Arg Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Ala Arg Gly His Arg Asp Arg Ser Gly Ser Pro Val Gly Tyr Leu Asp
            100                 105                 110

Tyr Trp Gly Gln Gly Thr Leu Val Thr Val Ser Ser
            115                 120

<210> SEQ ID NO 104
<211> LENGTH: 121
<212> TYPE: PRT
<213> ORGANISM: Artificial sequence
<220> FEATURE:
<223> OTHER INFORMATION: Variable Heavy (VH) Domain amino acid sequence

<400> SEQUENCE: 104

Glu Val Gln Leu Leu Glu Ser Gly Gly Gly Leu Val Gln Pro Gly Gly
1               5                   10                  15

Ser Leu Arg Leu Ser Cys Ala Ala Ser Gly Phe Thr Val Arg Asn Asn
            20                  25                  30

Tyr Met Ser Trp Val Arg Gln Ala Pro Gly Lys Gly Leu Glu Trp Val
        35                  40                  45

Ser Gly Leu Ser Gly Phe Gly Arg Gly Ala His Tyr Ser Asp Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Ala Arg Gly Ala Val Gly Tyr Leu Gln Trp Phe Pro Asp Val Trp Gly
            100                 105                 110

Gln Gly Thr Leu Val Thr Val Ser Ser
        115                 120

<210> SEQ ID NO 105
<211> LENGTH: 124
<212> TYPE: PRT
<213> ORGANISM: Artificial sequence
<220> FEATURE:
<223> OTHER INFORMATION: Variable Heavy (VH) Domain amino acid sequence

<400> SEQUENCE: 105

Glu Val Gln Leu Leu Glu Ser Gly Gly Gly Leu Val Gln Pro Gly Gly
1               5                   10                  15
```

Ser Leu Arg Leu Ser Cys Ala Ala Ser Gly Phe Thr Phe Thr Asp Tyr
            20                  25                  30

Tyr Met Ser Trp Val Arg Gln Ala Pro Gly Lys Arg Leu Glu Trp Val
        35                  40                  45

Ser Ala Ile Ser Asp Ser Gly Gly Met Thr Tyr Tyr Ala Asp Ser Val
50                  55                  60

Arg Gly Arg Phe Thr Ile Ser Arg Asp Asn Ser Lys Asn Thr Leu Tyr
65                  70                  75                  80

Leu Gln Met Asn Ser Leu Lys Ala Glu Asp Thr Ala Val Tyr Tyr Cys
                85                  90                  95

Ala Arg Glu Pro Leu Gly Asp His Gly Asp Leu Arg Pro Asp Phe Asp
            100                 105                 110

Tyr Trp Gly Gln Gly Thr Leu Val Thr Val Ser Ser
        115                 120

<210> SEQ ID NO 106
<211> LENGTH: 124
<212> TYPE: PRT
<213> ORGANISM: Artificial sequence
<220> FEATURE:
<223> OTHER INFORMATION: Variable Heavy (VH) Domain amino acid sequence

<400> SEQUENCE: 106

Glu Val Gln Leu Leu Glu Ser Gly Gly Gly Leu Val Gln Pro Gly Gly
1               5                   10                  15

Ser Leu Arg Leu Ser Cys Ala Ala Ser Gly Phe Thr Phe Ser Pro Tyr
            20                  25                  30

Ala Met Ser Trp Val Arg Gln Ala Pro Gly Lys Gly Leu Glu Trp Val
        35                  40                  45

Ser Val Ile Phe Thr Ser Gly Thr Thr Asn Tyr Ala Asp Ser Val Lys
50                  55                  60

Gly Arg Phe Thr Ile Ser Arg Asp Asn Ser Lys Asn Thr Leu Tyr Leu
65                  70                  75                  80

Gln Met Asn Ser Leu Arg Ala Glu Asp Thr Ala Val Tyr Tyr Cys Ala
                85                  90                  95

Arg Glu Leu Arg Arg Pro Gly Asp Gly Val Pro Ala Ala Thr Ser Asp
            100                 105                 110

Tyr Trp Gly Gln Gly Thr Leu Val Thr Val Ser Ser
        115                 120

<210> SEQ ID NO 107
<211> LENGTH: 118
<212> TYPE: PRT
<213> ORGANISM: Artificial sequence
<220> FEATURE:
<223> OTHER INFORMATION: Variable Heavy (VH) Domain amino acid sequence

<400> SEQUENCE: 107

Glu Val Gln Leu Leu Glu Ser Gly Gly Gly Leu Val Gln Pro Gly Gly
1               5                   10                  15

Ser Leu Arg Leu Ser Cys Ala Ala Ser Gly Phe Thr Phe Ser Asn His
            20                  25                  30

Ala Met Ser Trp Val Arg Gln Ala Pro Gly Lys Gly Leu Glu Trp Val
        35                  40                  45

Ser Ser Ile Ser Ala Ser Gly Gly Ser Thr Tyr Tyr Ala Asp Ser Val
50                  55                  60

Lys Gly Arg Phe Thr Ile Ser Arg Asp Asn Ser Lys Asn Thr Leu Tyr
65                  70                  75                  80

```
Leu Gln Met Asn Ser Leu Arg Ala Glu Asp Thr Ala Val Tyr Tyr Cys
                85                  90                  95

Ala Arg Ala Glu Ser Gly Tyr Gln Leu Asp Tyr Trp Gly Gln Gly Thr
            100                 105                 110

Leu Val Thr Val Ser Ser
        115
```

<210> SEQ ID NO 108
<211> LENGTH: 121
<212> TYPE: PRT
<213> ORGANISM: Artificial sequence
<220> FEATURE:
<223> OTHER INFORMATION: Variable Heavy (VH) Domain amino acid sequence

<400> SEQUENCE: 108

```
Glu Val Gln Leu Leu Glu Ser Gly Gly Gly Leu Val Gln Pro Gly Gly
1               5                   10                  15

Ser Leu Arg Leu Ser Cys Ala Ala Ser Gly Phe Thr Phe Gly Asp Phe
            20                  25                  30

Ala Met Ser Trp Val Arg Gln Ala Pro Gly Lys Gly Leu Glu Trp Val
        35                  40                  45

Ser Ser Ile Ser Ser Asn Ser Ser Tyr Ile Tyr Tyr Ala Asp Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Ala Arg Gly Arg Val Tyr Gly Asp Phe Gly Lys Phe Asp Ser Trp Gly
            100                 105                 110

Gln Gly Thr Leu Val Thr Val Ser Ser
        115                 120
```

<210> SEQ ID NO 109
<211> LENGTH: 118
<212> TYPE: PRT
<213> ORGANISM: Artificial sequence
<220> FEATURE:
<223> OTHER INFORMATION: Variable Heavy (VH) Domain amino acid sequence

<400> SEQUENCE: 109

```
Glu Val Gln Leu Leu Glu Ser Gly Gly Gly Leu Val Gln Pro Gly Gly
1               5                   10                  15

Ser Leu Arg Leu Ser Cys Ala Ala Ser Gly Phe Thr Phe Thr Asp Tyr
            20                  25                  30

Tyr Met Ser Trp Val Arg Gln Ala Pro Gly Lys Gly Leu Glu Trp Val
        35                  40                  45

Ser Ser Ile Ser Ser Ser Ser Tyr Ile Tyr Tyr Ala Asp Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Ala Arg Gly Gly Asp Tyr Asp Ala Phe Asp Ile Trp Gly Gln Gly Thr
            100                 105                 110

Leu Val Thr Val Ser Ser
        115
```

-continued

<210> SEQ ID NO 110
<211> LENGTH: 126
<212> TYPE: PRT
<213> ORGANISM: Artificial sequence
<220> FEATURE:
<223> OTHER INFORMATION: Variable Heavy (VH) Domain amino acid sequence

<400> SEQUENCE: 110

Glu Val Gln Leu Leu Glu Ser Gly Gly Gly Leu Val Gln Pro Gly Gly
1               5                   10                  15

Ser Leu Arg Leu Ser Cys Ala Ala Ser Gly Phe Thr Phe Thr Asp Tyr
            20                  25                  30

Tyr Met Asn Trp Val Arg Gln Ala Pro Gly Lys Gly Leu Glu Trp Val
        35                  40                  45

Ser Arg Ile Thr Asn Asp Gly Met Ser Thr Ala Tyr Ala Asp Phe Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Ala Arg Ser Pro Leu Glu Glu Gly Arg Ile Thr Phe Arg Tyr Trp Tyr
            100                 105                 110

Phe Asp Leu Trp Gly Gln Gly Thr Leu Val Thr Val Ser Ser
        115                 120                 125

<210> SEQ ID NO 111
<211> LENGTH: 125
<212> TYPE: PRT
<213> ORGANISM: Artificial sequence
<220> FEATURE:
<223> OTHER INFORMATION: Variable Heavy (VH) Domain amino acid sequence

<400> SEQUENCE: 111

Glu Val Gln Leu Leu Glu Ser Gly Gly Gly Leu Val Gln Pro Gly Gly
1               5                   10                  15

Ser Leu Arg Leu Ser Cys Ala Ala Ser Gly Phe Thr Phe Ser Asn Phe
            20                  25                  30

Val Met Asn Trp Val Arg Gln Ala Pro Gly Lys Gly Leu Glu Trp Val
        35                  40                  45

Ser Arg Ile Asn Thr Asp Gly Thr Ser Thr Asn Tyr Ala Asp Ser Val
    50                  55                  60

Thr Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Ala Arg Asp Tyr Pro Leu Arg Arg Leu Met Tyr Tyr Tyr Gly Met
            100                 105                 110

Asp Val Trp Gly Gln Gly Thr Leu Val Thr Val Ser Ser
        115                 120                 125

<210> SEQ ID NO 112
<211> LENGTH: 117
<212> TYPE: PRT
<213> ORGANISM: Artificial sequence
<220> FEATURE:
<223> OTHER INFORMATION: Variable Heavy (VH) Domain amino acid sequence

<400> SEQUENCE: 112

Glu Val Gln Leu Leu Glu Ser Gly Gly Gly Leu Val Gln Pro Gly Gly
1               5                   10                  15

Ser Leu Arg Leu Pro Cys Ala Ala Ser Gly Phe Thr Val Gly Leu Tyr
            20                  25                  30

Asn Ile Asn Trp Val Arg Gln Ala Pro Gly Lys Gly Leu Ala Trp Val
         35                  40                  45

Ser Thr Ile Ser Gly Ser Gly Leu Asn Thr Tyr Tyr Ser Asp Pro Val
 50                  55                  60

Lys Gly Arg Phe Thr Ile Ser Arg Asp Asn Ser Lys Asn Thr Leu Tyr
 65                  70                  75                  80

Leu Gln Met Asn Ser Leu Arg Ala Glu Asp Thr Ala Val Tyr Tyr Cys
                 85                  90                  95

Ala Arg Asp Glu Asp Thr Tyr Ala Phe Asn Trp Gly Gln Gly Thr Leu
             100                 105                 110

Val Thr Val Ser Ser
            115

<210> SEQ ID NO 113
<211> LENGTH: 110
<212> TYPE: PRT
<213> ORGANISM: Artificial sequence
<220> FEATURE:
<223> OTHER INFORMATION: Variable Light (VL) Domain amino acid sequence

<400> SEQUENCE: 113

Gln Ser Val Leu Thr Gln Pro Pro Ser Ala Ser Gly Thr Pro Gly Gln
1               5                   10                  15

Arg Val Thr Ile Ser Cys Ser Gly Gly Asn Ser Asn Ile Gly Asp His
            20                  25                  30

Tyr Val Ser Trp Tyr Gln Gln Leu Pro Gly Thr Ala Pro Lys Leu Leu
         35                  40                  45

Ile Tyr Gly Asp Thr His Arg Pro Ser Gly Val Pro Asp Arg Phe Ser
 50                  55                  60

Gly Ser Lys Ser Gly Thr Ser Ala Ser Leu Ala Ile Ser Gly Leu Arg
 65                  70                  75                  80

Ser Glu Asp Glu Ala Asp Tyr Tyr Cys Gly Thr Trp Asp Ser Ser Leu
                 85                  90                  95

Ser Ala Gly Val Phe Gly Gly Gly Thr Lys Val Thr Val Leu
             100                 105                 110

<210> SEQ ID NO 114
<211> LENGTH: 110
<212> TYPE: PRT
<213> ORGANISM: Artificial sequence
<220> FEATURE:
<223> OTHER INFORMATION: Variable Light (VL) Domain amino acid sequence

<400> SEQUENCE: 114

Gln Ser Val Leu Thr Gln Pro Pro Ser Ala Ser Gly Thr Pro Gly Gln
1               5                   10                  15

Arg Val Thr Ile Ser Cys Ser Gly Ser Ser Asn Ile Gly Asn Asn
            20                  25                  30

His Val Ser Trp Tyr Gln Gln Leu Pro Gly Thr Ala Pro Lys Leu Leu
         35                  40                  45

Ile Tyr Cys Asn Asn Arg Pro Ser Gly Val Pro Asp Arg Phe Ser
 50                  55                  60

Gly Ser Lys Ser Gly Thr Ser Ala Ser Leu Ala Ile Ser Gly Leu Arg
 65                  70                  75                  80

Ser Glu Asp Glu Ala Asp Tyr Tyr Cys Gln Val Trp Asp Ser Ser Arg

```
                     85                  90                  95
Asp Gln Gly Val Phe Gly Gly Thr Gln Val Thr Val Leu
            100                 105                 110

<210> SEQ ID NO 115
<211> LENGTH: 107
<212> TYPE: PRT
<213> ORGANISM: Artificial sequence
<220> FEATURE:
<223> OTHER INFORMATION: Variable Light (VL) Domain amino acid sequence

<400> SEQUENCE: 115

Asp Ile Val Leu Thr Gln Ser Pro Gly Thr Leu Ser Leu Ser Pro Gly
1               5                   10                  15

Glu Arg Ala Thr Leu Ser Cys Arg Ala Ser Gln Ser Val Gly Ser Asn
            20                  25                  30

Leu Ala Trp Tyr Gln Gln Lys Pro Gly Gln Ala Pro Arg Leu Leu Ile
        35                  40                  45

Tyr Gly Ala Ser Ser Arg Ala Thr Gly Ile Pro Asp Arg Phe Ser Gly
    50                  55                  60

Ser Gly Ser Gly Thr Asp Phe Thr Leu Thr Ile Ser Arg Leu Glu Pro
65                  70                  75                  80

Glu Asp Phe Ala Val Tyr Tyr Cys Gln Arg Tyr Asp Gly Ser Pro Tyr
                85                  90                  95

Thr Phe Gly Gln Gly Thr Lys Val Asp Ile Lys
            100                 105

<210> SEQ ID NO 116
<211> LENGTH: 109
<212> TYPE: PRT
<213> ORGANISM: Artificial sequence
<220> FEATURE:
<223> OTHER INFORMATION: Variable Light (VL) Domain amino acid sequence

<400> SEQUENCE: 116

Gln Ser Val Leu Thr Gln Pro Pro Ser Ala Ser Gly Thr Pro Gly Gln
1               5                   10                  15

Arg Val Thr Ile Ser Cys Thr Gly Gly Pro Asn Ile Gly Asn Asn
            20                  25                  30

Ala Val Phe Trp Tyr Gln Gln Leu Pro Gly Lys Ala Pro Lys Leu Leu
        35                  40                  45

Ile Tyr Glu Leu Thr Lys Arg Pro Ser Gly Val Pro Asp Arg Phe Ser
    50                  55                  60

Gly Ser Lys Ser Gly Thr Ser Ala Ser Leu Ala Ile Ser Gly Leu Arg
65                  70                  75                  80

Ser Glu Asp Glu Ala Asp Tyr Tyr Cys Ser Ser Tyr Thr Arg Val Ser
                85                  90                  95

Thr Pro Val Phe Gly Gly Gly Thr Gln Val Thr Val Leu
            100                 105

<210> SEQ ID NO 117
<211> LENGTH: 111
<212> TYPE: PRT
<213> ORGANISM: Artificial sequence
<220> FEATURE:
<223> OTHER INFORMATION: Variable Light (VL) Domain amino acid sequence

<400> SEQUENCE: 117

Gln Ser Val Leu Thr Gln Pro Pro Ser Ala Ser Gly Thr Pro Gly Gln
1               5                   10                  15
```

```
Arg Val Thr Ile Ser Cys Ser Gly Ser Ser Asn Leu Gly Glu Gly
            20                  25                  30

Tyr Asp Val His Trp Tyr Gln Gln Leu Pro Gly Lys Ala Pro Lys Leu
            35                  40                  45

Leu Ile Tyr Tyr Ser Asp Phe Arg Pro Ser Gly Val Ser Asp Arg Phe
50                  55                  60

Ser Gly Ser Lys Ser Gly Thr Ser Ala Ser Leu Ala Ile Ser Gly Leu
65                  70                  75                  80

Gln Ser Glu Asp Glu Ala Asp Tyr Tyr Cys Ala Ala Trp Asp Asp Ser
                85                  90                  95

Leu Ser Ser Gln Val Phe Gly Gly Gly Thr Gln Val Thr Val Leu
            100                 105                 110
```

<210> SEQ ID NO 118
<211> LENGTH: 107
<212> TYPE: PRT
<213> ORGANISM: Artificial sequence
<220> FEATURE:
<223> OTHER INFORMATION: Variable Light (VL) Domain amino acid sequence

<400> SEQUENCE: 118

```
Asp Ile Val Leu Thr Gln Ser Pro Gly Thr Leu Ser Leu Ser Pro Gly
1               5                   10                  15

Glu Arg Ala Thr Leu Ser Cys Arg Ala Ser Gln Ser Ile Ser Ser Asn
            20                  25                  30

Leu Ala Trp Tyr Gln Gln Lys Pro Gly Gln Ala Pro Arg Leu Leu Ile
            35                  40                  45

Tyr Gly Ala Ser Ser Arg Ala Thr Gly Ile Pro Asp Arg Phe Ser Gly
50                  55                  60

Ser Gly Ser Gly Thr Asp Phe Thr Leu Thr Ile Ser Arg Leu Glu Pro
65                  70                  75                  80

Glu Asp Phe Ala Val Tyr Tyr Cys Gln Gln Arg Asp Trp Pro Pro Phe
                85                  90                  95

Thr Phe Gly Gln Gly Thr Lys Leu Glu Ile Lys
            100                 105
```

<210> SEQ ID NO 119
<211> LENGTH: 109
<212> TYPE: PRT
<213> ORGANISM: Artificial sequence
<220> FEATURE:
<223> OTHER INFORMATION: Variable Light (VL) Domain amino acid sequence

<400> SEQUENCE: 119

```
Gln Ser Val Leu Thr Gln Pro Pro Ser Ala Ser Gly Thr Pro Gly Gln
1               5                   10                  15

Arg Val Thr Ile Ser Cys Thr Gly Ser Ser Asn Ile Gly Arg Asn
            20                  25                  30

Ser Val Asn Trp Tyr Gln Gln Leu Pro Gly Thr Ala Pro Lys Leu Leu
            35                  40                  45

Ile Tyr Ser Asn His His Arg Pro Ser Gly Val Pro Asp Arg Phe Ser
50                  55                  60

Gly Ser Lys Ser Gly Thr Ser Ala Ser Leu Ala Ile Ser Gly Leu Arg
65                  70                  75                  80

Ser Glu Asp Glu Ala Asp Tyr Tyr Cys Ser Ser Tyr Ala Gly Ser Asn
                85                  90                  95

Lys Tyr Val Phe Gly Thr Gly Thr Gln Val Thr Val Leu
```

100                 105

<210> SEQ ID NO 120
<211> LENGTH: 109
<212> TYPE: PRT
<213> ORGANISM: Artificial sequence
<220> FEATURE:
<223> OTHER INFORMATION: Variable Light (VL) Domain amino acid sequence

<400> SEQUENCE: 120

Gln Ser Val Leu Thr Gln Pro Pro Ser Ala Ser Gly Thr Pro Gly Gln
1               5                   10                  15

Arg Val Thr Ile Ser Cys Ser Gly Gly Arg Ser Asn Ile Gly Ser Asn
            20                  25                  30

Thr Val Asn Trp Tyr Gln Gln Leu Pro Gly Lys Ala Pro Lys Leu Leu
        35                  40                  45

Ile Tyr Gly Asn Ser Asn Arg Pro Ser Gly Val Pro Asp Arg Phe Ser
    50                  55                  60

Gly Ser Lys Ser Gly Thr Ser Ala Ser Leu Ala Ile Ser Gly Leu Arg
65                  70                  75                  80

Ser Glu Asp Glu Ala Asp Tyr Tyr Cys Ser His Ala Arg Gly Asp
                85                  90                  95

Thr Leu Ile Phe Gly Val Gly Thr Lys Leu Thr Val Leu
            100                 105

<210> SEQ ID NO 121
<211> LENGTH: 110
<212> TYPE: PRT
<213> ORGANISM: Artificial sequence
<220> FEATURE:
<223> OTHER INFORMATION: Variable Light (VL) Domain amino acid sequence

<400> SEQUENCE: 121

Gln Ser Val Leu Thr Gln Pro Pro Ser Ala Ser Gly Thr Pro Gly Gln
1               5                   10                  15

Arg Val Thr Ile Ser Cys Ser Gly Gly Ser Ser Asn Ile Gly Ser Gln
            20                  25                  30

Thr Val Leu Trp Tyr Gln Gln Leu Pro Gly Thr Ala Pro Lys Leu Leu
        35                  40                  45

Ile Tyr Asp Asn Asn Lys Arg Pro Ser Gly Val Pro Asp Arg Phe Ser
    50                  55                  60

Gly Ser Lys Ser Gly Thr Ser Ala Ser Leu Ala Ile Ser Gly Leu Arg
65                  70                  75                  80

Ser Glu Asp Glu Ala Asp Tyr Tyr Cys Ala Ser Trp Asp Asp Ser Leu
                85                  90                  95

Ser Gly Gly Val Phe Gly Gly Gly Thr Lys Val Thr Val Leu
            100                 105                 110

<210> SEQ ID NO 122
<211> LENGTH: 109
<212> TYPE: PRT
<213> ORGANISM: Artificial sequence
<220> FEATURE:
<223> OTHER INFORMATION: Variable Light (VL) Domain amino acid sequence

<400> SEQUENCE: 122

Gln Ser Val Leu Thr Gln Pro Pro Ser Ala Ser Gly Thr Pro Gly Gln
1               5                   10                  15

Arg Val Thr Ile Ser Cys Ser Gly Ser Thr Ser Asn Ile Gly Arg Asn
            20                  25                  30

```
Tyr Val Cys Trp Tyr Gln Gln Leu Pro Gly Lys Ala Pro Lys Leu Leu
            35                  40                  45

Ile Tyr Ala Asn Asn Asn Arg Pro Ser Gly Val Pro Asp Arg Phe Ser
 50                  55                  60

Gly Ser Lys Ser Gly Thr Ser Ala Ser Leu Ala Ile Ser Gly Leu Arg
 65                  70                  75                  80

Ser Glu Asp Glu Ala Asp Tyr Tyr Cys Ser Ser Tyr Thr Ser Ser Ser
                 85                  90                  95

Thr Leu Val Phe Gly Gly Gly Thr Gln Leu Thr Val Leu
                100                 105

<210> SEQ ID NO 123
<211> LENGTH: 108
<212> TYPE: PRT
<213> ORGANISM: Artificial sequence
<220> FEATURE:
<223> OTHER INFORMATION: Variable Light (VL) Domain amino acid sequence

<400> SEQUENCE: 123

Asp Ile Val Leu Thr Gln Ser Pro Gly Thr Leu Ser Leu Ser Pro Gly
 1               5                  10                  15

Glu Arg Ala Thr Leu Ser Cys Arg Ala Ser Gln Ser Val Ser Ser Ser
                 20                  25                  30

Tyr Leu Ala Trp Tyr Gln Gln Lys Pro Gly Gln Ala Pro Arg Leu Leu
            35                  40                  45

Ile Tyr Gly Val Ser Asn Arg Ala Thr Gly Ile Pro Asp Arg Phe Ser
 50                  55                  60

Gly Ser Gly Ser Gly Thr Asp Phe Thr Leu Thr Ile Ser Arg Leu Glu
 65                  70                  75                  80

Pro Glu Asp Phe Ala Val Tyr Tyr Cys Gln Gln Ser Tyr Ser Thr Pro
                 85                  90                  95

Tyr Thr Phe Gly Pro Gly Thr Lys Leu Asp Ile Lys
                100                 105

<210> SEQ ID NO 124
<211> LENGTH: 106
<212> TYPE: PRT
<213> ORGANISM: Artificial sequence
<220> FEATURE:
<223> OTHER INFORMATION: Variable Light (VL) Domain amino acid sequence

<400> SEQUENCE: 124

Asp Ile Val Leu Thr Gln Ser Pro Gly Thr Leu Ser Leu Ser Pro Gly
 1               5                  10                  15

Glu Arg Ala Thr Leu Ser Cys Thr Ala Ser Gln Ser Val Gly Arg Tyr
                 20                  25                  30

Leu Ala Trp Tyr Gln Gln Lys Pro Gly Gln Ala Pro Arg Leu Leu Ile
            35                  40                  45

Tyr Gly Ala Ser Ser Arg Ala Thr Gly Ile Pro Asp Arg Phe Ser Gly
            50                  55                  60

Ser Gly Ser Gly Thr Asp Phe Thr Leu Thr Ile Ser Arg Leu Glu Pro
 65                  70                  75                  80

Glu Asp Phe Ala Val Tyr Tyr Cys Gln Gln Tyr Gly Ser Ser Leu Thr
                 85                  90                  95

Phe Gly Gly Gly Thr Lys Leu Asp Ile Lys
                100                 105
```

```
<210> SEQ ID NO 125
<211> LENGTH: 109
<212> TYPE: PRT
<213> ORGANISM: Artificial sequence
<220> FEATURE:
<223> OTHER INFORMATION: Variable Light (VL) Domain amino acid sequence

<400> SEQUENCE: 125

Gln Ser Val Leu Thr Gln Pro Pro Ser Ala Ser Gly Thr Pro Gly Gln
1               5                   10                  15

Arg Val Thr Ile Ser Cys Ser Gly Arg Ser Ser Asn Val Gly Ser Asn
            20                  25                  30

Ser Val Asn Trp Tyr Gln Gln Leu Pro Gly Thr Ala Pro Lys Leu Leu
        35                  40                  45

Ile Tyr Thr Asn Asp Gln Arg Pro Ser Gly Val Ser Asp Arg Phe Ser
    50                  55                  60

Gly Ser Lys Ser Gly Thr Ser Ala Ser Leu Ala Ile Ser Gly Leu Leu
65                  70                  75                  80

Ser Glu Asp Glu Ala Asp Tyr Tyr Cys Ser Ser Tyr Thr Ser Ser Ser
                85                  90                  95

Thr Arg Val Phe Gly Thr Gly Thr Lys Leu Thr Val Leu
            100                 105

<210> SEQ ID NO 126
<211> LENGTH: 107
<212> TYPE: PRT
<213> ORGANISM: Artificial sequence
<220> FEATURE:
<223> OTHER INFORMATION: Variable Light (VL) Domain amino acid sequence

<400> SEQUENCE: 126

Asp Ile Val Leu Thr Gln Ser Pro Gly Thr Leu Ser Leu Ser Pro Gly
1               5                   10                  15

Glu Arg Ala Thr Leu Ser Cys Arg Ala Ser Gln Ser Val Ser Ser Asn
            20                  25                  30

Leu Ala Trp Tyr Gln Gln Lys Pro Gly Gln Ala Pro Arg Leu Leu Ile
        35                  40                  45

Tyr Asp Ala Ser Asn Arg Ala Thr Gly Ile Pro Asp Arg Phe Ser Gly
    50                  55                  60

Ser Gly Ser Gly Thr Asp Phe Thr Leu Thr Ile Ser Arg Leu Glu Pro
65                  70                  75                  80

Glu Asp Phe Ala Val Tyr Tyr Cys Gln Gln Gly Asp Ser Tyr Pro Tyr
                85                  90                  95

Thr Phe Gly Gln Gly Thr Lys Leu Glu Ile Lys
            100                 105

<210> SEQ ID NO 127
<211> LENGTH: 109
<212> TYPE: PRT
<213> ORGANISM: Artificial sequence
<220> FEATURE:
<223> OTHER INFORMATION: Variable Light (VL) Domain amino acid sequence

<400> SEQUENCE: 127

Asp Ile Val Leu Thr Gln Ser Pro Gly Thr Leu Ser Leu Ser Pro Gly
1               5                   10                  15

Glu Arg Ala Thr Leu Ser Cys Arg Ala Ser Gln Thr Ile Ser Ser Asn
            20                  25                  30

Leu Ala Trp Tyr Gln Gln Lys Pro Gly Gln Ala Pro Arg Leu Leu Ile
        35                  40                  45
```

```
Tyr Gly Ala Ser Ser Arg Ala Thr Gly Ile Pro Asp Arg Phe Ser Gly
            50                  55                  60

Ser Gly Ser Gly Thr Asp Phe Thr Leu Thr Ile Ser Arg Leu Glu Pro
 65                  70                  75                  80

Glu Asp Phe Ala Val Tyr Tyr Cys Gln Gln Tyr Ser Trp Ser Pro Arg
                 85                  90                  95

Val Tyr Ser Phe Gly Gln Gly Thr Lys Leu Glu Ile Lys
            100                 105
```

<210> SEQ ID NO 128
<211> LENGTH: 107
<212> TYPE: PRT
<213> ORGANISM: Artificial sequence
<220> FEATURE:
<223> OTHER INFORMATION: Variable Light (VL) Domain amino acid sequence

<400> SEQUENCE: 128

```
Asp Ile Val Leu Thr Gln Ser Pro Gly Thr Leu Ser Leu Ser Pro Gly
 1               5                  10                  15

Glu Arg Ala Thr Leu Ser Cys Arg Ala Ser Gln Ser Val Ser Ser Ser
                20                  25                  30

Tyr Leu Ala Trp Tyr Gln Gln Lys Pro Gly Gln Ala Pro Arg Leu Leu
            35                  40                  45

Ile Tyr Gly Ala Ser Thr Arg Ala Pro Gly Ile Pro Asp Arg Phe Ser
 50                  55                  60

Gly Ser Gly Ser Gly Thr Asp Phe Thr Leu Thr Ile Ser Arg Leu Glu
 65                  70                  75                  80

Pro Glu Asp Phe Ala Val Tyr Tyr Cys His Gln Arg Gly Ser Gly Asp
                 85                  90                  95

Thr Phe Gly Pro Gly Thr Lys Val Glu Ile Lys
            100                 105
```

<210> SEQ ID NO 129
<211> LENGTH: 115
<212> TYPE: PRT
<213> ORGANISM: Artificial Sequence
<220> FEATURE:
<223> OTHER INFORMATION: Exemplary CH1 domain (for expression as a Fab
      fragment)

<400> SEQUENCE: 129

```
Ala Ser Thr Lys Gly Pro Ser Val Phe Pro Leu Ala Pro Ser Ser Lys
 1               5                  10                  15

Ser Thr Ser Gly Gly Thr Ala Ala Leu Gly Cys Leu Val Lys Asp Tyr
                20                  25                  30

Phe Pro Glu Pro Val Thr Val Ser Trp Asn Ser Gly Ala Leu Thr Ser
            35                  40                  45

Gly Val His Thr Phe Pro Ala Val Leu Gln Ser Ser Gly Leu Tyr Ser
 50                  55                  60

Leu Ser Ser Val Val Thr Val Pro Ser Ser Ser Leu Gly Thr Gln Thr
 65                  70                  75                  80

Tyr Ile Cys Asn Val Asn His Lys Pro Ser Asn Thr Lys Val Asp Lys
                 85                  90                  95

Arg Val Glu Pro Lys Ser Cys Asp Lys Thr Gly Gly Ser His His His
            100                 105                 110

His His His
        115
```

<210> SEQ ID NO 130
<211> LENGTH: 330
<212> TYPE: PRT
<213> ORGANISM: Artificial Sequence
<220> FEATURE:
<223> OTHER INFORMATION: Exemplary Human Gamma1 CH1-CH3 domain (for expression as a human IgG1)

<400> SEQUENCE: 130

Ala Ser Thr Lys Gly Pro Ser Val Phe Pro Leu Ala Pro Ser Ser Lys
1               5                   10                  15

Ser Thr Ser Gly Gly Thr Ala Ala Leu Gly Cys Leu Val Lys Asp Tyr
            20                  25                  30

Phe Pro Glu Pro Val Thr Val Ser Trp Asn Ser Gly Ala Leu Thr Ser
        35                  40                  45

Gly Val His Thr Phe Pro Ala Val Leu Gln Ser Ser Gly Leu Tyr Ser
    50                  55                  60

Leu Ser Ser Val Val Thr Val Pro Ser Ser Leu Gly Thr Gln Thr
65                  70                  75                  80

Tyr Ile Cys Asn Val Asn His Lys Pro Ser Asn Thr Lys Val Asp Lys
                85                  90                  95

Lys Val Glu Pro Lys Ser Cys Asp Lys Thr His Thr Cys Pro Pro Cys
            100                 105                 110

Pro Ala Pro Glu Leu Leu Gly Gly Pro Ser Val Phe Leu Phe Pro Pro
        115                 120                 125

Lys Pro Lys Asp Thr Leu Met Ile Ser Arg Thr Pro Glu Val Thr Cys
130                 135                 140

Val Val Val Asp Val Ser His Glu Asp Pro Glu Val Lys Phe Asn Trp
145                 150                 155                 160

Tyr Val Asp Gly Val Glu Val His Asn Ala Lys Thr Lys Pro Arg Glu
                165                 170                 175

Glu Gln Tyr Asn Ser Thr Tyr Arg Val Val Ser Val Leu Thr Val Leu
            180                 185                 190

His Gln Asp Trp Leu Asn Gly Lys Glu Tyr Lys Cys Lys Val Ser Asn
        195                 200                 205

Lys Ala Leu Pro Ala Pro Ile Glu Lys Thr Ile Ser Lys Ala Lys Gly
    210                 215                 220

Gln Pro Arg Glu Pro Gln Val Tyr Thr Leu Pro Pro Ser Arg Glu Glu
225                 230                 235                 240

Met Thr Lys Asn Gln Val Ser Leu Thr Cys Leu Val Lys Gly Phe Tyr
                245                 250                 255

Pro Ser Asp Ile Ala Val Glu Trp Glu Ser Asn Gly Gln Pro Glu Asn
            260                 265                 270

Asn Tyr Lys Thr Thr Pro Pro Val Leu Asp Ser Asp Gly Ser Phe Phe
        275                 280                 285

Leu Tyr Ser Lys Leu Thr Val Asp Lys Ser Arg Trp Gln Gln Gly Asn
    290                 295                 300

Val Phe Ser Cys Ser Val Met His Glu Ala Leu His Asn His Tyr Thr
305                 310                 315                 320

Gln Lys Ser Leu Ser Leu Ser Pro Gly Lys
                325                 330

<210> SEQ ID NO 131
<211> LENGTH: 9
<212> TYPE: PRT
<213> ORGANISM: Artificial Sequence

```
<220> FEATURE:
<223> OTHER INFORMATION: synthetic peptide amino acid sequence

<400> SEQUENCE: 131

Gly Gly Ser His His His His His
1               5

<210> SEQ ID NO 132
<211> LENGTH: 107
<212> TYPE: PRT
<213> ORGANISM: Artificial Sequence
<220> FEATURE:
<223> OTHER INFORMATION: Exemplary Human kappa light chain constant
      region

<400> SEQUENCE: 132

Arg Thr Val Ala Ala Pro Ser Val Phe Ile Phe Pro Pro Ser Asp Glu
1               5                   10                  15

Gln Leu Lys Ser Gly Thr Ala Ser Val Val Cys Leu Leu Asn Asn Phe
            20                  25                  30

Tyr Pro Arg Glu Ala Lys Val Gln Trp Lys Val Asp Asn Ala Leu Gln
        35                  40                  45

Ser Gly Asn Ser Gln Glu Ser Val Thr Glu Gln Asp Ser Lys Asp Ser
    50                  55                  60

Thr Tyr Ser Leu Ser Ser Thr Leu Thr Leu Ser Lys Ala Asp Tyr Glu
65                  70                  75                  80

Lys His Lys Val Tyr Ala Cys Glu Val Thr His Gln Gly Leu Ser Ser
                85                  90                  95

Pro Val Thr Lys Ser Phe Asn Arg Gly Glu Cys
            100                 105

<210> SEQ ID NO 133
<211> LENGTH: 106
<212> TYPE: PRT
<213> ORGANISM: Artificial Sequence
<220> FEATURE:
<223> OTHER INFORMATION: Exemplary human lambda light chain constant
      region

<400> SEQUENCE: 133

Gly Gln Pro Lys Ala Ala Pro Ser Val Thr Leu Phe Pro Pro Ser Ser
1               5                   10                  15

Glu Glu Leu Gln Ala Asn Lys Ala Thr Leu Val Cys Leu Ile Ser Asp
            20                  25                  30

Phe Tyr Pro Gly Ala Val Thr Val Ala Trp Lys Ala Asp Ser Ser Pro
        35                  40                  45

Val Lys Ala Gly Val Glu Thr Thr Thr Pro Ser Lys Gln Ser Asn Asn
    50                  55                  60

Lys Tyr Ala Ala Ser Ser Tyr Leu Ser Leu Thr Pro Glu Gln Trp Lys
65                  70                  75                  80

Ser His Arg Ser Tyr Ser Cys Gln Val Thr His Glu Gly Ser Thr Val
                85                  90                  95

Glu Lys Thr Val Ala Pro Ala Glu Cys Ser
            100                 105

<210> SEQ ID NO 134
<211> LENGTH: 5
<212> TYPE: PRT
<213> ORGANISM: Artificial Sequence
<220> FEATURE:
<223> OTHER INFORMATION: IgG1-like hinge amino acid sequence
```

<400> SEQUENCE: 134

Cys Pro Pro Cys Pro
1               5

<210> SEQ ID NO 135
<211> LENGTH: 771
<212> TYPE: PRT
<213> ORGANISM: Homo sapiens

<400> SEQUENCE: 135

Met Gly Trp Leu Thr Arg Ile Val Cys Leu Phe Trp Gly Val Leu Leu
1               5                   10                  15

Thr Ala Arg Ala Asn Tyr Gln Asn Gly Lys Asn Asn Val Pro Arg Leu
            20                  25                  30

Lys Leu Ser Tyr Lys Glu Met Leu Glu Ser Asn Asn Val Ile Thr Phe
        35                  40                  45

Asn Gly Leu Ala Asn Ser Ser Tyr His Thr Phe Leu Leu Asp Glu
    50                  55                  60

Glu Arg Ser Arg Leu Tyr Val Gly Ala Lys Asp His Ile Phe Ser Phe
65              70                  75                  80

Asp Leu Val Asn Ile Lys Asp Phe Gln Lys Ile Val Trp Pro Val Ser
                85                  90                  95

Tyr Thr Arg Arg Asp Glu Cys Lys Trp Ala Gly Lys Asp Ile Leu Lys
            100                 105                 110

Glu Cys Ala Asn Phe Ile Lys Val Leu Lys Ala Tyr Asn Gln Thr His
        115                 120                 125

Leu Tyr Ala Cys Gly Thr Gly Ala Phe His Pro Ile Cys Thr Tyr Ile
    130                 135                 140

Glu Ile Gly His His Pro Glu Asp Asn Ile Phe Lys Leu Glu Asn Ser
145                 150                 155                 160

His Phe Glu Asn Gly Arg Gly Lys Ser Pro Tyr Asp Pro Lys Leu Leu
                165                 170                 175

Thr Ala Ser Leu Leu Ile Asp Gly Glu Leu Tyr Ser Gly Thr Ala Ala
            180                 185                 190

Asp Phe Met Gly Arg Asp Phe Ala Ile Phe Arg Thr Leu Gly His His
        195                 200                 205

His Pro Ile Arg Thr Glu Gln His Asp Ser Arg Trp Leu Asn Asp Pro
    210                 215                 220

Lys Phe Ile Ser Ala His Leu Ile Ser Glu Ser Asp Asn Pro Glu Asp
225                 230                 235                 240

Asp Lys Val Tyr Phe Phe Arg Glu Asn Ala Ile Asp Gly Glu His
                245                 250                 255

Ser Gly Lys Ala Thr His Ala Arg Ile Gly Gln Ile Cys Lys Asn Asp
            260                 265                 270

Phe Gly Gly His Arg Ser Leu Val Asn Lys Trp Thr Thr Phe Leu Lys
        275                 280                 285

Ala Arg Leu Ile Cys Ser Val Pro Gly Pro Asn Gly Ile Asp Thr His
    290                 295                 300

Phe Asp Glu Leu Gln Asp Val Phe Leu Met Asn Phe Lys Asp Pro Lys
305                 310                 315                 320

Asn Pro Val Val Tyr Gly Val Phe Thr Thr Ser Ser Asn Ile Phe Lys
                325                 330                 335

Gly Ser Ala Val Cys Met Tyr Ser Met Ser Asp Val Arg Arg Val Phe
            340                 345                 350

```
Leu Gly Pro Tyr Ala His Arg Asp Gly Pro Asn Tyr Gln Trp Val Pro
        355                 360                 365

Tyr Gln Gly Arg Val Pro Tyr Pro Arg Pro Gly Thr Cys Pro Ser Lys
    370                 375                 380

Thr Phe Gly Gly Phe Asp Ser Thr Lys Asp Leu Pro Asp Asp Val Ile
385                 390                 395                 400

Thr Phe Ala Arg Ser His Pro Ala Met Tyr Asn Pro Val Phe Pro Met
                405                 410                 415

Asn Asn Arg Pro Ile Val Ile Lys Thr Asp Val Asn Tyr Gln Phe Thr
            420                 425                 430

Gln Ile Val Val Asp Arg Val Asp Ala Glu Asp Gly Gln Tyr Asp Val
        435                 440                 445

Met Phe Ile Gly Thr Asp Val Gly Thr Val Leu Lys Val Val Ser Ile
    450                 455                 460

Pro Lys Glu Thr Trp Tyr Asp Leu Glu Glu Val Leu Leu Glu Glu Met
465                 470                 475                 480

Thr Val Phe Arg Glu Pro Thr Ala Ile Ser Ala Met Glu Leu Ser Thr
                485                 490                 495

Lys Gln Gln Gln Leu Tyr Ile Gly Ser Thr Ala Gly Val Ala Gln Leu
            500                 505                 510

Pro Leu His Arg Cys Asp Ile Tyr Gly Lys Ala Cys Ala Glu Cys Cys
        515                 520                 525

Leu Ala Arg Asp Pro Tyr Cys Ala Trp Asp Gly Ser Ala Cys Ser Arg
    530                 535                 540

Tyr Phe Pro Thr Ala Lys Arg Arg Thr Arg Arg Gln Asp Ile Arg Asn
545                 550                 555                 560

Gly Asp Pro Leu Thr His Cys Ser Asp Leu His His Asp Asn His His
                565                 570                 575

Gly His Ser Pro Glu Glu Arg Ile Ile Tyr Gly Val Glu Asn Ser Ser
            580                 585                 590

Thr Phe Leu Glu Cys Ser Pro Lys Ser Gln Arg Ala Leu Val Tyr Trp
        595                 600                 605

Gln Phe Gln Arg Arg Asn Glu Glu Arg Lys Glu Ile Arg Val Asp
    610                 615                 620

Asp His Ile Ile Arg Thr Asp Gln Gly Leu Leu Leu Arg Ser Leu Gln
625                 630                 635                 640

Gln Lys Asp Ser Gly Asn Tyr Leu Cys His Ala Val Glu His Gly Phe
                645                 650                 655

Ile Gln Thr Leu Leu Lys Val Thr Leu Glu Val Ile Asp Thr Glu His
            660                 665                 670

Leu Glu Glu Leu Leu His Lys Asp Asp Asp Gly Asp Gly Ser Lys Thr
        675                 680                 685

Lys Glu Met Ser Asn Ser Met Thr Pro Ser Gln Lys Val Trp Tyr Arg
    690                 695                 700

Asp Phe Met Gln Leu Ile Asn His Pro Asn Leu Asn Thr Met Asp Glu
705                 710                 715                 720

Phe Cys Glu Gln Val Trp Lys Arg Asp Arg Lys Gln Arg Gln Arg
                725                 730                 735

Pro Gly His Thr Pro Gly Asn Ser Asn Lys Trp Lys His Leu Gln Glu
            740                 745                 750

Asn Lys Lys Gly Arg Asn Arg Arg Thr His Glu Phe Glu Arg Ala Pro
        755                 760                 765
```

```
<210> SEQ ID NO 136
<211> LENGTH: 15
<212> TYPE: PRT
<213> ORGANISM: Artificial Sequence
<220> FEATURE:
<223> OTHER INFORMATION: Biotin ligase tag

<400> SEQUENCE: 136

Leu His His Ile Leu Asp Ala Gln Lys Met Val Trp Asn His Arg
1               5                   10                  15

<210> SEQ ID NO 137
<211> LENGTH: 20
<212> TYPE: PRT
<213> ORGANISM: Artificial Sequence
<220> FEATURE:
<223> OTHER INFORMATION: Sema3A protein antobodies binding amino acid
      sequence

<400> SEQUENCE: 137

Cys Ser Val Pro Gly Pro Asn Gly Ile Asp Thr His Phe Asp Glu Leu
1               5                   10                  15

Gln Asp Val Phe
            20
```